United States Patent [19]

Sidley

[11] Patent Number: 4,926,327
[45] Date of Patent: * May 15, 1990

[54] COMPUTERIZED GAMING SYSTEM

[76] Inventor: Joseph D. H. Sidley, 1710 Tyvale Ct., Vienna, Va. 22180

[*] Notice: The portion of the term of this patent subsequent to Jul. 26, 2005 has been disclaimed.

[21] Appl. No.: 174,948

[22] Filed: Mar. 29, 1988

Related U.S. Application Data

[63] Continuation-in-part of Ser. No. 873,098, Jun. 5, 1986, Pat. No. 4,760,527, which is a continuation of Ser. No. 482,315, Apr. 5, 1983, abandoned.

[51] Int. Cl.$^5$ .............................................. G06F 15/44
[52] U.S. Cl. ............................... 364/412; 273/138 A; 273/85 CP
[58] Field of Search ..................... 364/412, 411, 410; 273/138 A, DIG. 28, 85 CP

[56] References Cited

U.S. PATENT DOCUMENTS

| | | | |
|---|---|---|---|
| 4,052,057 | 10/1977 | Castle | 273/138 A |
| 4,399,798 | 7/1982 | Hedges et al. | 364/412 |
| 4,477,069 | 10/1984 | Crudgington, Jr. | 272/3 |
| 4,494,197 | 1/1985 | Troy et al. | 364/412 |
| 4,531,187 | 7/1985 | Uhland | 273/85 CP |
| 4,553,222 | 11/1985 | Kurland et al. | 364/900 |
| 4,560,161 | 12/1985 | Hamano | 273/85 CP |
| 4,572,509 | 2/1986 | Sitrick | 273/85 G |
| 4,575,622 | 3/1986 | Pellagrini | 235/382 |
| 4,593,904 | 6/1986 | Graves | 273/1 E |
| 4,614,342 | 9/1986 | Takashima | 273/85 CP |
| 4,648,600 | 3/1987 | Olliges | 273/138 A |
| 4,760,527 | 7/1988 | Sidley | 273/85 CP |
| 4,799,683 | 1/1989 | Bruner, Jr. | 273/DIG. 28 |
| 4,805,907 | 2/1989 | Hagiwara | 273/DIG. 28 |

OTHER PUBLICATIONS

Findler, Nicholas V., "Computer Poker", Scientific American, 239, 1, pp. 144–151, Jul. 1978.

Primary Examiner—Jerry Smith
Assistant Examiner—Steven Kibby
Attorney, Agent, or Firm—Bacon & Thomas

[57] ABSTRACT

A computerized gaming apparatus is disclosed in which a card game, such as poker, is electronically simulated on a plurality of individual player consoles. Each of the player consoles is interconnected with a central computer unit which simulates and controls the game, and at the same time, tabulates and displays all betting information for each participant. Each of the player consoles displays all of the player's own cards and either the up-cards of the other players, or the number of cards drawn by the other players (depending upon whether stud or draw poker is being played). The console also allows each player to input certain data to the central computer at specified times during the game.

22 Claims, 29 Drawing Sheets

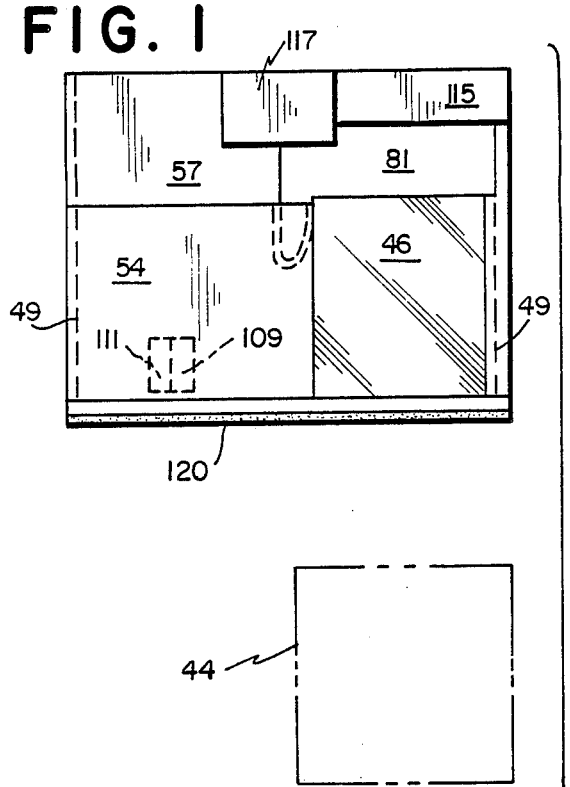
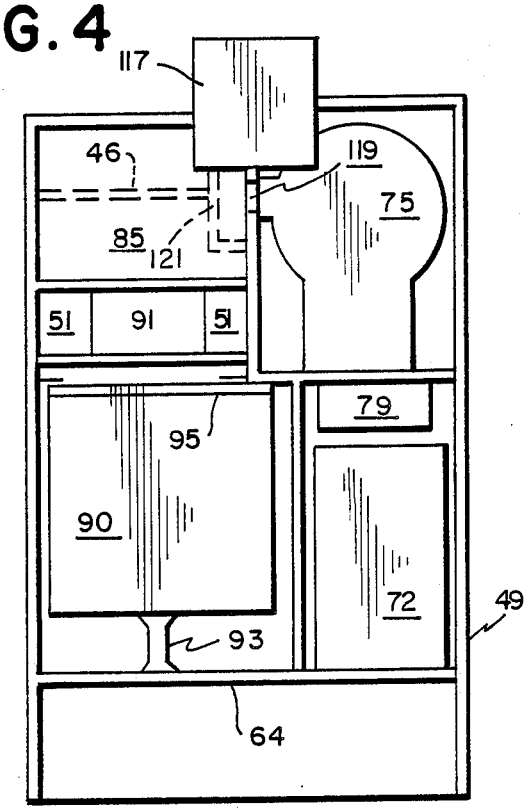
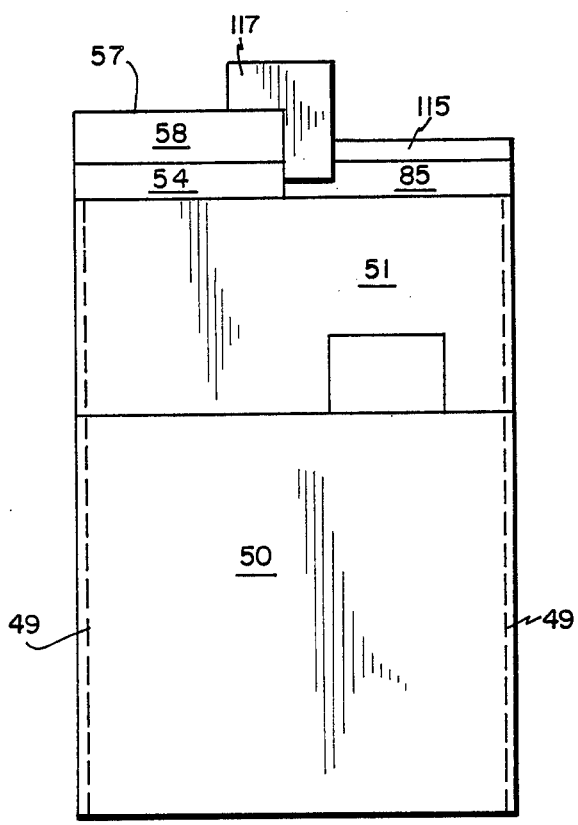
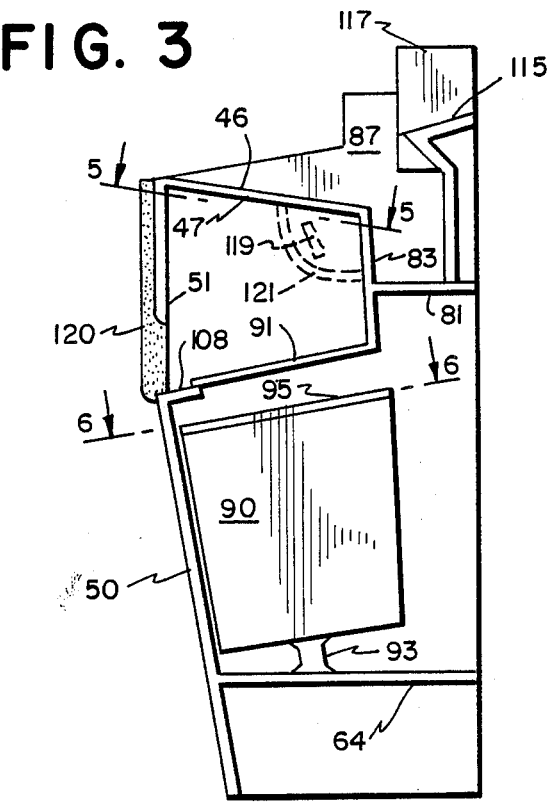

FIG. 10A
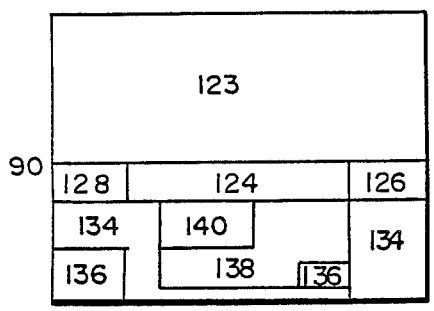
ALTERNATE EMBODIMENT
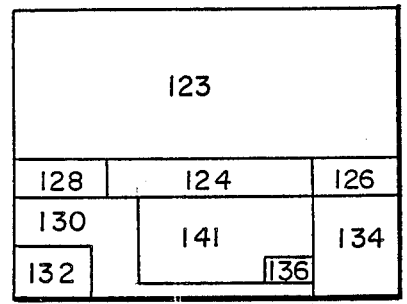
FIG. 10B
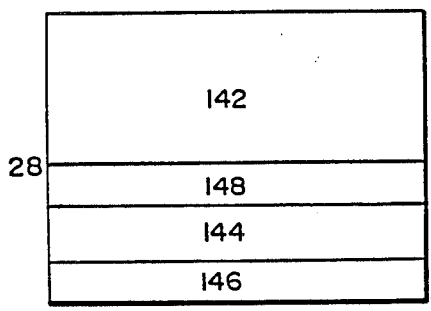
FIG. 10C
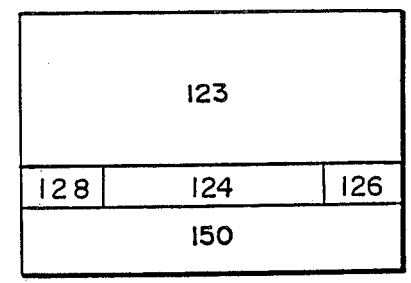
FIG. 10D
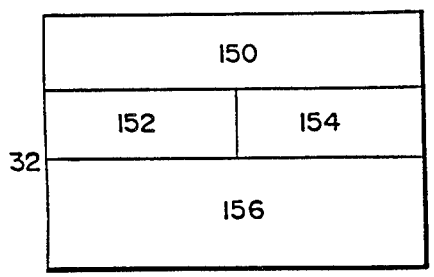
FIG. 10E
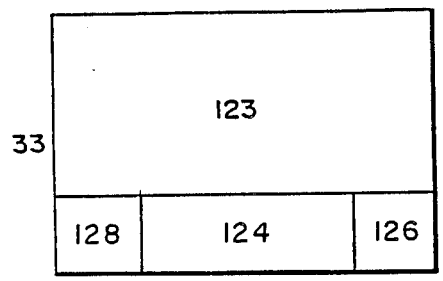
FIG. 10F
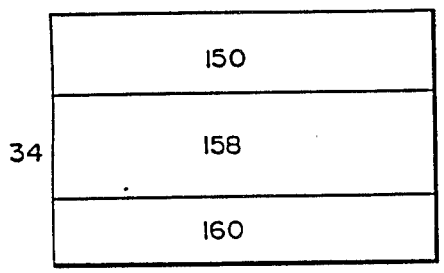

COMBINED HAND AND VALUES

| 141 | 199 | 199 | 199 | 199 | 199 | 199 | 199 |

FIG. 23A

| cards | High Hand Value | code | Definition | | | Improvements | | | | | |
|---|---|---|---|---|---|---|---|---|---|---|---|
| | | | | | Both | 1 Card | | | 2 Cards | | |
| | | | Rank Match | Cons. | Suit Match | Rank Match | Cons. | Suit Match | Rank Match | Cons. | Suit Match |
| 5 | 5 of a kind | 9 | 5 | 0 | 0 | 0 | | | | | |
| | Straight Flush | 8 | 0 | 5 | 5 | 5 | | | | | |
| | 4 of a kind | 7 | 4 | <3 | <3 | <3 | 9 | | | 9 | | |
| | Full House | 6 | 32 | <3 | <3 | <3 | 7 | | | 7,9 | | |
| | Flush | 5 | 0 | <5 | <5 | <5 | | 8 | | | 8 | |
| | Straight | 4 | 0 | 5 | <5 | <5 | | 5,8 | | | 5,8 | |
| | 3 of a kind | 3 | 3 | <4 | <4 | <4 | 6,7 | | | 6,7,9 | | |
| | Two Pair | 2 | 22 | <4 | <4 | <4 | 6 | | | 6,7 | | |
| | One Pair | 1 | 20 | <5 | <5 | <5 | 2,3 | 4,5,8 | | 2,3,6,7 | 4,5,8 | |
| | No Pair | 0 | 0 | <5 | <5 | <5 | 1 | 4,5,8 | | 1,2,3 | 4,5,8 | |
| 4 | 4 of a kind | 7 | 4 | 0 | 0 | 0 | 9 | | | 9 | | |
| | 3 of a kind | 3 | 3 | <3 | <3 | <3 | 6,7 | | | 6,7,9 | | |
| | Two Pair | 2 | 22 | <3 | <3 | <3 | 6,7 | | | 6,7,9 | | |
| | One Pair | 1 | 2 | <4 | <4 | <4 | 2,3 | | | 2,3,7 | 4,5,8 | |
| | No Pair | 0 | 0 | <5 | <5 | <5 | 1 | 4,5,8 | | 1,2,3 | 4,5,8 | |
| 3 | 3 of a kind | 3 | 3 | 0 | 0 | | 6,7 | | | 6,7,9 | | |
| | One Pair | 1 | 2 | <3 | <3 | <3 | 2,3 | | | 2,3,6,7 | | |
| | No Pair | 0 | 0 | <4 | <4 | <4 | 1 | | | 2,3 | 4,5,8 | |
| 2 | One Pair | 1 | 2 | 0 | 0 | | 2,3 | | | 2,3,6,7 | | |
| | No Pair | 0 | 0 | <3 | <3 | | 1 | | | 2,3 | | |

FIG. 23B

| cards | High Hand Value | code | Definition | | | Both | Improvements | | | | | |
|---|---|---|---|---|---|---|---|---|---|---|---|---|
| | | | | | | | 1 Card | | | 2 Cards | | |
| | | | Rank Match | Cons. | Suit Match | | Rank Match | Cons. | Suit Match | Rank Match | Cons. | Suit Match |
| 6 | 5 of a kind | 9 | 5 | <3 | <3 | <3 | | | | | | |
| | Straight Flush | 8 | <3 | >4 | >4 | >4 | | | | | | |
| | 4 of a kind | 7 | 4<br>42 | <4<br><3 | <4<br><3 | <4<br><3 | 9 | | | 9 | | 8 |
| | Full House | 6 | 32<br>33 | <4<br><3 | <4<br><3 | <4<br><3 | 7 | | | 7,9 | | 8 |
| | Flush | 5 | <3 | <7 | >4 | <5 | | | 8 | 6,7 | | 8 |
| | Straight | 4 | <3 | <7 | <5 | <5 | | | 5,8 | 6,7 | | 5,8 |
| | 3 of a kind | 3 | | <5 | <5 | <5 | 6,7 | | 4,5,8 | 6,7,9 | | 4,5,8 |
| | Two Pair | 2 | 22<br>222 | <5<br><4 | <5<br><4 | <5<br><4 | 6 | | 4,5,8 | 6,7 | | 4,5,8 |
| | One Pair | 1 | 0 | <5 | <5 | <5 | 2,3 | | 4,5,8 | 2,3,6,7 | | 4,5,8 |
| | No Pair | 0 | 0 | <5 | <5 | <5 | 1 | | 4,5,8 | 1,2,3 | | 4,5,8 |
| 7 | 5 of a kind | 9 | 5 | <4 | <4 | <4 | | | | | | |
| | Straight Flush | 8 | <4 | >4 | >4 | >4 | | | | 9 | | |
| | 4 of a kind | 7 | 4 | <5 | <5 | <5 | 9 | | 8 | 9 | | 8 |
| | Full House | 6 | 4 | <5 | <5 | <9 | 7 | | 8 | 7,9 | | 8 |
| | Flush | 5 | <4 | <8 | >4 | <5 | 6,7 | | 8 | 6,7,9 | | |
| | Straight | 4 | <4 | >4 | <5 | <5 | 6,7 | | 8 | 6,7,9 | | 8 |
| | 3 of a kind | 3 | 3 | <5 | <5 | <5 | 6,7 | | 4,5,8 | 6,7,9 | | 4,5,8 |
| | Two Pair | 2 | 22 | <5 | <5 | <5 | 6 | | 4,5,8 | 6,7 | | 4,5,8 |
| | One Pair | 1 | 2 | <5 | <5 | <5 | 2,3 | | 4,5,8 | 2,3,6,7 | | 4,5,8 |
| | No Pair | 0 | 0 | <5 | <5 | <5 | 1 | | 4,5,8 | 1,2,3 | | 4,5,8 |

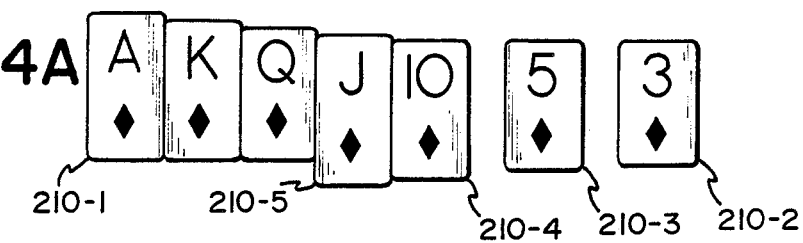
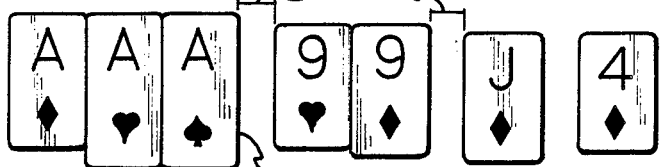
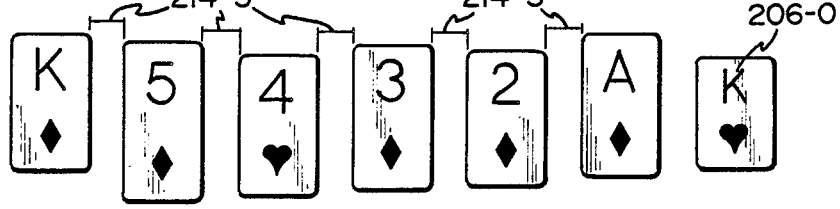
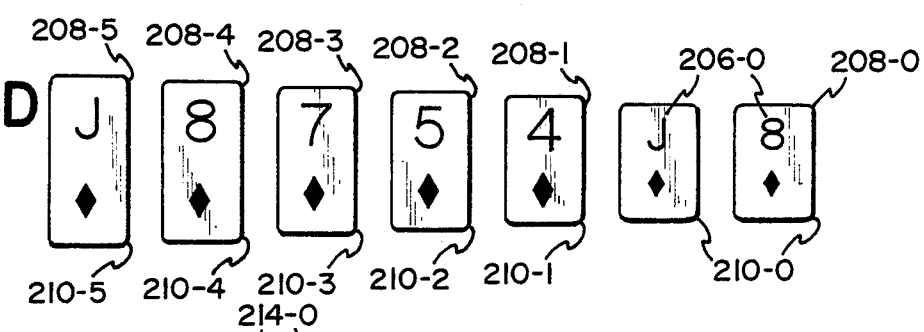
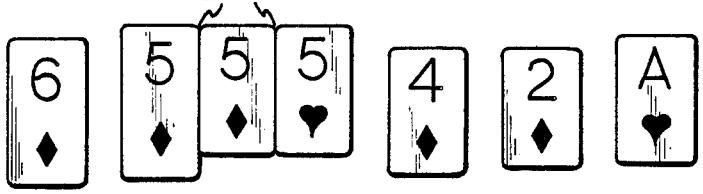
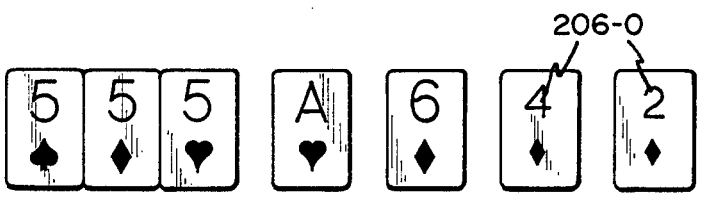

FIG. 25A

| Order Level | Next Card in Full Hand Register (198) | | | | |
|---|---|---|---|---|---|
| | Not Excess | | | | Excess |
| | Equal | -1 | -2 | <-2 | |
| 1 | 0 | 1 | 2 | 3 | 3 |
| 0 | 0 | 3 | 3 | 3 | 3 |

Separator Level

FIG. 25B

| Hand High Value | Code | High Value Register (182) | | | | |
|---|---|---|---|---|---|---|
| | | 1 | 2 | 3 | 4 | 5 |
| 5 of a kind | 9 | 1 | 1 | 1 | 1 | 1 |
| Straight Flush | 8 | 1 | 1 | 1 | 1 | 1 |
| 4 of a kind | 7 | 2 | 2 | 2 | 2 | 1 |
| Full House | 6 | 2 | 2 | 2 | 1 | 1 |
| Flush | 5 | 1 | 1 | 1 | 1 | 1 |
| Straight | 4 | 1 | 1 | 1 | 1 | 1 |
| 3 of a kind | 3 | 2 | 2 | 2 | 1 | 1 |
| Two Pair | 2 | 2 | 2 | 1 | 1 | 1 |
| One Pair | 1 | 2 | 2 | 1 | 1 | 1 |
| No Pair | 0 | 2 | 1 | 1 | 1 | 1 |

Rank Level

FIG. 26A

| High Hand Value | Code (180) | High Value Register (182) | | | | |
|---|---|---|---|---|---|---|
| | | 1 | 2 | 3 | 4 | 5 |
| 5 of a kind | 9 | 5 | 5 | 5 | 5 | 5 |
| Straight Flush | 8 | 5 | 4 | 3 | 2 | 1 |
| 4 of a kind | 7 | 5 | 5 | 5 | 5 | 1 |
| Full House | 6 | 5 | 5 | 5 | 3 | 3 |
| Flush | 5 | 5 | 4 | 3 | 2 | 1 |
| Straight | 4 | 5 | 4 | 3 | 2 | 1 |
| 3 of a kind | 3 | 5 | 5 | 5 | 1 | 1 |
| Two Pair | 2 | 5 | 5 | 3 | 3 | 1 |
| One Pair | 1 | 5 | 5 | 1 | 1 | 1 |
| No Pair | 0 | 5 | 1 | 1 | 1 | 1 |

High Expansion Levels

FIG. 26B

| Low Hand Value | Code (184) | Low Value Register (186) | | | | | Alternate Rules | | | | | |
|---|---|---|---|---|---|---|---|---|---|---|---|---|
| | | 1 | 2 | 3 | 4 | 5 | 1 | 2 | 3 | 4 | 5 | Co. |
| 5 of a kind | 9 | 5 | 5 | 5 | 5 | 5 | | | | | | |
| Straight Flush | 0 | 5 | 4 | 3 | 2 | 1 | 5 | 5 | 5 | 5 | 5 | 8 |
| 4 of a kind | 7 | 5 | 5 | 5 | 5 | 1 | | | | | | |
| Full House | 6 | 5 | 5 | 5 | 3 | 3 | | | | | | |
| Flush | 0 | 5 | 4 | 3 | 2 | 1 | 5 | 5 | 5 | 5 | 5 | 5 |
| Straight | 0 | 5 | 4 | 3 | 2 | 1 | 5 | 5 | 5 | 5 | 5 | 4 |
| 3 of a kind | 3 | 5 | 5 | 5 | 2 | 1 | | | | | | |
| Two Pair | 2 | 5 | 5 | 3 | 3 | 1 | | | | | | |
| One Pair | 1 | 5 | 5 | 3 | 2 | 1 | | | | | | |
| No Pair | 0 | 5 | 4 | 3 | 2 | 1 | | | | | | |

Low Expansion Levels

| cards | Low Hand Value | code | Definition Rank Matches | Non Matches | Improvements 1 Card Match | Non Mat | Co De | Rank | 2 Cards Match | Non Mat | Co De | Rank |
|---|---|---|---|---|---|---|---|---|---|---|---|---|
| 5 | 5 of a kind | 9 | 5 | 0 | 4 | 1 | 7 | | 3 | 2 | 3 | |
| | 4 of a kind | 7 | 4 | 1 | 3 | 2 | 3 | | 2 | 3 | 1 | |
| | Full House | 6 | 32 | 0 | 22 | 1 | 2 | | 2 | 3 | 1 | |
| | 3 of a kind | 3 | 3 | 2 | 2 | 3 | 1 | | 0 | 5 | 0 | High Card |
| | Two Pair | 2 | 22 | 1 | 2 | 3 | 1 | | 0 | 5 | 0 | High Card |
| | One Pair | 1 | 2 | 3 | 0 | 5 | 0 | High Card | 0 | 6 | 0 | 2nd High Card |
| | Low (no pair) | 0 | 0 | 5 | 0 | 6 | 0 | 2nd Hi Card | 0 | 7 | 0 | 3rd High Card |
| 4 | 4 of a kind | 7 | 4 | 0 | 4 | 1 | 4 | | 3 | 2 | 3 | |
| | 3 of a kind | 3 | 3 | 1 | 3 | 2 | 3 | | 2 | 3 | 1 | |
| | Two Pair | 2 | 22 | 0 | 22 | 1 | 2 | | 2 | 3 | 1 | |
| | One Pair | 1 | 2 | 2 | 2 | 3 | 1 | | 0 | 5 | 0 | High Card |
| | No Pair | 0 | 0 | 4 | 0 | 5 | 0 | High Card | 0 | 6 | 0 | 2nd High Card |
| 3 | 3 of a kind | 3 | 3 | 0 | 3 | 1 | 3 | | 3 | 2 | 3 | |
| | One Pair | 1 | 2 | 1 | 2 | 2 | 1 | | 2 | 3 | 1 | |
| | No Pair | 0 | 0 | 3 | 0 | 4 | 0 | High Card | 0 | 5 | 0 | 2nd High Card |
| 2 | One Pair | 1 | 2 | 0 | 2 | 1 | 1 | | 2 | 2 | 1 | |
| | No Pair | 0 | 0 | 2 | 0 | 3 | 0 | | 0 | 4 | 0 | |

FIG. 31 or 5 Lo / or 5 Low

| | | | | | | | | | | | | |
|---|---|---|---|---|---|---|---|---|---|---|---|---|
| 6 | Full House | 6 | 42 / 33 | 0 | 22 | 1 | 2 | | 2 | 3 | 1 | |
| | 3 of a kind | 3 | 4 | 2 | 2 | 3 | 1 | | 0 | 5 | | |
| | Two Pair | 2 | 32 / 222 | 1 / 0 | 2 | 3 | 1 | | 0 | 5 | | High Card |
| | One Pair | 1 | 3 / 22 | 3 / 2 | 0 | 5 | 0 | High Card | 0 | 6 | 0 | 2nd High Card |
| | Low (no pair) | 0 | 0 | >4 | 0 | >5 | | 2nd Hi Card | 0 | >6 | | 3rd High Card |
| 7 | Full House | 6 | 43 | 0 | 22 | 1 | 2 | | 2 | 3 | 1 | |
| | Two Pair | 2 | 42 / 33 / 322 | 1 / 1 / 0 | 2 | 3 | 1 | | 0 | 5 | 0 | High Card |
| | One Pair | 1 | 4 / 32 / 222 | 3 / 2 / 1 | 0 | 5 | 0 | High Card | 0 | 6 | 0 | 2nd High Card |
| | Low (no pair) | 0 | 0 | >4 | 0 | >5 | 0 | 2nd Hi Card | 0 | >6 | 0 | 3rd High Card |

6 and 7 (Standard) 52 Card Deck

FIG. 33A 180-6 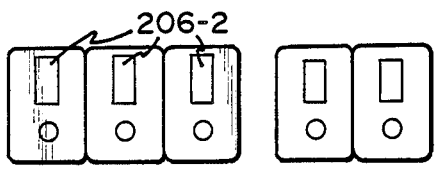
FIG. 33B 180-5 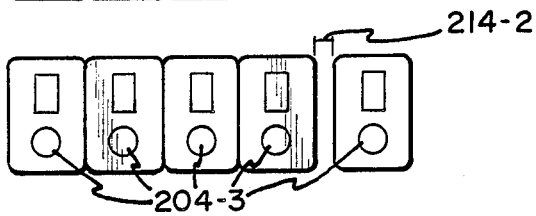
FIG. 33C 180-4
FIG. 33D 180-3 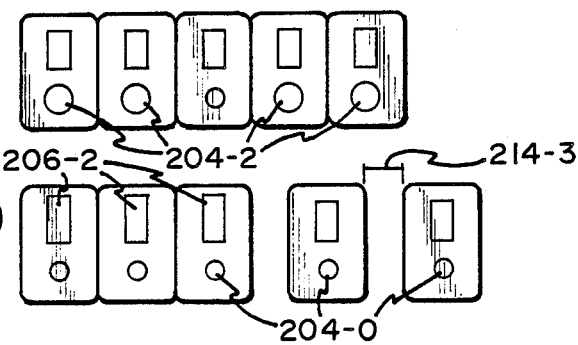
FIG. 33E 180-2 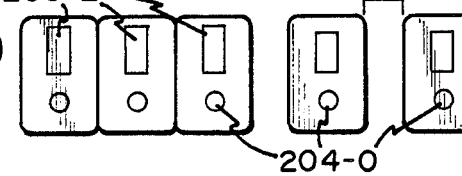
FIG. 33F 180-1 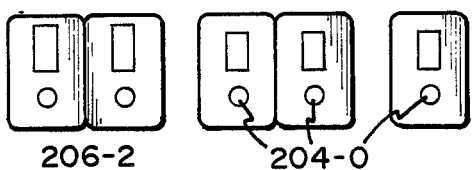
FIG. 33G 180-1 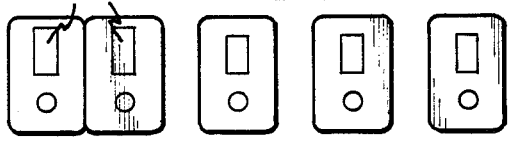
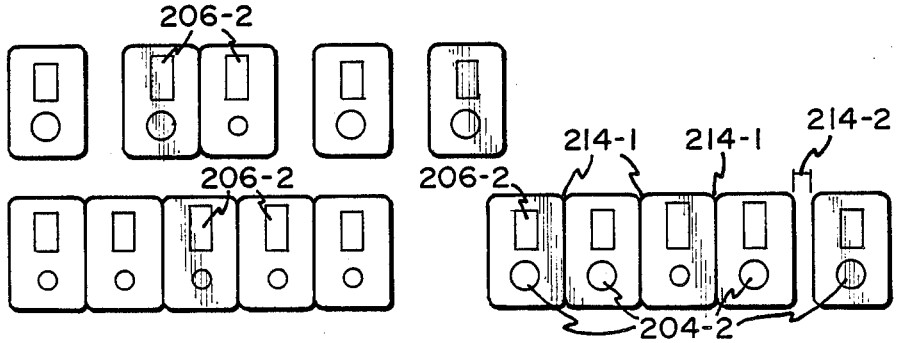
FIG. 33H 180-1
FIG. 33I 180-1
FIG. 33J 180-0 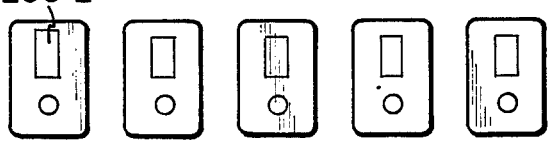
FIG. 33K 180-0 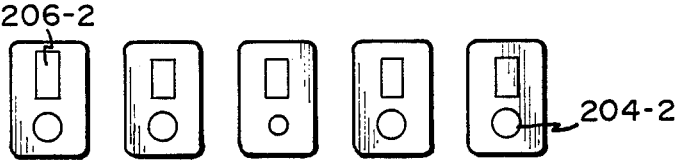

FIG. 34A
180-3
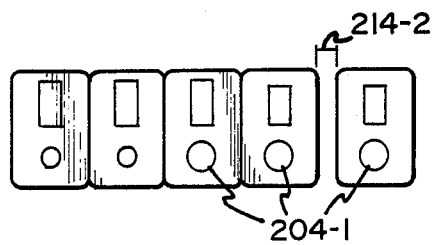
FIG. 34B
180-3
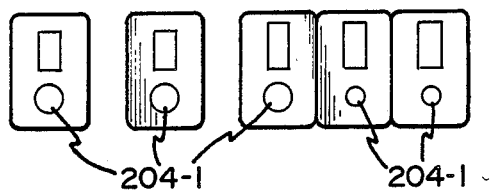
FIG. 34C
180-3
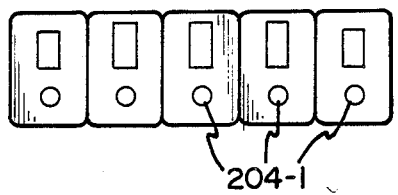
FIG. 34D
180-2
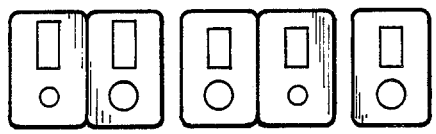
FIG. 34E
180-2
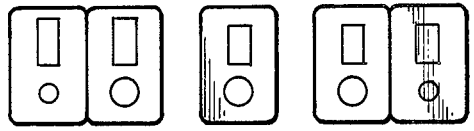
FIG. 34F
180-2
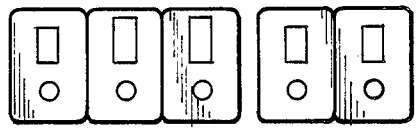
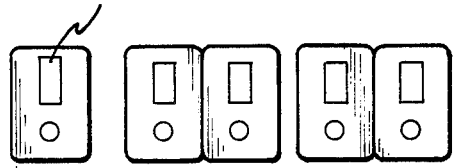
FIG. 33L
180-0
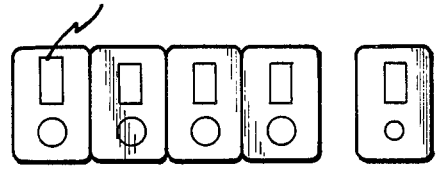
FIG. 33M
180-0

COMPUTERIZED GAMING SYSTEM

This application is a continuation-in-part of U.S. patent application Ser. No. 873,098 filed on June 5, 1986, now U.S. Pat. No. 4,760,527, which application is a continuation of U.S. Ser. No. 482,315 filed on April 5, 1983, now abandoned.

BACKGROUND OF THE INVENTION

In recent years the number of gambling casinos, as well as the amount of money handled by them, has increased dramatically. In addition to new and larger casinos in well-established gambling resorts such as Monte Carlo, and those in the State of Nevada, the recent legalization of gambling in New Jersey, has resulted in a proliferation of casinos in Atlantic City. Games provided by these casinos must be able to attract the casual participant, as well as the "hard-core" player, and must provide constant interest for a large number of players in an attractive, exciting setting. For the most part, casinos have relied upon such games as roulette, craps, blackjack, keno, and various manifestations of slot machines to attract their audiences.

Poker, the most popular gambling game in America, has largely been ignored by casinos. The basic reasons for this are that casino poker games are slower and offer lower proportional winnings than other casino games and, hence, are less exciting for the players and less profitable for the casinos. The playing action in poker is slow because each player must, in turn, make a decision for each round of betting (and/or discarding), and the casino dealer must shuffle the cards, deal to each player, calculate the house cut from the pot, and make change for the players. High-low split pot games, a very popular form of poker require even more time since he must divide the pot among the high and low winners. The physical limitations of a 52-card deck places limits on the number of players who may participate in a given game, and also limits the amounts that can be won by the players and the percentage taken by the casino. Also, since poker is a game of skill as well as luck, the casual player often feels intimidated when playing against strangers, some of whom may be experts and others of whom may play very conservatively.

It is, of course, known to provide electronic devices to simulate the playing of poker or other card games. The known devices, however, are limited insofar as they allow only one or two players to play the game simultaneously and, although individual machines may have means to store data relating to the number of cards played and discarded, the betting totals, etc., none of the prior art devices discloses the concept of using a central computer unit to electronically simulate a gambling game and store large amounts of data from a relatively large number of game players. It is also known to provide electronic gaming devices wherein a plurality of individual units are electronically linked to a central computer which records and tabulates playing data. Most of these known devices rely upon the performance of an actual event (i.e., bingo, keno, horse racing, etc.) and do not provide an electronic simulation of the event itself.

Individual booths having electronically simulated gaming events are also known, but these are typically self-contained units for individual participants and no means are provided to link the units with a central computer which controls the game, and tabulates betting and card information.

SUMMARY OF THE INVENTION

System for interactively playing poker with a plurality of players in which a game, namely poker, is electronically simulated on a plurality of individual consoles interconnected with a central computer unit which simulates and controls the game and, at the same time, tabulates and displays all betting information for each participant. The invention provides a system which simulates the actual playing of poker for a large number of participants, increases the speed of the game to maintain participant interest and increases the amounts of money that may be won in the pot. The game allows up to 52 players to play in one pot and requires that all bets, raises, calls or discards in the same poker game be accomplished during the same few seconds by all of the players, regardless of their number. Another embodiment allows as many players as whose consoles may be interconnected to the central computer to play in one pot.

This is accomplished by interconnecting a plurality of consoles, one for each player, to a central computer unit which electronically simulates the playing of the game, controls the visual displays in each console and tabulates the necessary betting information. Each console displays all of the player's own cards and either the up cards of the other players or the number of cards drawn by other players (depending upon whether stud or draw poker is being played). When a request is displayed, each player has the same few seconds in which to signal a call, raise, drop or discard.

The computerized game according to this invention minimizes the time required to handle money transactions between the players and the casino, and also provides a printout system as well as a backup system to minimize the effects of possible mechanical or electrical failures. The game not only retains the elements of skill and luck found in regular poker, but adds the factor of decision-making speed to enhance the enjoyment for the participant.

The central computer can, of course, be programmed to play all types of poker games: draw, stud (5,6 and 7 card), twist games (stud with a discard), hold-em games (some common cards for all players), etc. However, 7-card stud, high-low split-the-pot has been found to be the poker game that most individuals would prefer to play and the instant invention will be described initially in relation to this configuration.

To maintain the interest of the players who have dropped out of a pot, the computer may automatically enter that player in another pot. Since the number of players involved is relatively large, the size of the pot would be rather large relative to the amount that an individual player could call or raise in fixed limit games and, therefore, such games would be mainly ones in which many players would have a tendency to continue to call.

The game apparatus according to the invention also makes it possible to play poker games with hands that are outside the traditional realm. Hands consisting of more than five cards, such as 6-card straights, 7-card flushes and hands consisting of four of a kind plus three of a kind have previously been considered by poker experts, but to this point have been deemed to be impractical. In addition, new poker games, such as draw poker with two rounds of drawings or split-pot games with more than a two-way split are also made possible.

The system enables the poker game to be played much faster than current poker games because the cards are dealt at a faster rate, and the number of players and their individual speeds no longer control the pace of the game. The players can also make their decisions faster, because there are no cards to remember (all are still available for all players) and the video screen display provides a snapshot view of the overall poker situation. The player who likes action will get more action than ever before possible, while at the same time, the player who likes to wait for a good hand will not have to wait as long with this invention.

Statistics can be continually gathered and correlated by the central computer unit to determine possible changes in the types of poker played, and the time and betting limits to provide the largest pots in the optimal amount of time. The system can also be programmed for paramutual betting on sports events by all the players. In this mode, players could make a bet on the result of the next play of a sporting event displayed on their screen from a computer-supplied list of alternatives.

In one embodiment of the invention, all of the players are either in the primary game or in the consolation game, which consisted of those who had dropped out of the primary game. Alternate enhancements in the instant invention, allow several games to exist concurrently wherein players who drop from one game may be assigned to a newly formed game, thus providing greater flexibility in the time allowed for player decisions in any one game. Bonus winnings for poker hands of certain values have been added to increase the interest of all players in any game and to provide action for a single player during any period when there is an insufficient number of available players for a competitive game. Player turnover can now be controlled by varying the number of participants in the game. The current embodiments convey game play and facilitate game action for players, who possess varying levels of poker playing skill and experience in viewing a video screen, with such clarity that the previous needs for both practice hands and possible player panic situations have been eliminated. In order to attract the largest number of participants, the current embodiments provide a choice of different skill levels for casual players who desire a lesser test of skill than available in standard poker and for serious players who desire a greater test of skill.

In order to satisfy desires of both casino management and gaming regulatory commissions for minimum attendant personnel and maximum monetary control, another embodiment of the instant invention provides for the usage of automated monetary input and output equipment in each player console, hereinafter referred to as the automated cashier embodiment. Said embodiment reduces the structures and space previously needed for supervisory stations. In order to further increase the casino profit per square foot of floor space, the instant invention reduces the previous width and depth dimensions of the individual player consoles. Said size reduction necessitates enhanced means to restrict the view of a player's cards.

BRIEF DESCRIPTION OF THE DRAWINGS

FIG. 1 is a top plan view of the individual player console according to the invention.

FIG. 2 is a front view of the console shown in FIG. 1.

FIG. 3 is a side view of the console shown in FIG. 1 along line 3—3 in FIG. 1.

FIG. 4 is a rear view of the individual player console shown in FIG. 1.

FIGS. 10A–10F are layouts of the various screen displays appearing on the various consoles according to the invention.

FIGS. 23A and 23B are definitions of high poker values and their possible improvement.

FIGS. 24A–24F illustrates sample combined hand and values according to one embodiment of the invention.

FIGS. 25A and 25B illustrate expansions levels for separators and ranks according to one embodiment of the invention.

FIGS. 26A and 26B illustrate expansions levels for high and low according to one embodiment of the invention.

FIG. 31 is a definition of low poker values and their possible improvement.

FIGS. 33A through 33M illustrate the expansions for 5-carded hands when an additional card is allowed according to one embodiment of the invention.

FIGS. 34A through 34F illustrate additional expansions for 5-carded hands when an added plurality of cards is allowed according to one embodiment of the invention.

DETAILED DESCRIPTION OF THE PREFERRED EMBODIMENTS

General Configuration

Figure 9:
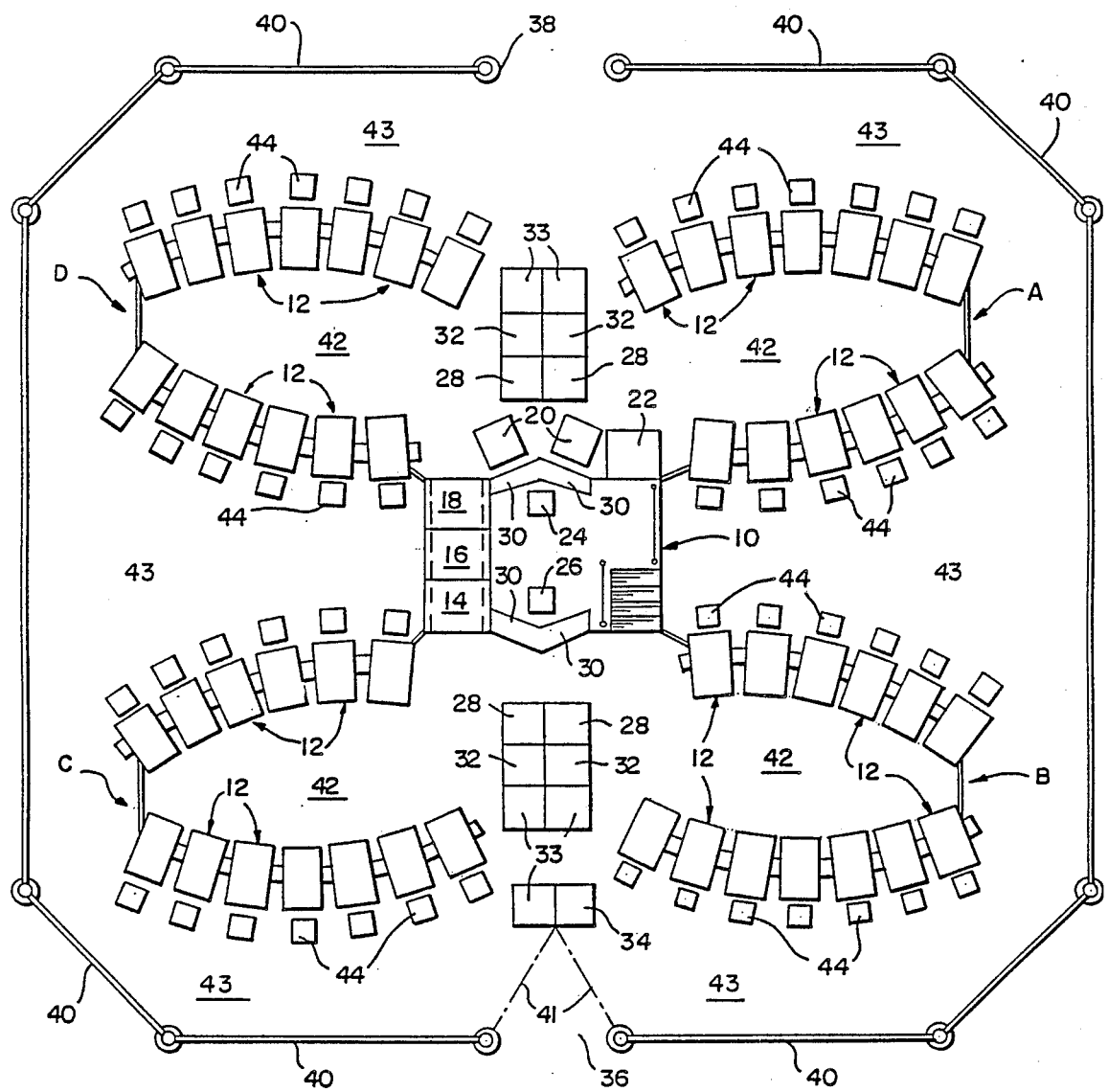
FIG. 9 is a top plan view showing an arrangement of a plurality of individual consoles and supervisor platform according the invention.

The overall configuration of one embodiment of the instant invention is shown in FIG. 9 and comprises a centrally located, elevated supervisor platform 10 with four player sections, A, B, C and D. Each of the player sections contains thirteen individual player consoles to enable 52 players to participate in the game at one time. Each of the individual player consoles, designated generally at 12, will be described in more detail hereinafter.

The supervisor control platform 10 may be elevated to give the game supervisor a visual overlook of each of the player sections. The central computer unit (CPU) includes a minicomputer ... 14, a teletype 16, status and program disks 18, audit tape drives 20, and an audit printer 22. Audit tapes 20 and printer 22 may rest on the gaming area floor, while minicomputer 14, teletype 16, and disks 18 are located on platform 10 and may rest on a shelf over a passageway connecting various areas which are restricted to game and casino personnel. Also located on control platform 10 are two supervisory stations 24 and 26, each station having a pair of overhead RGB monitors 28, and a pair of microprocessor keyboards 30. The RGB monitors 28 and the microprocessor keyboards 30 are interconnected with the central processing unit's minicomputer 14 to display information and to enable the supervisors to input certain data, which will be hereinafter explained in more detail.

A pair of NTSC monitors 32 are located such that they may be viewed from each of the players' sections and are used to display various information of interest to service personnel and to the players. NTSC monitors 33 provide additional information regarding play in the current game which may be of interest to the players, prospective players, and service personnel. The NTSC monitors 32 and 33, along with RGB monitors 28, may either be suspended from the ceiling or mounted upon pedestals to give them a height sufficient to be viewed by the players and/or by the service personnel servicing each of the players' sections. An additional NTSC monitor 34 is similarly mounted adjacent entrance-way 36. Monitor 34 provide game information and a listing of available seating to the incoming players. Entrance 36 and exit 38 are defined by barrier 40 which may be utilized to define the playing area. Barrier 40 may be a rope or other device which prevents passers-by from entering the game area while at the same time provides them a view of the players in order to generate an interest in the game. Players enter the game area at entrance-way 36 and proceed to the right or to the left to an open set indicated on entrance monitor 34. A player departs the gaming area by proceeding to exit 38. Entrance 36 may be restricted to player use, and a pair of light beam announcers 41 may be used to aid in the orderly and swift entry of new players into the game.

Each of the player sections A–D contain two rows of player consoles, one row having seven such consoles, the remaining row having six. The rows define a service area 42 between them. This service area enables cashiers or other service personnel ready access to each of the players. The layout of the game area also enables the supervisors to maintain a visual check during cash transactions between the cashiers and the players. Cashiers and other casino personnel would normally enter and exit the gaming area at exit 38 and their movements would normally be restricted to control platform 10, services areas 42, and a passageway adjacent to the platform which connects the service areas. Player movement in the game area as described above would be in a normally one-way direction in the player aisles 43 along the outside of the player sections. Thus, there are two different physically defined areas: one for the players and one for all other service personnel in the game area. Any movement behind a player should be limited to an occasional player proceeding in a predetermined direction.

Although monitors 28, 32 and 33 are shown as being incorporated into a common module that may be either suspended from the ceiling or attached to the floor, they could be mounted separately without exceeding the scope of this invention.

Teletype 16 may be replaced by video terminal 17, and audit tape 20 may be replaced by audit removable disk unit 21. In the automated cashier embodiment, another printer 23 may be required to produce documents which satisfy federal and state regulations regarding such automated transactions.

The CPU minicomputer 14, teletype 16 (or video terminal 17), status and program disk 18, audit tape drive 20 (or disk unit 21), audit printers 22 and 23 may, in totality or in part, be located in a secure area either adjacent to or remote to the player consoles 12.

Figure 8:
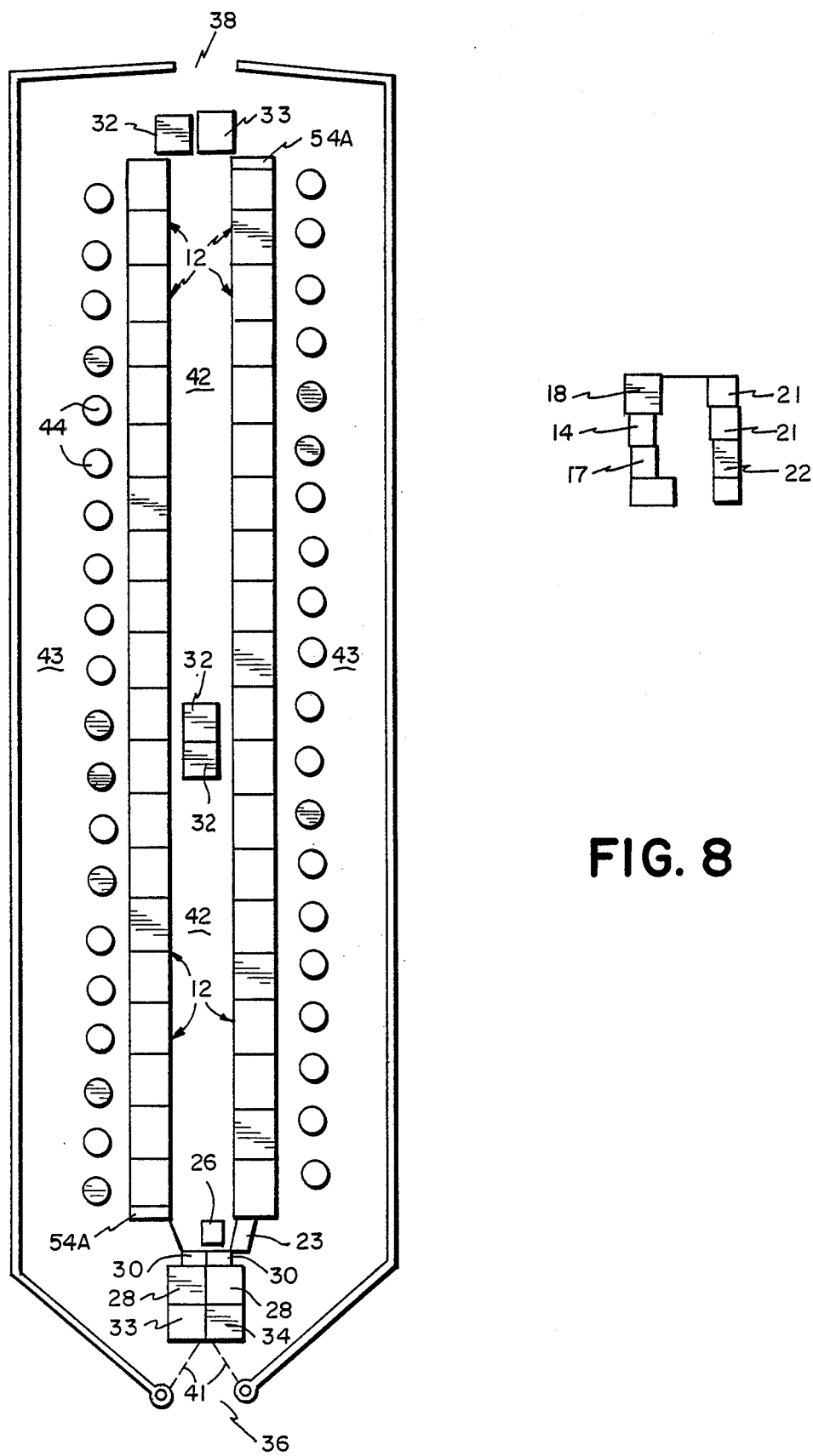
FIG. 8 is a top plan view showing an arrangement of a plurality of individual consoles and supervisor station according to an alternate embodiment.

The automated cashier embodiment renders the location of supervisory stations 24, RGB monitors 28, and keyboards 30 optional, and eliminates the need for an elevated platform. FIG. 8 shows an arrangement for any number of consoles in two substantially straight lines with a single service area 42. The consoles may also be arranged in circular clusters with a service area 42 for each cluster, or a combination of the straight and circular aligned consoles. Arrangement of the consoles in a straight line without any service area behind the consoles is also possible if the consoles are modified to be serviced from the front. The location of the hopper 75 and microprocessor 72 in a position not directly in front of the player affords easy console access from either front or rear.

Quite obviously other configurations may be utilized, depending upon the physical limitations of the available area within each casino and fire regulation considerations, without exceeding the scope of the invention.

INDIVIDUAL PLAYER CONSOLE

The individual player console 12 is shown in detail in FIGS. 1–6. This console construction provides a comfortable, private, sturdy, non-confined area for the player to participate in the game, while at the same time providing complete privacy for each of the individual card displays. The console is also designed to provide a compact storage area for the video display and its associated electronic equipment while giving easy access to this equipment for service and/or replacement. The console design provides sufficient space for the player and for the placement of beverages, etc., in such a way as to not interfere with the players' access to the display screen and the actuating buttons. The individual console and its location with respect to adjacent consoles allows sufficient space for substantial changes in player position and posture, plus allows player entry and exit with minimum distraction to the surrounding players.

In the automated cashier embodiment, the console also contains all hardware needed to accept, store, and output coins or tokens.

All references with respect to left and right sides will be made in accordance with the players' left and right side as he sits at the machine on stool 44 facing the viewing screen 46.

All references with respect to front and rear are made in accordance with the front of the console being nearest to the player as described above. Attached to the underside of screen 46 is light filter 47 to be described hereinafter. The console comprises side members 49 which are interconnected by lateral front panels 50, and lateral front L-shaped panel 51 and armrest member 54 as shown in FIG. 2. Horizontal shelf member 57 located, preferably on the left side of the view screen, is attached to the left side member 49 and supported by member 58 which extends from the lower surface of shelf 57 to the upper surface of armrest 54. Shelf 57 provides a flat, horizontal surface to support beverages, ashtrays, or other player convenience items. The left half portion of shelf 57 and armrest 54 may be utilized by another player if there is another console to the left of console 12. If there is not another console to the right of console 12, a properly supported armrest member 54A may be added to the right side of console 12.

Side members 49 are further interconnected by cross member 64. There may be a door which covers the rear of the console between side members 49. Member 64 is disposed in a horizontal orientation to provide a shelf for console microprocessor unit 72, as shown in FIG. 3. The details of this unit will be described in more detail hereinafter.

Members 67 and 69 provide a shelf and brace for microprocessor keyboard 74. Keyboard 74 permits the cashier or service personnel to enter transactions between them and the player into the central processing unit. In the automated cashier embodiment, member 67 provides a shelf for coin hopper 75 and control board 79 may be attached to the underside of shelf 67. In said embodiment, keyboard 74 may rest on cross member 64 since access to 74 would be rare.

Shelf 81 and lateral panel 83 and rear lateral panel 85 define an area for money storage that is accessible to the player. The rear of viewing screen 46 terminates at and rests upon panel 83. Screen 46 slopes down from front panel 51 to lateral panel 83 to reduce reflection on the screen and to maximize access to the money storage area. Side member 87 rests upon shelf 67 and provides a left support for shelf 81 and separates shelf 81 from area defined by shelf 67.

The console video display monitor 90 is located between side elements 49. Transparent panel 91 provides a cover for the face of monitor 90. Monitor 90 rests upon adjustable support 93. Vertical adjustment of support 93 may be necessary to facilitate removal and or servicing of the monitor from the rear of the console. Light filter 95 rests on the face of monitor 90.

Figure 5:
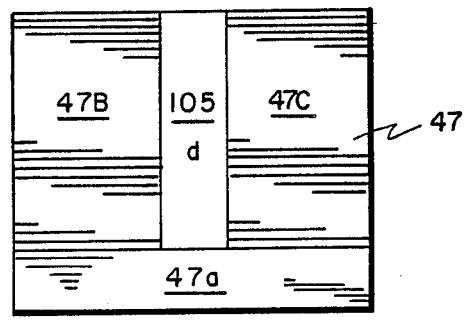
FIG. 5 is a partial top view of the player console taken along lines 5—5 in FIG. 3.
Figure 6:
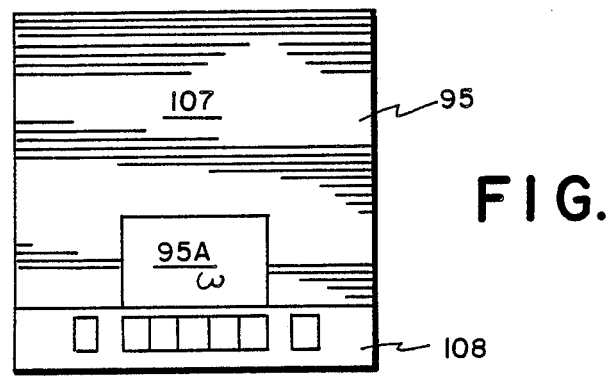
FIG. 6 is a partial top view of player console taken along lines 6—6 in FIG. 3.

FIG. 3 shows the locations of top light filter 47 and bottom light filter 95 as viewed from the side of console 12. All light emitted from the screen face of monitor 90 which is visible to any individual passes through both filters. FIG. 5 shows the top view of filter 47, which comprises front section 47A, side sections 47B and 47C, and center section 105. Filter 95 comprises front center section 95A and remaining area 107. FIG. 6 shows a top view of filter 95 as oriented with button strip 108. Filter section 95A is a neutral linear polarizer possessing a balance of luminous transmittance and extinction transmittance for the visible light spectra such as a Polaroid Corporation HN38 polarizer. Filter section 107 is a neutral linear polarizer whose axis of polarization is at right angles to the axis of polarization of section 95A. The function of section 107 is to reduce the contrast of the filtered light of the entire screen face and may have the same luminous and extinction transmission characteristics as section 95A, or 107 may possess more luminous transmittance and less extinction transmittance than 95A. Filter sections 47A, 47B, and 47C are neutral linear polarizers possessing approximately the same luminous and extinction transmission characteristics as filter section 95A. The axes of polarization of filter sections 47A, 47B, and 47C are all the same and are all at right angles to the axis of polarization of filter section 95A. Filter section 105 has no polarization characteristics and may be a hole in filter 47.

For any fixed vertical distance from filter 47 to 95, as distance d between filter 47B and 47C (the width of 107) is made smaller, the portion of the screen face under 95A which can be viewed from either side becomes smaller. Distance d is less than the width of 95A. However, distance d should be sufficient for a one-eyed player to view the entire area under filter 95A from some distance above filter 47. The player views the entire width of the screen face by positioning himself in the approximate middle of filter section 105. The one-eyed player or player with poor uncorrected vision in one eye will need to center the good eye in the approximate middle of filter section 105 and perhaps move somewhat closer to filter 47. The distance w from filter 105 to the front edge of filter 47A is the primary factor in determining the portion of the area of the screen face under 95A which can be viewed from the front. The player can view as much as he desires of button strip 108 (and his finger tips when pressing the buttons) by leaning forward.

Figure 7:
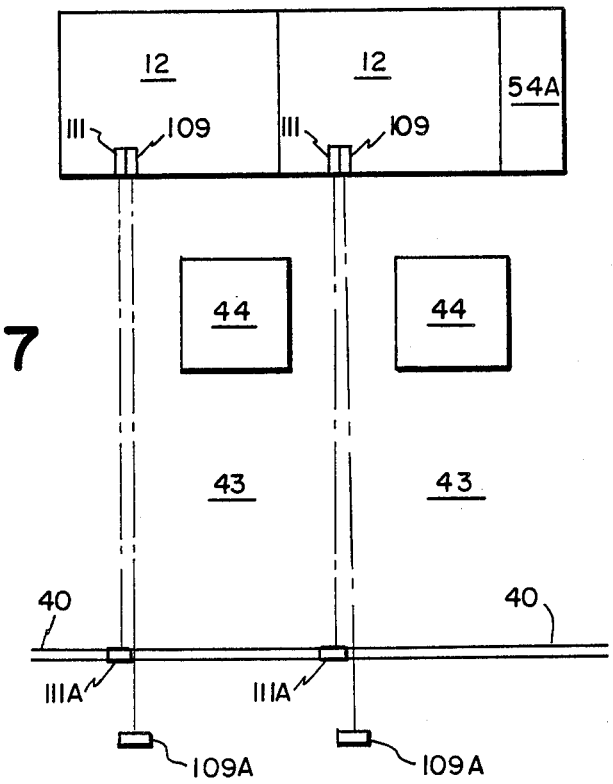
FIG. 7 is a partial top plan view showing two individual player consoles.

Obviously, if an intruder placed his head over the console, the afore described view protection would be diminished. Player could physically cover his screen, or in another embodiment, protection against physical intrusion can be provided by the use of light beam announcer 109. Announcer 109, comprising a beam transmitter and a beam receiver, is attached to the underside of armrest 54 and its light beams passes through a small hole in panel 51. Light beam reflector 109A may be attached to any fixture such that tall passers-by will not break the light beam. FIG. 7 shows a simple configuration which provides automatic intruder protection by activating microprocessor 72 software to remove the elements on the screen face which are below filter 95A whenever the pulsed-light beam between announcer 109 and its reflector 109A is interrupted. A second announcer 111 is located next to 109. The configuration of FIG. 7 also serves another function in the system as will be described hereinafter. Light beam reflector 111A may be attached to barrier 40 or to any structure behind player aisle 43.

Panel 115, supported by rear panel 85, is a holder for game playing instructions which may be illuminated. In the automated cashier embodiment, structure 117 contains coin input, acceptance, return, and diversion into the hopper hardware. Coin output from the hopper leaves the hopper at hopper exit 119, enters exit funnel 121, and is thence stored on shelf 81 for player access.

The front of panel 51 may be padded, as indicated at 120, to cushion the impact to the player's hands, arms or knees should be accidently come into contact with it.

Although the console has been described in terms of individual pieces and elements, quite obviously it may be formed integrally should the console be fabricated from fiber glass, plastic, or other moldable material. The respective elements of the console may be attached to each other by any known means, such as nails, screws, glue or the like. The electronics contained in each of the plurality of player consoles may comprise the following terms:

| | |
|---|---|
| 1 Microprocessor/Keyboard | IBM A210D |
| 1 EGA Interface | NEC GBS-1 |
| 1 EGA Monitor | NEC Multisync |
| 1 Digital I/O Interface | Data Translation DT2817 |
| 1 Set pressure-sensitive sealed membrane buttons | Sheldahl 1000-19 |
| 1 IEEE-488 Interface | Telmar PC-Mate |

For the automated cashier embodiment, each of the plurality of consoles may additionally comprise the following items:

| | |
|---|---|
| 1 I/O Control Board | Consulting Engineering JS-1 |
| 1 Coin Hopper | Bally AS-3105-273 |
| 1 Hopper Control Board | Bally AS-2981-5 |
| 1 Coin Comparitor | Coin Mech CC-40 |
| 1 Bill Acceptor | Rowe OBA-4 |

Control Platform and Adjacent Area

As indicated previously, the control platform contains the CPU minicomputer 14, teletype 16, and status and program disks 18. In addition, each supervisory position contains microprocessor/keyboards 30 and RGB monitors 28. The RGB monitors 28 allow each supervisor to keep advised of the progress of the game, status of each player, etc. Furthermore, the raised position of the control platform allows the supervisors to maintain visual supervision of the playing area.

The hardware components of the central computer processing unit may comprise the following elements:

| | |
|---|---|
| 1 Minicomputer | Data General Nova 4/S with 16 slots |
| 1 Teletype | DG 6080A Dasher TP1 Subsystem, printer, keyboard, interface, cable |
| 2 Magnetic Tape Transports | DG 6027 Tape Subsystem, 1 transport, controller, cables, DG 6023 Tape Transport |
| 2 Disks | DG 6030 Dual Diskette Subsystem, 2 diskettes, controller, cable |
| 1 Printer | DG 6086 Dasher LP2 Subsystem, printer, controller, cable |
| 2 IEEE-488 Controllers | Consulting Engineering, Gaithersburg, Maryland RBI-417 (4 boards each) |

Each of the supervisor stations on the control platform may comprise the following:

| | |
|---|---|
| 2 Microprocessors | IBM A210D |
| 2 Keyboards | Included in above |
| 2 Color Video Interfaces | IBM-C156U |
| 2 RGB Monitors | Amdek Color-II Monitor |
| 2 IEEE-488 Interfaces | TelMar PC-Mate |

Each supervisor station may contain two sets of electronic equipment so that two supervisors can operate at each station during times of heavy player turn-over, such as the opening and closing of the game. During other times, one supervisor may operate each station and the redundant set of electronics can be used for immediate back up in the event of hardware failure. If only one supervisor is operating a station, the second RGB monitor may be designated as a supervisor alternate monitor 28A and may display game play. The contents of the monitor displays for monitors 28 are described in more detail hereinafter. The monitors 28 may be located generally to the front of the supervisor and he may view the playing sections by looking to his right or left.

Audit tapes 20 and printer 22 may be located on the floor of the gaming area in front of supervisor station 24. The floor area in front of supervisor station 26 may be reserved for other casino usage.

The particular constructions of the control platform per se is not believed to be germane to the invention and, suffice to say, any structure supporting all of the necessary hardware and allowing the supervisors to have visual contact with the player area, is considered to be within the scope of this invention.

Overhead Displays

Overhead displays 32, 33 and 34 are located at various points in the playing area. Displays 32, used to provide information to the cashiers and food/beverage servers, are located adjacent the service area 42. Displays 33, showing play in the primary game (normally 7-card stud) may also be located within the service areas and adjacent the entrance to provide information of interest to the cashiers and to the prospective players. Display 34 located adjacent the game entrance provides prospective players, with information needed to enter the game, such as seat availability, minimum required buy-in stake, game rules and betting limits.

In FIG. 9, overhead displays 32 are shown at four locations, displays 33 at five locations, and display 34 at one location. The exact number and location of these overhead displays is not critical to the invention, but their number and location is limited only by their ability to be read by the persons to whom the information is directed.

Each of the overhead displays may comprise an NTSC monitor (such as Sony XK 1901), a microprocessor (such as IBM A210D), a color video interface (such as IBM C156U), and an IEEE-488 interface (such as TelMar PC-Mate). Display 34 may additionally comprise a pair of pulse-beam announcers 41 (such as Tandy 49-201) located at knee level adjacent the entrance 336 to signal the entry of a player into the game area, and digital analog input interface (such as IBM C160U).

Display Contents

The elements which may comprise the contents of the displays on monitor 90, supervisor RGB monitors 28, 28A and NTSC monitors 32, 33 and 34 are shown in FIGS. 10A through 10F.

The upper portions 123 of each screen on player monitor 90 displays information common to all players in the hand. This display will show the rules and limits of a hand prior to the beginning of hand and then display the up card for all players in stud hands, or the number of cards drawn by each player in draw hands plus symbols indicating which players have raised, or gone all in for the pot. The display area 124 shows the name of poker game being played plus an explanation of the symbols shown in portion 123. The pot display element 126 shows the amount of money currently in the pot. The decision element 128 shows any decision that the player must now act upon, such as discard or the amount bet.

Figure 27:
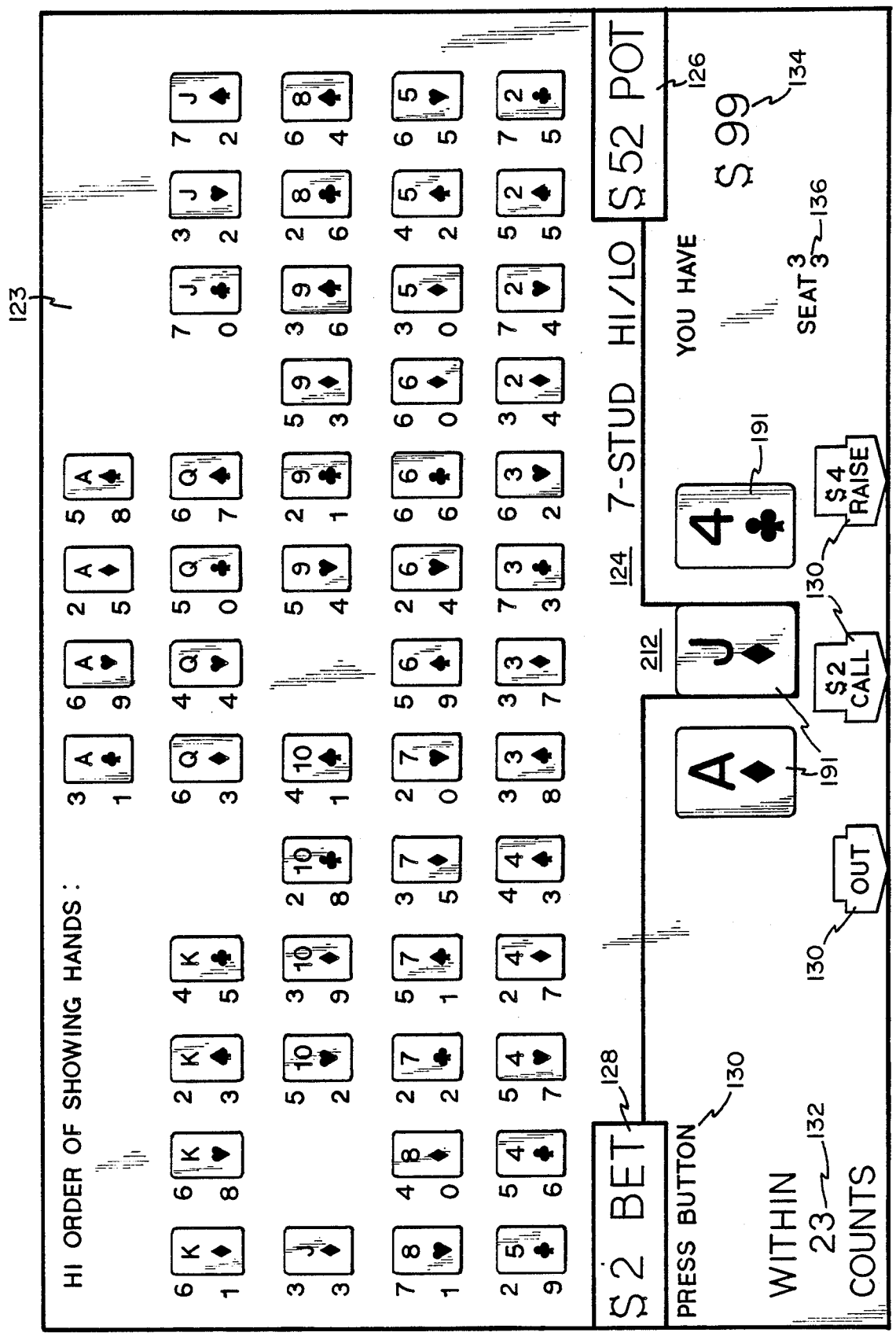
FIG. 27 is a view of the video display displayed on each player console for a 7-card stud poker game according to the invention.

The lower portion of the display on player monitor 90 contains instruction area 130 which indicates how the player will signal his decisions and a timer area 132 which shows the remaining time within which the player must signal his decisions. This lower portion also contains information unique to each player: his seat number area 134; his remaining stake area 136; his entire hand in area 138; and the value of his high and low hands in area 140. In one embodiment, areas 138 and 140 are combined into area 141. A detailed description of displays appearing in elements 123 through 141 at the start of a 7-card stud hand is shown in FIG. 27.

The display of the player's own hand in area 138 and its values in area 140 is controlled by the appropriate push-button in button strip 108. When the hand is initially displayed, a first push of the button will cause the hand to disappear, while a second push of the button will make the hand reappear. This show/hide button provides additional security to the player and prevents anyone from inadvertently looking at his cards.

Supervisor RGB monitor 28 may contain: status information in area 142 about each seat in his section(s); directions in area 144 for the supervisor, such as the need to verify money in or out of the game; an image in area 146 of any keyboard input by the supervisor; and other information in area 148 as shown in FIG. 10B.

The information in status area 142 may include: seat number; stake left; total money put into the game by current player; a flag if the console status is "panic"; the total number of "panics" for the console today; the date of last maintenance for the console; position in the cashier queue, if any, or identification of cashier present; and an indication of a seat being vacant; or which game, if any, the player is in. Other supervisor information in areas 148 may vary for supervisors, with seat availability information being displayed to the supervisor at station 26, and cashier money and house cut amounts being displayed to the supervisor at station 24.

If two supervisors are manning the supervisor station, each of the two monitors 28 will contain the status in area 142 for a different player section. If one supervisor is manning the console, one monitor 28 will contain the status for the two sections under his control while the other monitor may display the same game elements as on areas 123, 124, 126 and 128 on player monitor 90 for the primary game, plus a consolation game summary in area 150 as seen in FIG. 10C. Summary area 150 may include: the name of the poker game; the amounts in the pot and currently bet; and the number of players who are in the pot, have raised, "panicked", or gone all-in. If the consolation game is draw poker, summary area 150 may also include the number of players who have drawn the varying number of discards. Between consolation hands, 150 may contain promotional or other messages.

Overhead monitor 32 also shows the same display as in area 150 plus, for the section to which it is directed, a list of players desiring food/beverage service in area 152, a list of open seats in area 154, and cashier directions in area 156 as shown in FIG. 10D.

Overhead monitors 33 may show the same display as in elements 123 through 128 on player monitor 90. Entrance monitor 34 may show the consolation summary as in area 150 (or promotional messages as previously mentioned), minimum buy-in stake and overall rules and limits in 158, and seat availability information in 160. Display element 160 may show the open seat number for the next waiting player and an arrow pointing in the direction of the seat with respect to the location of monitor 34 so that waiting players may swiftly and simply be directed to an open seat. If no seats are available, area 160 may display the number of players who are all in for the pot or who have almost exhausted their stakes so prospective players will have an indication of how long a wait there may be for open seats.

The displays appearing on any of the game monitors can be generated by graphics or by characters. In graphic displays, each dot on the screen, called a pixel, can be given color to form any desired shape. In character displays, a fixed series of pixels (for instance, eight horizontal × eight vertical, or eight horizontal × fourteen vertical) are defined into a foreground color and a background color. Several characters can be combined to create one shape. Character displays are limited only in that at most two different colors can appear in the fixed set of pixels.

Each character set for a given make of equipment contains all letters (usually in upper and lower case), numbers, plus many special symbols—some including those for suits of a card deck. In addition, enhanced graphic EGA monitors provide for the addition or substitution of additional user defined characters.

In monitors 90 and 28 for the player console and supervisor station, the horizontal resolution needed for the game displays can only be achieved on a monitor screen that has separate "guns" for the basic colors of red, blue, and green, with all of the other colors being some combination of these basic colors. In present technology, such RGB and EGA monitors are limited to relatively small sizes. Since overhead monitors 32, 33 and 34 must be read from greater distances than the monitors in the player consoles and supervisor stations, current RGB monitors are unsuitable due to their limited size. Screens of larger sizes are only available in standard composite signal monitors (NTSC). However, such composite signal monitors can display only approximately 40 columns of characters across the screen, whereas the RGB monitors are capable of displaying 80 characters and EGA monitors 120 characters.

Cards shown in display element 123 normally occupy an area two characters wide by two characters high. At least one line is left above each card and may be used to display information regarding that particular player (i.e., a raise, or all-in symbol). If a large number of players are in a pot each card may occupy an area one character wide by two characters high.

The player's attention may be directed to various screen elements by momentarily emphasizing said element or darkening the other screen elements.

Program Logic

The system for controlling the game consists of one central computer and its peripheral devices (CPU) which communicates with various microprocessors located in the supervisor and player consoles. The supervisor consoles initiate game activities while the player consoles display information, and report cashier and player transactions. The overhead display consoles merely display information. The CPU controls the simulation of the game and the communications between all of the components by means of an IEEE-488 interface system. IEEE-488 terminology is used in the descriptions wherein one unit is designated by the CPU to be the "Talker" and any number of other units are designated as the "listener". However, the IEEE-488 systems has means for any "listener" to initiate a "service request" which will enable it to become a "talker".

Figure 11:
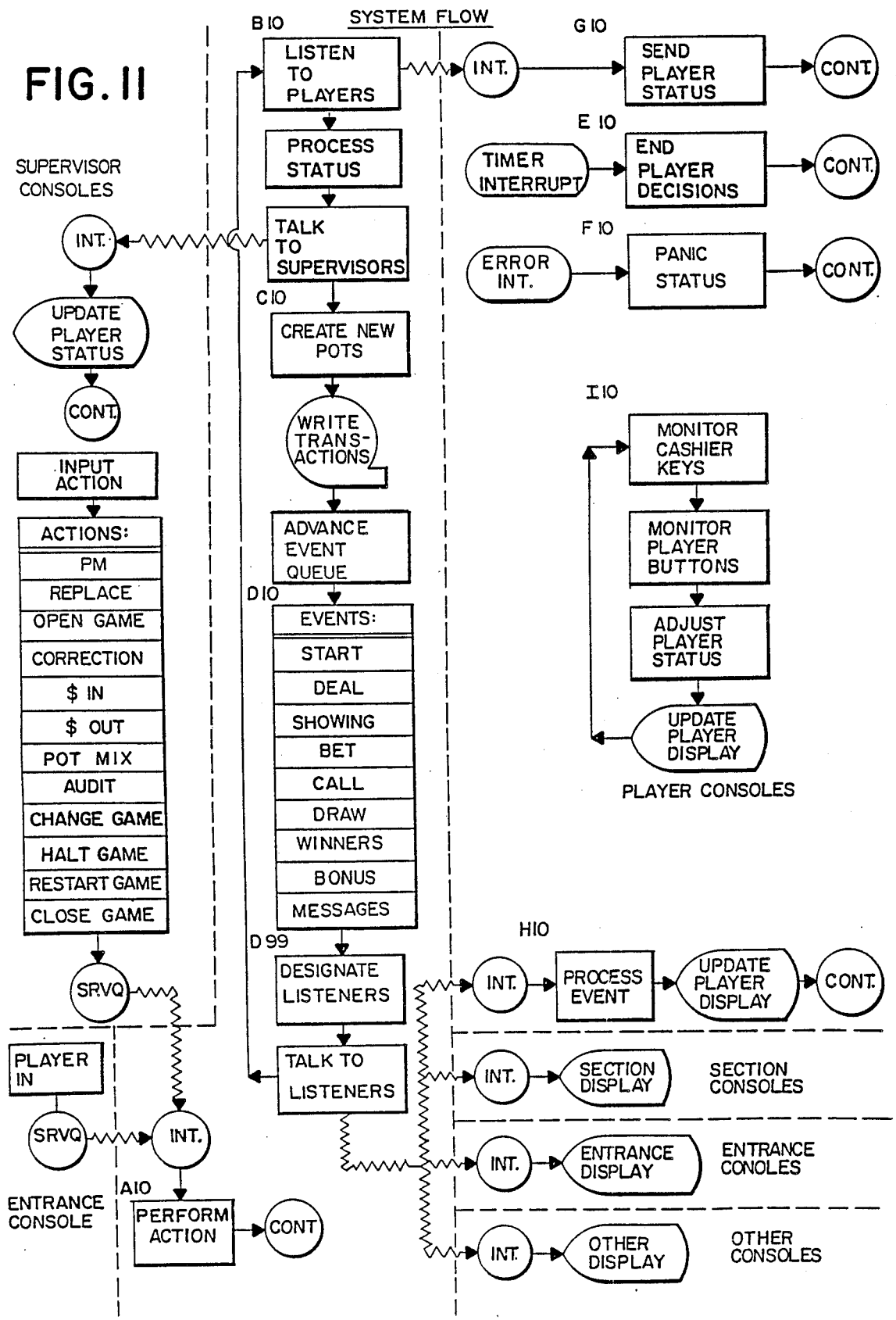
FIG. 11 is a flow-chart illustrating the logic sequence in the overall system according to the invention.

The overall logic for the entire system is shown in FIG. 11, while the subsystem logic for the CPU, supervisor consoles, the player consoles, etc., are shown in FIGS. 12 through 20. Although the CPU controls the entire system, the supervisor console will be described first, since it supplies the instructions to the CPU for initiating the game. The logic flow diagram for the supervisory console is shown in FIG. 11. Various CPU processing is initiated by input from the supervisory keyboard, which input is checked by the software and may result in a request for additional or corrected input. This input is listed in FIG. 11 and further described in FIG. 12 where the resulting CPU actions are also described. The final step in the processing path is a service request so that the desired action can be processed by the CPU. The supervisor control processing may be interrupted at any point to receive information from the CPU about the status of any player. This information updates the about the status of any player. This information updates the status display for a player on the supervisor's console and may require no positive action on the supervisor's part. However, if the player's status change is to put money into or take money from the game, the supervisor would first perform the displayed requirement (visually checking the amount, talking to the cashier by telephone, etc.) and then press a key on his keyboard to signal the CPU and hence the cashier information display that the player status is approved or made final. In the automated cashier embodiment, the preceding supervisor verification of player money into or from the game is eliminated.

Figure 14:
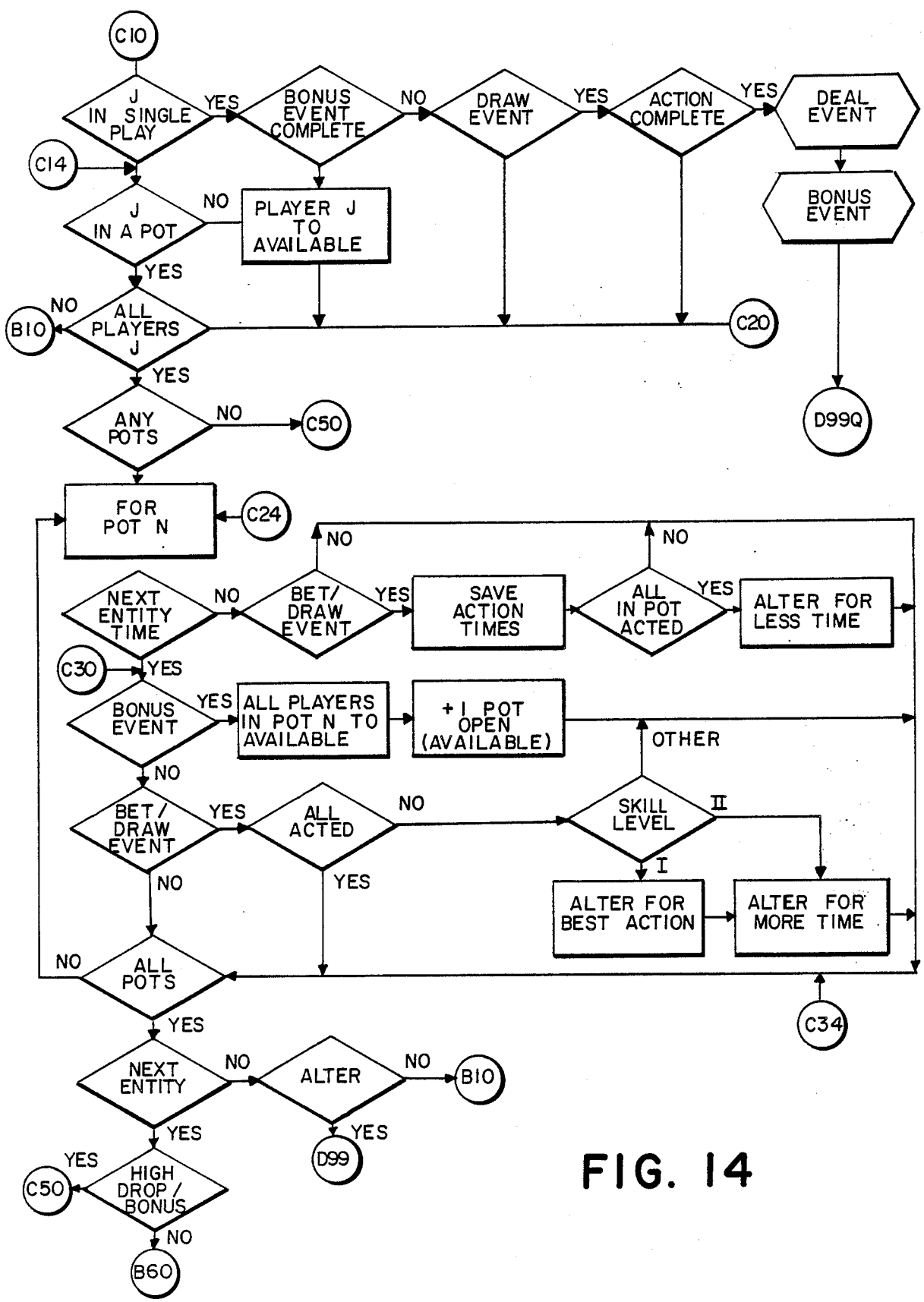
Figure 15:
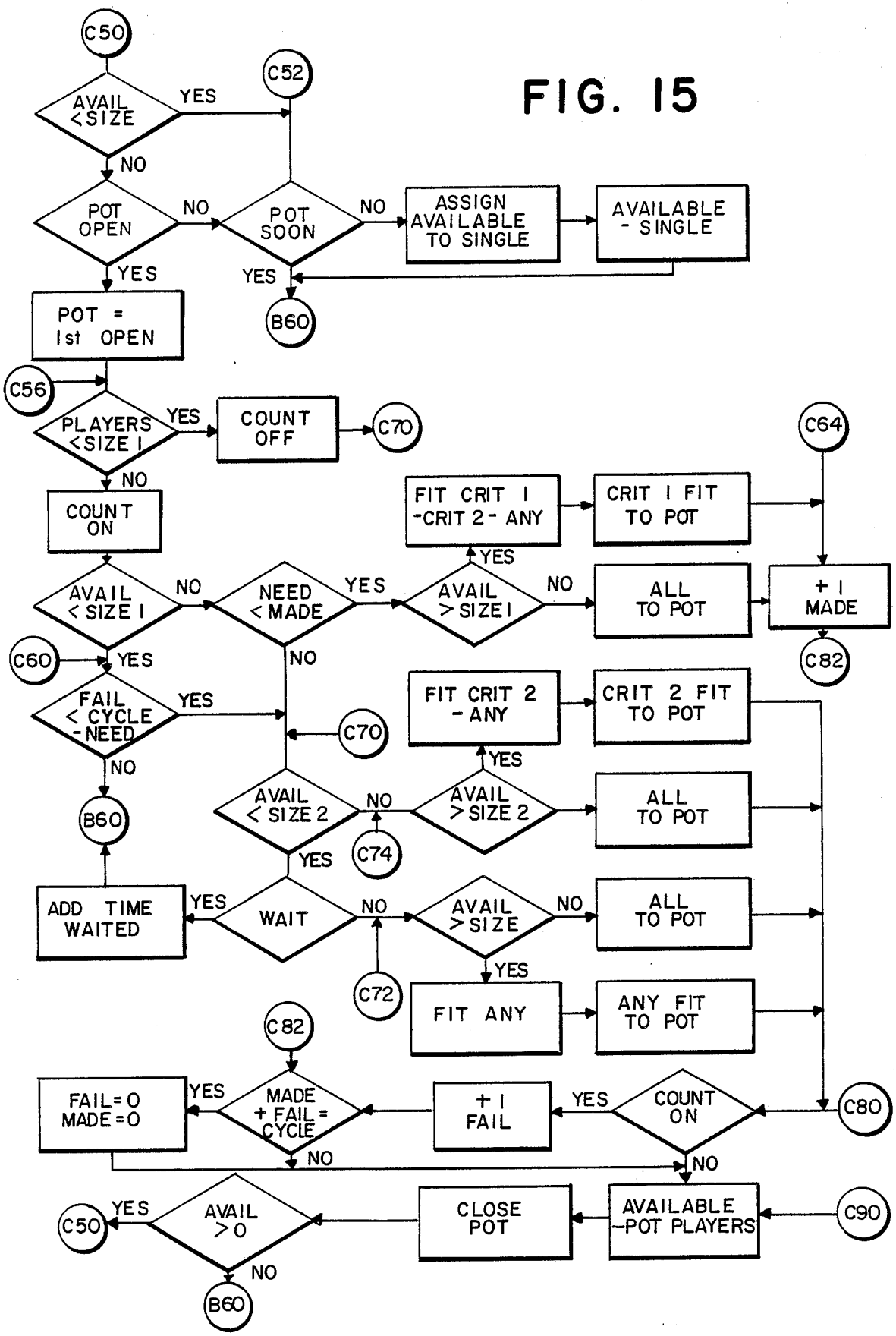
Figure 16:
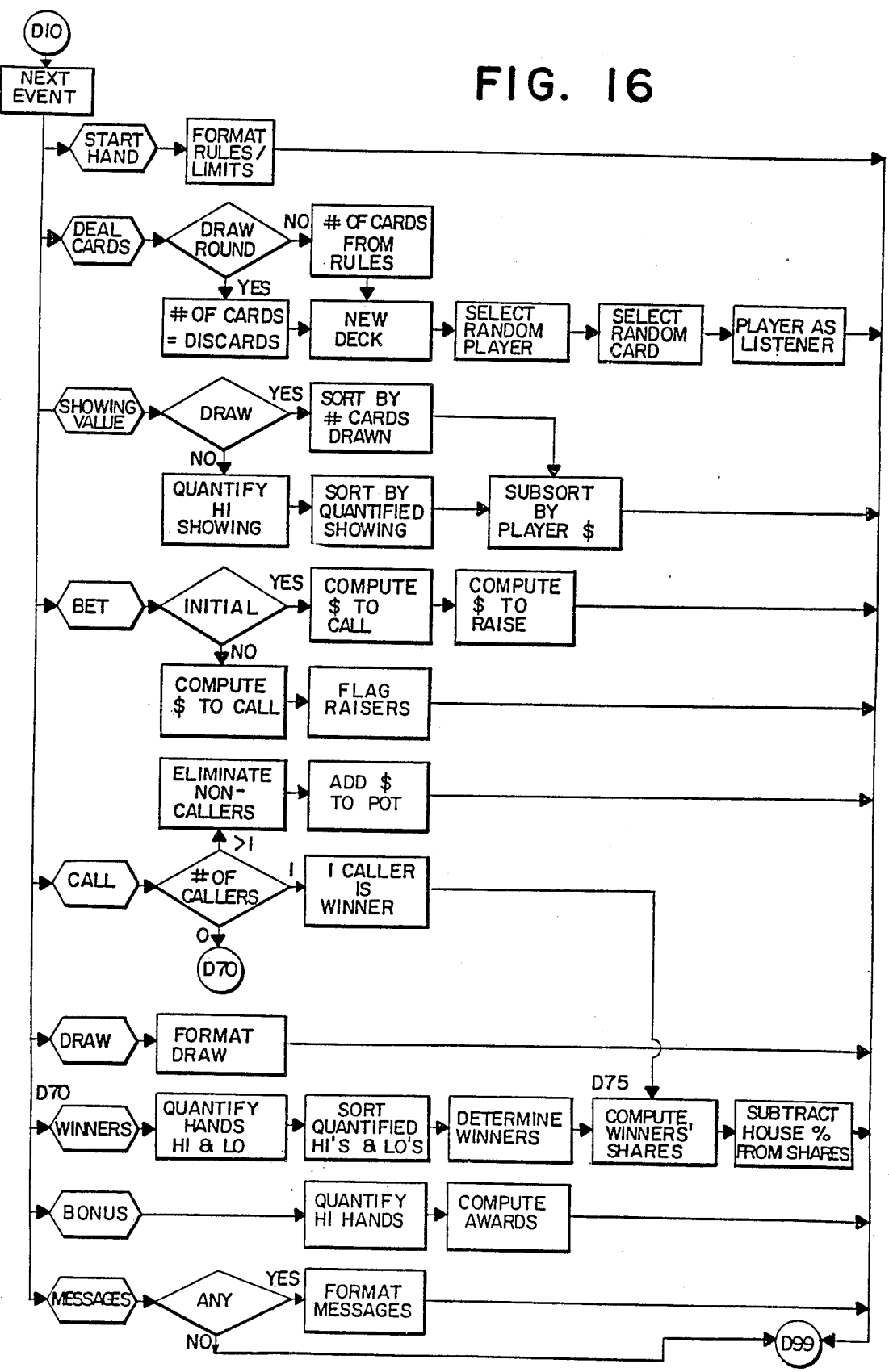

The CPU processing cycle, as shown in detail in FIGS. 12 through 17, consists of receiving information from each player console, processing this information, and sending any changes in player status to the supervisor console. The CPU will also control the generation of transaction records on magnetic audit tapes 20 and the printing of the current stake left for each player on printer 22. Game transactions may include all supervisor, cashier, and player inputs which are reported to the CPU plus cards dealt and winnings awarded by the CPU. These transactions are recorded for later normal audit processing and for recovery processing in the event of catastrophic system failure. They may also be utilized to compute statistics relating to amount of money in the pot, player reaction time, etc., for various hands. The CPU also maintains several software queues. Such a queue is a list of items in which items are taken from the front of the list when the queue is active. Items are normally added at the end of the list, but may be placed anywhere in the list. Control of the game play is achieved by means of an event queue, where the queue may contain sequential events for more than one game. Time control of event queue is maintained by CPU timer 170. As will be described in detail hereinafter, the computer may provide an alternative game of 5-card draw poker for those players who have dropped out of the 7-card stud game prior to the appearance of their third up-card. Table 4, shows the event structure of said embodiment in terms of event time entities which are hereinafter described. An alternate embodiment provides for a flexible distribution of players into several concurrent games as shown in FIG. 15. A list of the game events is shown in FIG. 11, while the events and their processing are described in more detail in FIG. 16. After each event, information is sent to the player's and supervisor's consoles and to the entrance displays. The CPU processing cycle may be interrupted to perform actions requested from the supervisors input console or as the result of a new player passing the entrance console light beam 41, which may also result in the sending of this information to other consoles.

The player console processing cycle is shown in FIGS. 18 through 21 and consists of monitoring any input from the cashier's keyboard or the player's buttons, adjusting the player's status accordingly, and creating the player's console display screen. This cycle may be interrupted to send player status to the CPU, to show the remaining time for a player decision, or to receive event information from the CPU.

-The system also contains overhead display and entrance display consoles. All of these consoles receive information from the CPU and display it, and only the entrance console may provide input from these devices to the CPU.

Figure 12:
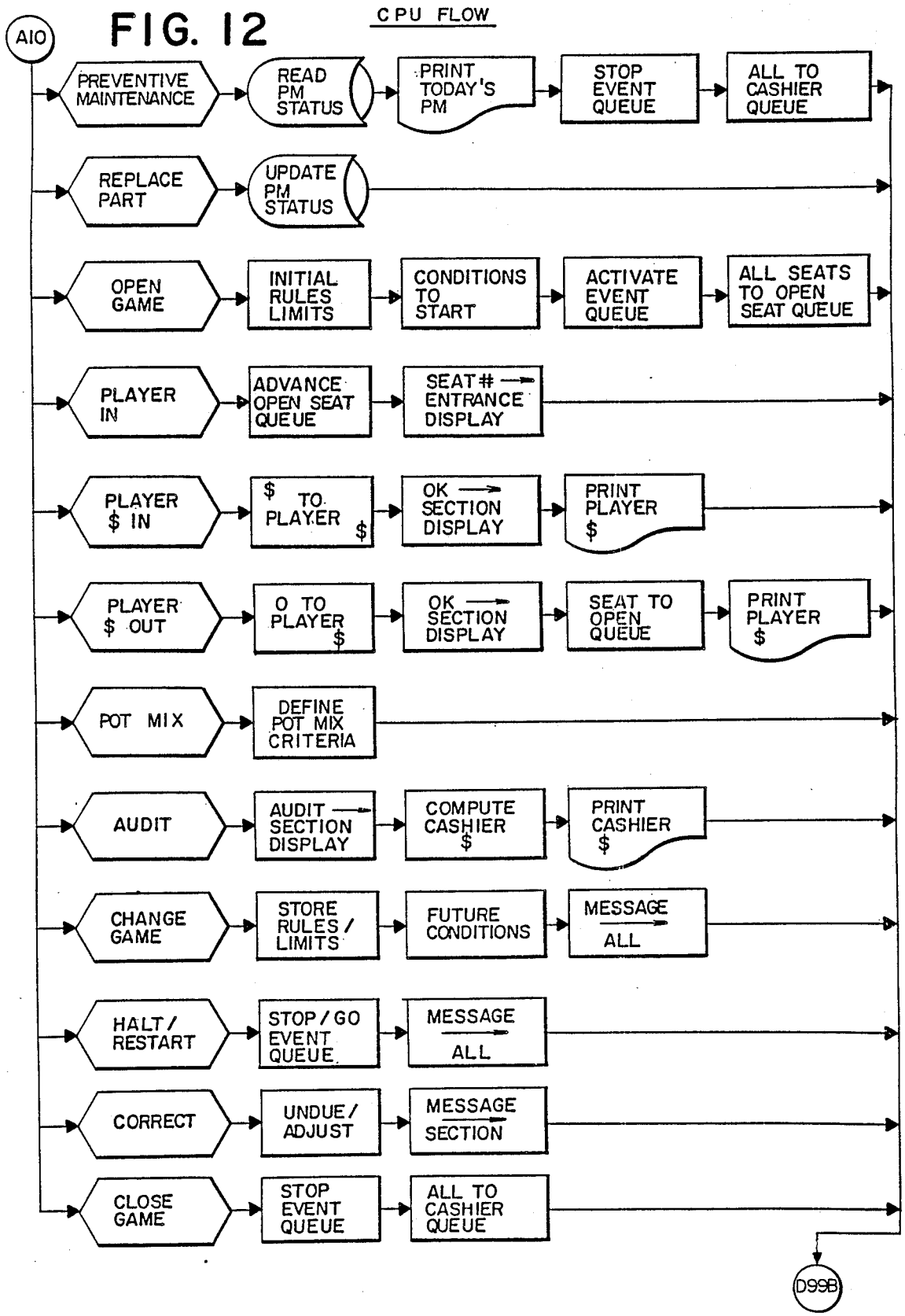
FIGS. 12 through 17 are flow-charts illustrating the logic sequence for the central processing unit program according to the invention.
Figure 13:
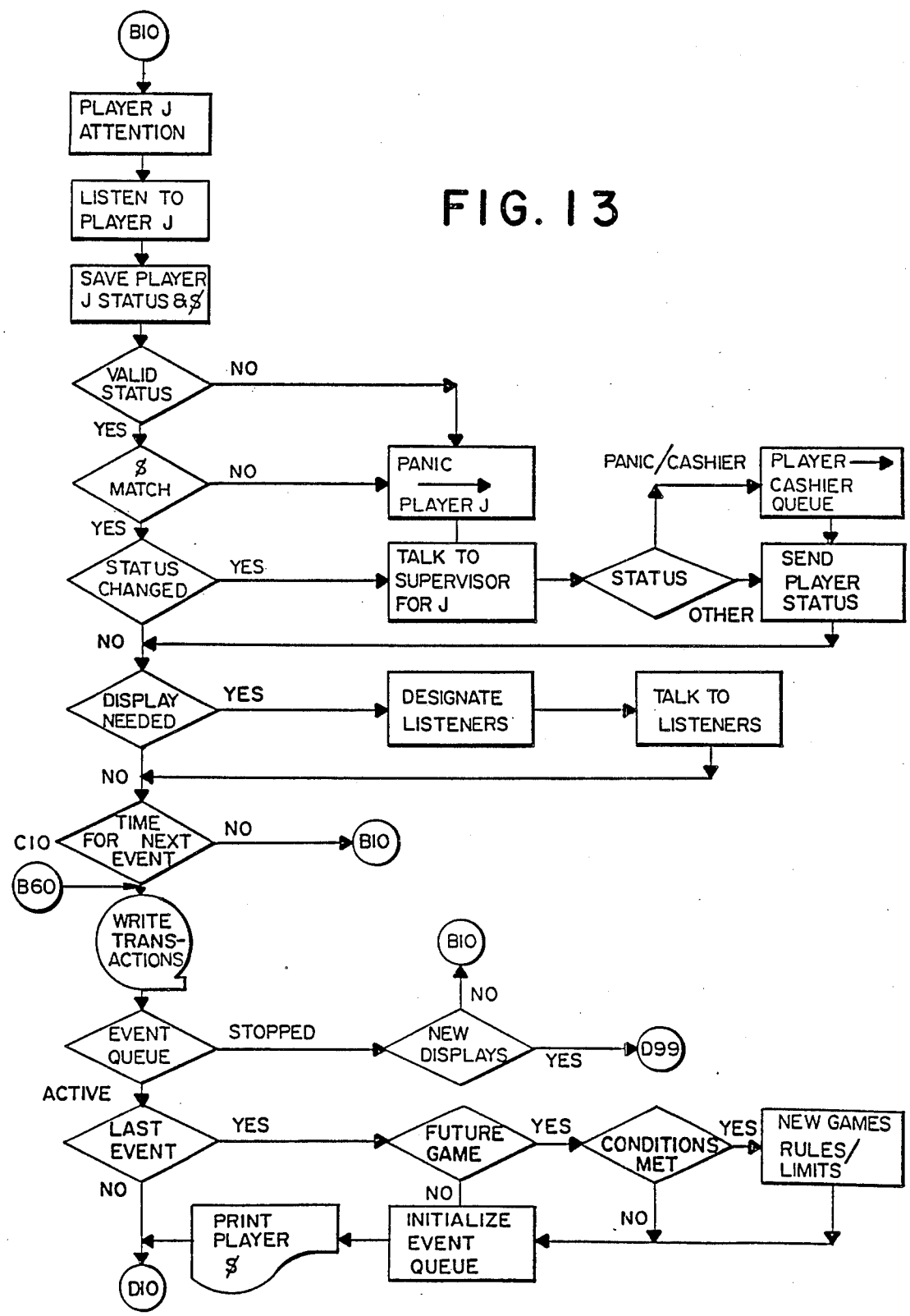

As shown in FIG. 11 and in more detail in FIG. 12, after initiating input data from the supervisory keyboard, the first step in starting the game is a review of a preventive maintenance (PM) file which contains the date on which the various computer hardware components were last replaced. This file is read by the CPU and matched against a stored estimated minimum useful life of each component. This comparison produces a listing of parts which are to be replaced that day, if any. If repairs are to be made, the event queue is not started and the appropriate player consoles are placed in the cashier queue in order to allow the necessary repairs to be made. Once any hardware component is replaced, the preventive maintenance file is updated and stored for retrieval on subsequent days.

After the preventive maintenance has been performed or if there is none to be performed that particular day, the CPU processing cycle is as follows:

Open game—the rules and limits of the start up games are specified as are the number of players required to begin play. The event queue is activated and all of the seats are placed into the open seat queue.

Player in—signalled by the entrance console as each player enters the game area. This will cause the open seat queue to be advanced and the next open seat to be displayed on the game entrance display to direct the incoming player to the available seat.

Player $ in—occurs after the cashier has received a player's money, the amount has been displayed to the supervisor who has verified the amount and approved the transaction. The money is added to the player's stake, this amount is printed out and an approval signal is displayed on the section monitor to indicate to the cashier that the transaction has been approved. In the automated cashier embodiment, Player $ in is obtained during the polling of the player's console and manual verification of the amount is not performed.

Player $ out—this occurs when the cashier has staged the amount of money due to be paid to the player and the supervisor has verified the amount and approved the transaction. The stake for the player's seat is zeroed and printed, an approval signal appears on the section display, and the seat is placed in the open seat queue. In the automated cashier embodiment, Player $ out is obtained during the polling of the player's console and no manual operations are performed unless the amount to be payed out exceeds the amount that can be automatically dispensed from the player's console.

Pot Mix—Defines at any time the criteria for the desired mix of players to be placed into the plurality of poker pots as will be discussed in detail hereinafter. Pot mix may be input by a supervisor or determined by internal CPU processing. Initiation by either method need not result in any information being displayed on the player, section or entrance console.

Audit—"audit" for the cashier will appear on the cashier's overhead section display and the total amount of cash and chips in a denomination that the cashier should have is calculated and printed. The cashier's cash and chips will then be stored with the audit listing for later verification.

Change game—the rules and limits of a future game are specified in addition to the time in which the change will take place. A message regarding the new game is displayed after every pot prior to activation of the new game.

Halt game—this is requested when, in the judgement of supervisor, the game must be halted. The event queue stops immediately and a message regarding the stoppage of play will be displayed on each console.

Restart game—used only if the halt game is in effect and will restart the game with an appropriate message of explanation.

Close game—last action of the day or gaming session. It stops the event queue when it reaches the next last event of each pot and places all of the players' seat number in the cashier queue. When said last event is reached in the automated cashier embodiment, an end of play message will be displayed on all pertinent consoles and every player console with a stake remaining will automatically pay out said stake.

The above actions would ordinarily be performed in the order listed, although action such as halt game and restart game will occur only under unusual circumstances. In addition, under exceptional circumstances it may be necessary for a supervisor to manually correct such things as an action he has initiated, consoles in the cashier or open seat queue, and player status. After the occurrence of any of the above actions, the processing cycle goes to D99B to transmit any immediately needed display information from whence processing returns to its origins in the CPU processing cycle. Continue is abbreviated CONT. in the flow charts to indicate that processing continues at the instruction from which it was interrupted.

At B10, the CPU processing cycle starts a polling of each player in which an attention signal is sent to each player's console, and status and stake data are received from the console and stored. If the status is invalid (or no data is received) or if the data regarding the player's stake does not match the stake as calculated by the CPU, the player's console is placed in "panic" status. In the automated cashier embodiment, the CPU may accept the stake data provided by the player's console. If the player status has changed since the last polling, the new status is sent to the supervisor console. If the new status is "panic" or "cashier" the player's console is automatically placed in the cashier queue for attention from the cashier. If any interrupt processing has established a display that should now be displayed, the appropriate consoles are designated as listeners and the contents of the displays transmitted to them. Although only the supervisor or entrance console can interrupt the CPU processing cycle in the current embodiments, the ability of other consoles to interrupt the CPU is considered within the scope of this invention.

Some events require no response from any player. For events requiring a response, individual console timers 172 are set for a slightly shorter time period than CPU timer 170 to insure that no player's time is truncated by the CPU. When all polling related to the current event has been completed and it is not yet time for the next event the CPU will continue polling the players until it is time for the next event. This secondary polling will allow the system to continue detecting input from the player consoles such as cashier transaction, or requests for a cashier or food/beverage service.

FIGS. 14 and 15 shows the CPU logic to determine the time for the next event in all of a plurality of pots. After the polling of each player console J, if the player is currently playing in a single player game (to be described in the hereinafter), the time 170 of completion for the bonus event is checked, otherwise processing goes to C14. If the bonus event time is complete, player J is added to the list of available players and processing goes to C20, otherwise the current event for player J is tested for being a draw event. If not a draw event, the processing goes to C20, otherwise the draw event (which has no time limitation in single player mode) is tested for completed draw action by player J. If the player J's action is not complete, the processing goes to C20, otherwise a deal event to replace player's discards and a bonus event to determine possible money award is generated and processing goes to D99Q. At C14, if player J is currently playing in any pot, processing goes to C20, otherwise player J is added to the available pool and processing goes to C20. At C20, if the polling cycle has not included all players, processing goes to B10 to poll the next player, otherwise the processing proceeds as follows. If there are currently no pots in the game (which would be the situation at open game) processing goes to C50, otherwise each pot N is tested. At C24, if it is time 170 for the next event entity, processing to C30, otherwise the current event for pot N is checked for being a bet or a draw event. If the event is neither of said events, processing goes to C34, otherwise the time is saved for those players in pot N who have completed the required action for the event and a test is made to determine if all of the players in pot N have completed said action. If all players have not completed the current (bet or draw) action, processing goes to C34, otherwise an event alter, which will shorten the event entity time when transmitted, is generated for pot N and processing goes to C34.

At C30, if the current event (whose time 170 has been heretofore determined as ended) is a bonus event, all players in pot N are added to the available pool, one more pot is available, and processing goes to C34, otherwise processing is as follows. If the current event is not a bet or draw event, processing goes to C34, otherwise the (bet or draw) event is checked for completion action by all players in pot N. If all have acted, processing goes to C34, otherwise the skill level embodiment is tested. If the skill level is not I or II, player action has been made by default. If Skill Level II, an event alter, which will lengthen the event entity time when transmitted, is generated for pot N and processing goes to C34. If Skill Level I, the CPU determines and generates an event alter for the best action for each player who has not completed the required action and an event alter, which will lengthen the event time for pot N when transmitted, and proceeds to C34. The best action for any player may be determined by computing the action which provides the best winning expectation from the theoretical mathematical probabilities or from the statistical data base of past play recorded by the CPU or from some combination of the two methods. Said computed bet actions may be restricted to a call or drop out. Said computed draw actions may either consider or disregard any partial discards of the player.

At C34, if all of the current pots have not been checked, the next pot is processed as described above at C24, otherwise all of the pots are tested for a next event entity time 170 or alter event as follows. If no next event and no event alter, processing goes to B10 to poll all of the players starting with the first player. If no next event but an event alter, processing goes to D99 to transmit the alters. Otherwise processing goes to B60 for event generation and transmission to the players unless the situation first requires proceeding to C50 to determine the possible initiation of new pots. Processing goes to C50 if one or more of the currently completed events for any pot contains a bonus event or an event which normally yields a large number of players who drop out of a pot, such as the first bet round in any pot. Said limitations prevent the excessive system consideration of pot initiation, but will not keep players who drop out of a pot at any time from waiting for new pot consideration more than the few seconds until the end of a bonus or high drop event in any one of the current pots.

Processing at C50, which will be hereinafter described, proceeds ultimately to B60 for generation of the next event entity.

A sample event queue for the simultaneous simulation of a 7-card stud game and a consolation draw game is described in detail in the discussion of approximate display time for each player decision.

At the next event time, B60, a magnetic tape written record is made which contains all transactions during this cycle. If the event queue is active and the last event in the queue has been performed, a check will be made to determine if there are any future events and, if this is the case, any conditions for the future event will be tested. If the future event conditions are satisfied, its rules and limits replace those of the current game on the console display screen. In any case, after the last event, the event queue is sent back to the first event and the current stake for each player may be printed on the audit printer 22.

At D10, the next event entity is generated. The system could transmit (talk in IEEE-488 terminology) and time each event separately. However, since a minimal amount of time can be provided for all events except the start, bet, draw, showdown, bonus and message events, and since the only events that require a response from the players are the bet and draw events, it is clearly more efficient to construct and transmit strings of multiple events containing at least one of the above time significant events and at most one event requiring a player response. Said multiple events are designated as event entities. The instant invention may contain the following event entities.

A. Start, deal, show, bet
B. Start, deal, bonus
C. Start, deal, bet
D. Deal, show, bet
E. Deal, bet
F. Deal, bonus
G. Call, bet
H. Call, draw
I. Call, deal, bet
J. Call, deal, show, bet
K. Call, winner, bonus The approximate times for the above entities can be found in Table 4. The queued event entities for each 7-card stud pot consist of A, G, J, G, J, G, J, G, I, G, K event entities. If there are less than two callers, the next entity becomes entity K. If there are no raises, the next entity G is omitted from the queue. The queued event entities for each 5-card draw pot consists of C,G,H,D,G,K with the same next entity conditions as in the 7-card pot.

• Start hand—causes rules and betting limits to be displayed on the various monitors if said rules and limits have changed since the last game. The fixed payout amounts for the Bonus poker hands may be displayed. The number of players who have been assigned to the upcoming pot and the amount in the pot will be displayed. In the Skill Level III embodiment, the seat numbers of the probable participants will also be displayed.

Deal cards—for each round of cards, a new 52-card register may be used. A player is randomly selected and then receives a random card not already in the player's hand as will be hereinafter described in more detail. The number of cards dealt at one time depends upon the fixed rules of the game, except games in which the player may make discards. In this case, the number of cards dealt equals the number of cards discarded for that player. In the security embodiment, those cards which are not dealt face up in poker may be transmitted with the recipient of said cards designated as the sole listener.

Showing value—in draw poker, the hands are displayed in ascending sort order by number of cards drawn. For stud poker, the showing cards are first quantified, as will be described in more detail hereinafter, for their high value and are then displayed in descending order. For games in which there are neither a varying number of cards drawn nor showing cards, other sort orders may be utilized. A secondary sort factor for any of the above displays may be by descending amount of player stake left.

Bet—if the game is in the first bet event per round, the call and raise amounts are computed from the predefined game limits. If there is an another bet event, with an additional amount needed to call due to raises, this call amount may be the total of all the raises. In Skill I and II embodiments, the call amount for said raises will be subject to limitations described hereinafter and there will be no raise amount. In Skill III embodiments, there may be no limitation on the total call amount for said raises and an additional raise amount may be allowed which consists of the call amount plus a predefined game limit raise amount. All of the players who have raised are noted on the game displays.

Call—if there are no callers, the winners are determined immediately from all of the players who were in the pot during the preceeding bet event. If there is only one caller, that player wins the entire pot. If there is more than one caller, all who did not call are eliminated from the pot and from the console displays. The call or raise amounts from each player are added to the pot. There will be another bet event if any player raises.

Draw—causes draw arrows and instructions to be displayed on each of the players consoles.

Winners—all participating hands are quantified for both high and low values and sorted (high values are sorted in descending order; low values are sorted in ascending order) by quantification by the amount the player put into the pot. The winners and winners' shares are determined by a method explained in more detail hereinafter, while the house percentage is automatically substracted from each winner's share.

Bonuses—all hands receive a quantification for high value. Players whose hand quantification value match one of the predetermined bonus hand values have a bonus amount added to their stakes. The bonus event is the last event of a processing cycle if there are no message events.

Messages—any pertinent undisplayed messages will be displayed as the last event in the processing cycle. The same message display may be the last event in each of a plurality of pot queues.

After each of the above events, information is displayed on the player consoles. Some information may also be shown on the section and entrance overhead displays as previously described. All players in a particular pot are designated as simultaneous listeners for each of the above events. In the security embodiment, each player may serially be designated as sole listener for deal events containing cards which are dealt face down in poker.

Figure 17:
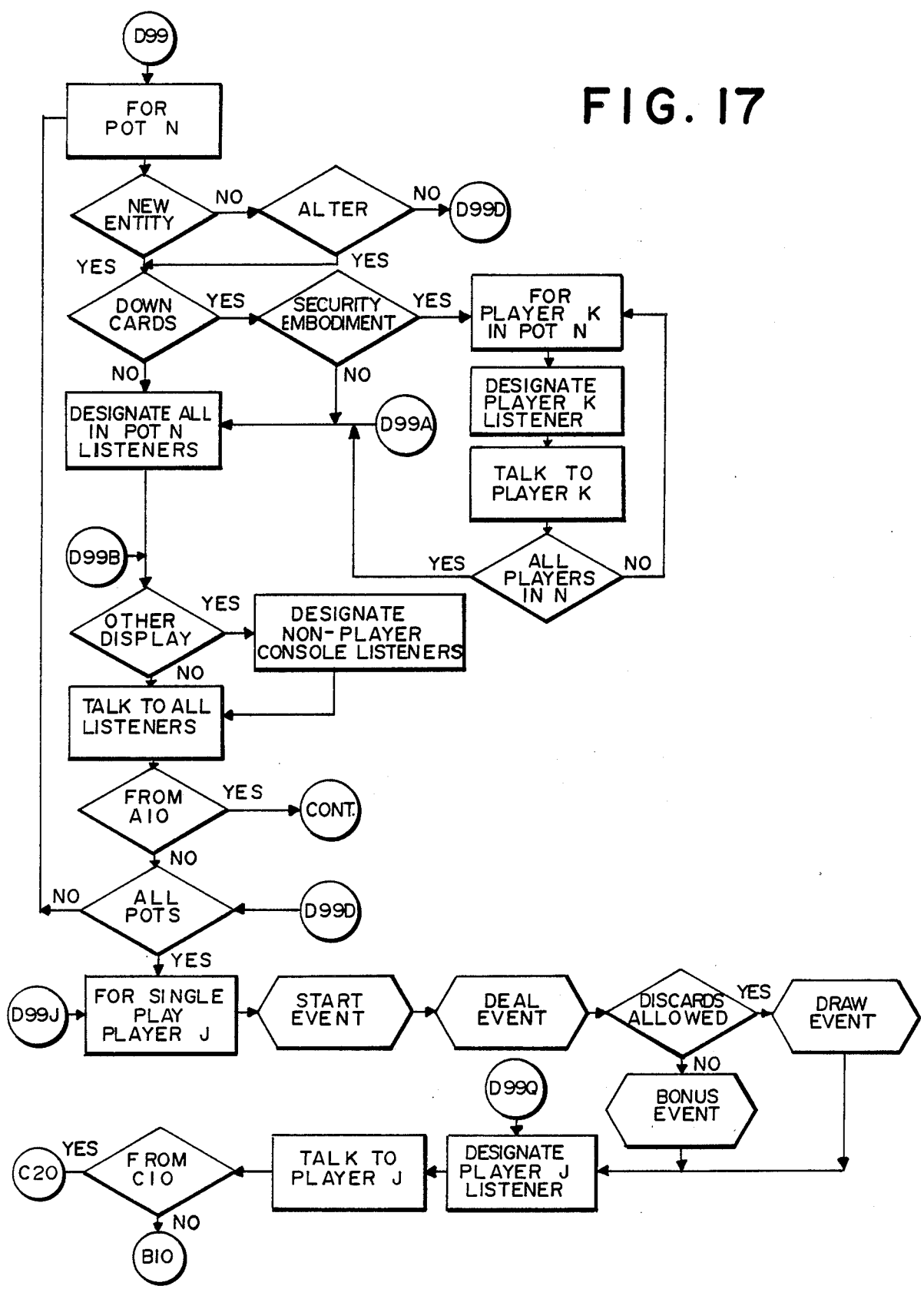
Figure 18:
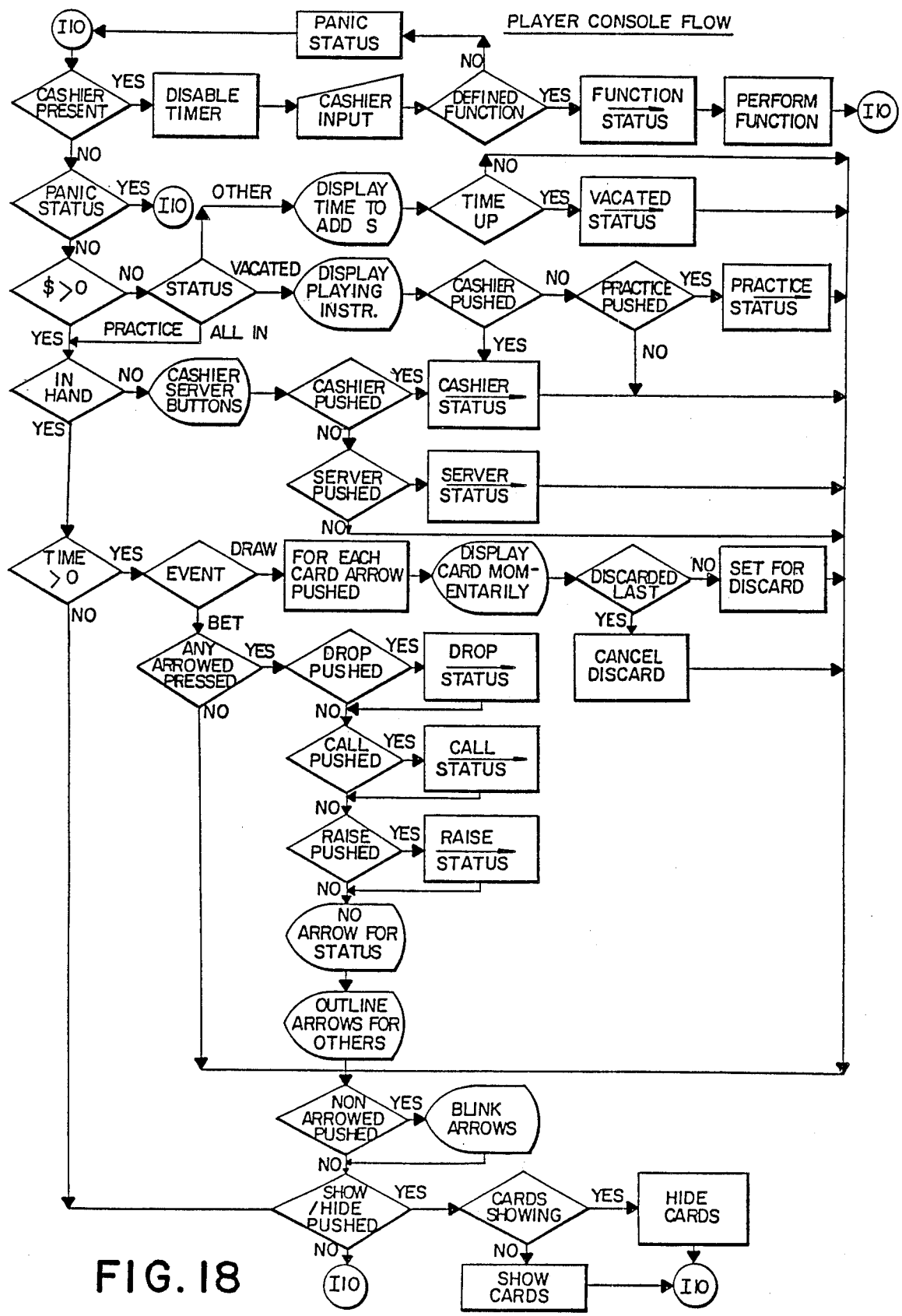
FIGS. 18 through 21 are flow-charts illustrating the logic sequence for each of the player consoles according to the invention.
Figure 19:
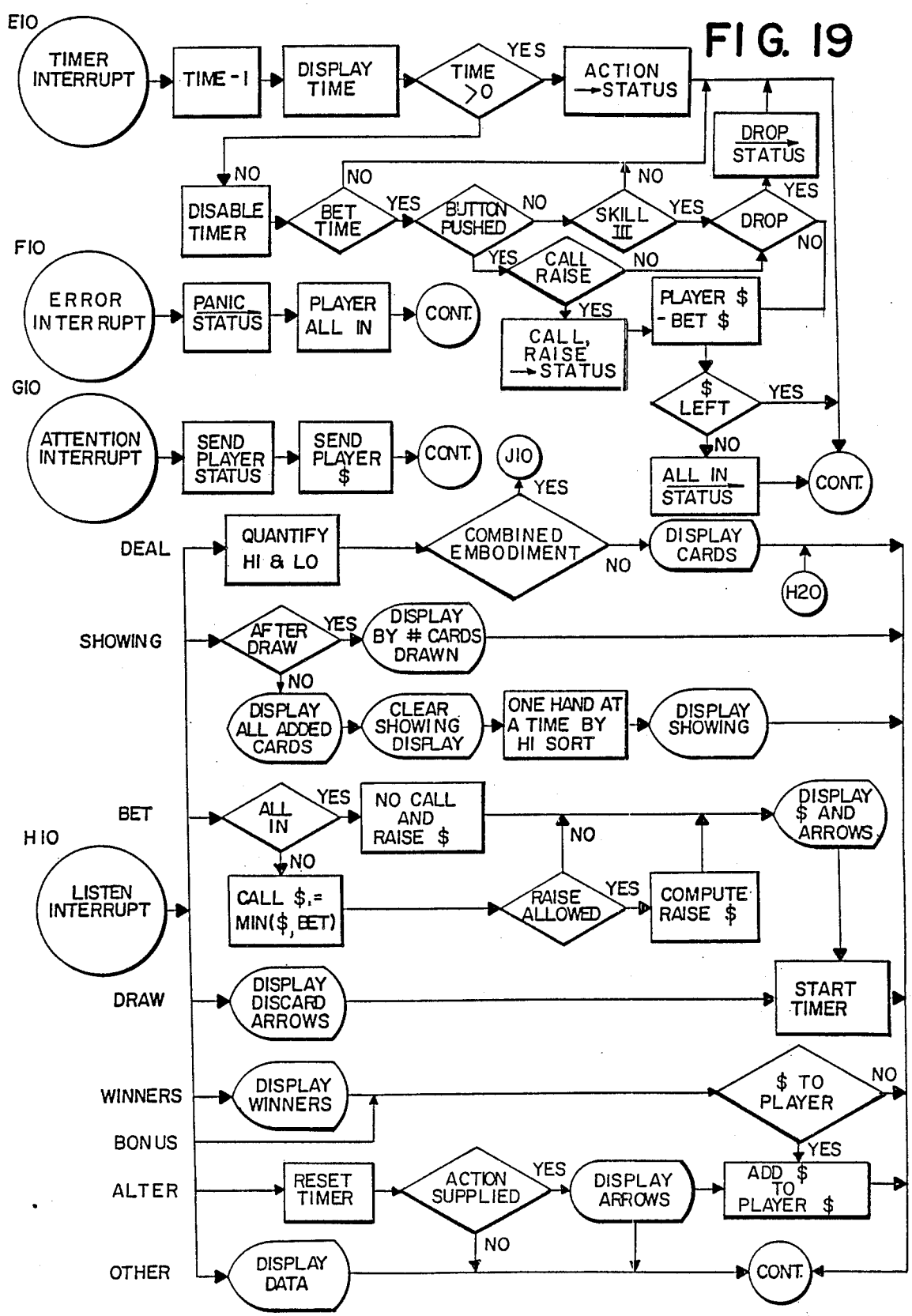

At D99 on FIG. 17, each pot N in the game is checked for the start of either an event entity or an alter event. If pot N contains neither, processing goes to D99D, otherwise the event entity or alter event is checked for the inclusion of cards which would be dealt face down in a traditional poker game. If the event contains "down" cards and if the invention is the security embodiment, each player in pot N is in turn designated as sole listener and the deal event entity or alter event data is transmitted to said player only, and after the CPU talks to all of the players in pot N sequentially, processing goes to D99A to transmit the remainer of the event entity. Otherwise (at D99A) all of the players in pot N are designated as listeners and the processing goes to D99B.

At D99B, if any information from the event entity of pot N should be displayed on any non-player consoles, such consoles are designated as listeners. If processing came from A10 for an immediate display, all consoles for which the display is intended are designated as listeners. The CPU then talks to all designated listeners simultaneously. If processing came from A10, processing returns to its origin in the CPU processing cycle, otherwise as follows. If there are more pots in the game, the next pot is processed as described at D99, otherwise processing is as follows. For each newly initiated single player game, an event entity consisting of start and deal events for the needed number of cards is generated. If the game contains a draw event, said event is added to the event entity and processing goes to D99Q, otherwise a bonus event is added to the event entity and processing goes to D99Q.

At D99Q, each single player J is designated as listener and the CPU talks to the single listener. If there are no single players or after all single players have been listeners, processing goes to B10 to poll the first player—unless the processing had originated from C10 rather than passing through D99B, in which case the processing goes to C20 to poll the next player.

The processing cycle for each of the player consoles is shown in FIGS. 18 through 21 and consists of the following actions:

In the automated cashier embodiment, at those times that the player is allowed to input money, the player's display indicates that money may now be input and a signal from the money acceptor is tested to detect any such input. The amount of money input is added to the player's stake. Whenever the player does not have the option of inputing money, the money acceptor hardware is not activated which results in the direct return of such money.

Cashier present—if the player console cashier's door is not closed, the cashier should be present. In this event, the timer 172 interrupt is disabled and a request for cashier input is displayed on the player's console screen. The display faces the cashier's position behind the player's console and is upside down to the player's position. After a cashier input or a short wait, the input function is tested. If this function is missing or undefined, a "panic" code is placed on the player's status register. If the function is defined, the code for that function is placed in the player's status and its defined processing is performed. This may include further instructions to the cashier, additional input from the cashier, or an adjustment of the player's stake. The cashier's functions may include: putting the players money into the game; cashing-in the player; and performing diagnostics on microprocessor, its monitor, buttons, keyboard and interfaces. The cashier's door will also be open in the automated cashier embodiment if the console's hopper is being filled. In said embodiment, malfunctions of any of the money handling hardware will result in a "panic" code for the player's status. Following the completion of this, the processing returns to the start cycle.

If a cashier is not present and if the players status is not "panic", the processing continues with the following tests:

$ greater than zero—if the player'stake is not greater than zero, the player's status is examined. If the status is all-in, processing continues as if the stake were greater than zero. If the status is vacated, playing instructions are displayed on the console screen, with the player having the option to call for a cashier or to input money. If the status is other than those specified above, the player will be notified that the cashier must be called or money input within a displayed time or the seat will be declared vacant.

In hand decision—If the player's stake is greater than zero, but the player is not in the hand, a display indicating the player's option to call the cashier or the service personnel appears on the player's screen containing arrows pointing to the appropriate button which will summon one or the other. In the automated cashier embodiment, the money acceptor hardware may be activated.

Time greater than zero—if there is no time 172 left for a player decision or it is not decision time, the only option for the player to show or hide his hand. If there is time for a decision, then the following occurs: if the decision is discarding, pushing a putton under a non-discarded card will result in that card being set for discarding. Pushing a button under a card already set for discard will result in that action being cancelled. In Skill I and II embodiments, the player pushes another button to indicate completion of his discard choice. If the decision is betting, pushing a button under the call, drop, or raise arrows will set the player to perform the desired action. Pushing a button causes the arrow above that button to disappear from the screen while the other arrows may appear in outline form.

All button pushing processing includes a check for the pushing of non-arrowed buttons. If this occurs, all of the arrows are displayed blinking which indicates to the player that the incorrect, or non-functioning button has been depressed. The player's hand is not normally displayed on the screen in order to maximize the security of his hand. One of the player buttons is used to show or hide those cards dealt to the player which would be dealt face down in a regular poker game. Pressing of this show/hide button will alternately cause these down cards to be displayed or not displayed on the player screen.

The foregoing processing actions are interrupted by the following situations in order of their priority:

Priority 1—in the intruder protection embodiment, if the signals from announcers 109 of his console or the right adjacent console indicate that either of the pulsed-light beams are not received, the player's hand is turned down and an "intruder" message displayed on his screen. The player may override this action by use of his hide/show button. In the tracking embodiment, if the signal from announcer 111 indicates that said announcer's beam is not received, the player's microprocessor notes said break for transmission with the next status report to the CPU.

Priority 3—the timer interrupt is activated by an internal clock every specified time interval (about 1/5th-second). The time count is decreased by one and is displayed on the player's console screen. If, after the decrease, the time is still greater than zero, the processing player status is updated by any button action, and returns to its origin. When time 172 reaches zero, the timer is disabled and, if the action is not related to betting, the processing returns to its original. If the time is a bet time, and either the drop button or no button in the Skill III embodiment has been pushed by the player, the player is placed in the dropped status and the processing returns to its origin. If no button is pressed and Skill I or II embodiment processing returns to is origins. Otherwise, the amount of the bet is subtracted from the player's stake. If the player has no money left he is placed in "all-in" status.

Priority 4—money handling hardware malfunctions such as money input path or hopper output errors.

Priority 5—(IEEE-488) attention interrupt causes the current player status and stake to be sent to the CPU.

Priority 2—(IEEE-488) listen interrupt allows the player console to process an event from the CPU as follows:

Deal—the player console quantifies both the high and low values of the entire hand and shows a card being dealt on the player's console screen. Up-cards in stud poker will be displayed, while all other cards and the hand's high and low values will be displayed only if the player's show/hide button is set for show. In an alternate embodiment, the cards and their value are shown in lower screen area 141 as described in FIGS. 20 and 21.

Showing—after a draw, the seat number of all players still in the game will be displayed on each console in descending order of the number of cards drawn. For stud poker games, one card will be added to the card display of all the players in the hand. The hands will then be cleared from the screen and quantified according to the high showing value and redisplayed in descending order.

Bet—if the player is "all-in" no options will be displayed. Otherwise, the amount needed to call or raise with respect to the player's remaining stake will be calculated and displayed above arrows pointing to the buttons for carrying out the appropriate action. Symbols for players who raised or are all in are displayed. The timer 172 will also be started and displayed with the required count in which the decision must be made.

Draw—will display discard arrows and instructions to carry out the discard, and start timer 172.

Winners—the winners' hands and amount will be displayed and if a player is one of the winners, the winning amount will be added to his stake.

Bonus—if the player has attained a bonus payout, the amount will be displayed to the player and added to his stake.

Other—will cause the data sent by the CPU to be displayed on the player's console. The CPU events which activate this console processing are message and call. As previously stated, the final message event of a gaming secession causes the automatic payout of the player's remaining stake in the automated cashier embodiment. As previously described, the call event causes the elimination of players who have dropped, and the pot amount to be displayed on the player's screen.

Alter—the timer 172 is reset as indicated by the CPU. In Skill I, a bet or discard action may also be indicated. If action is indicated, the player's status is set and his displays are shown as if the player had performed the action.

After any of the above listen/interrupt processing is accomplished, the player's console processing will return to its origins.

Game Procedure

When a player decides to participate in the game, he moves to the seat indicated as being available on overhead display 34 adjacent the entrance. Upon entering the game area, breaking the pulsed-beam 41 advances the entrance display to the next available seat and may initiate tracking of the individual. A display appearing on the player's individual console prior to the beginning of play explains the basic functions and rules of the game to the player (including the use of the show/hide button) and allows him to buy into the game. If the player decides to buy into the game, he indicates his decision by pushing the designated button on his keyboard. The player's seat number will appear on one of the overhead displays 32 to direct the cashier to the player's seat. The player may immediately input money in the automated cashier embodiment.

The CPU may assign a new player to a single player game for his first game. Such a game consists merely of deal and bonus events and serves to familiarize the player with game play and displays without any considerations for time or competition.

The invention is initially described in terms of a 7-card stud game wherein the best high and low hands split the pot. Obviously, games in which the pot is not thusly split would function the same—except either the best high or the best low hand would win the entire pot. Games of draw and other poker varieties are described hereinafter.

Once the player has elected to buy into the game and the cashier has duly entered the players buy-in amount in the CPU and completed the buy-in transaction or input money in the automated cashier embodiment the following display may appear on the player's console screen:

| 7-Card Stud - The Best 5-Card High and Low Hands Split the Pot (Lowest Hand is 5-4-3-2-A) The number of card decks being used is shown but you can't get duplicate cards | | | | | |
| --- | --- | --- | --- | --- | --- |
| After Card | 3 | 4 | 5 | 6 | 7 |
| Bet | * | * | * | * | * |
| Raise | * | * | * | * | * |

Each "*" may be a fixed dollar amount or a percentage of the pot. The ante amount will appear in display element 128. The display remains on the screen for at least fifteen seconds for a player's first hand or when the limits are first changed. As previously described, player identification data for the Skill III embodiment, and the number of players and amount in the pot will next be displayed. In the Skill Level III embodiment, the amounts of their stakes and a digitized image of the players or other identifying data may also be transmitted for display.

Once the time for this display has been expired, it disappears from the screen and a display similar to the sample shown in FIG. 27 appears. FIG. 27 assumes there are fifty-two players in the game, the ante is $1, and the player in seat #33 just bought into the game for $100. The up cards of all players along with their seat number are shown on the upper portion 123 of the screen and are arranged in order of descending poker high value starting from the upper left corner of the screen and continuing to the lower right corner of display element 123. Cards or hands of equal value may be displayed in order of descending amount of player stake. Each of the cards is displayed against a green background as a white area with the card rank and suit in either the traditional red or black or in four different colors for maximum distinction. The player's own hand is also displayed, in somewhat larger scale, in area 138. Since the game is being described in terms of a 7-card stud poker game, the first, second and seventh cards are displayed against a dark background to indicate that these are the "down" cards and are not displayed on any other player's screen. The third through sixth cards are displayed against a green background to readily indicate to the player that these are the "up" cards and are displayed on all of the other players' screens against the green background of screen area 123. The lower portion of the screen also contains various information relating to the amount of money in the pot (area 126), the amount of money bet in area 128 ($2 in FIG. 27) and the total amount of money which the player has in area 134 ($100-$1 ante in FIG. 27). The seat number may also be displayed in area 136 on the screen to enable the player to identify his location should it become necessary to talk to the supervisor on the control platform. The screen also displays, in area 140, the high and low value of the hand according to a ranking system which will be described hereinafter. FIG. 27 shows the player's card area 138 and their value area 140 in the alternate embodiment area 141 that constructs each card such that poker value of the entire set of cards is immediately and clearly conveyed to the player, as will also be described hereinafter.

Arrows and instructions located on the screen in display element 130 directly above the players push button keyboard indicate which buttons the player should push to call, raise, or drop out, and the amounts it will cost the player to call or raise. A timer in area 132 is also displayed which indicates the amount of time 172 the player has to decide what his action will be. The timer display appears in digital format and reads downwardly to zero in decrements of one (perhaps each fifth of a second). The precise amount of time given the player is not critical. It should be long enough to enable the player to make a rational decision, but short enough so as not to prolong the playing of the game. An audible sound may be connected to the timer to emit a descending musical scale during the last ten counts. If a player fails to indicate a decision before the timer reaches zero in Skill III embodiment, the player is considered to have dropped out of the hand and play continues with the remaining players.

When the game play begins, each player receives two down cards displayed on the lower portion of his screen as noted above. The initial up card is displayed not only on the lower portion of the screen in the contrasting background, but each player's up card is also displayed on the upper portion 123 of all the screens. The amounts in bet area 128 and pot 126 are the same for all players and will remain the same until all players have responded. The amount it will cost to call or raise will be the same for all players with sufficient stake to raise. For all players possessing less than the bet amount, the call amount will be their remaining stake. All players possessing less than the raise amount will not be allowed to raise. Following the betting action, a second, third, and fourth up card is dealt to each player with time allowed between each card to enable the players to call, raise or drop.

In the instant invention, the CPU simulates the dealing of cards to players by randomly selecting first a number which represents the cards in a poker deck. Random selection within a computer is commonly achieved by the generation of a random number. A random number is a number within a defined range wherein any number is equally likely to be generated next. The art for computer random selection is known and there are random number generators available for most all computer models. A range of numbers from one through fifty-two covers all possible players and each number may be equated to a player seat number by various means, for example, sequentially clockwise from the player entrance. The fifty-two cards in a deck may be equated to numbers in the range one through fifty-two as shown in Table 2.

TABLE 2

| Sample Numeric Values for Cards | | | |
| --- | --- | --- | --- |
| Heart | Diamond | Spade | Club |
| A | 1 | 2 | 3 | 4 |
| 2 | 5 | 6 | 7 | 8 |

TABLE 2-continued

| Sample Numeric Values for Cards | | | |
|---|---|---|---|
| Heart | Diamond | Spade | Club |
| 3 | 9 | 10 | 11 | 12 |
| 4 | 13 | 14 | 15 | 16 |
| 5 | 17 | 18 | 19 | 20 |
| 6 | 21 | 22 | 23 | 24 |
| 7 | 25 | 26 | 27 | 28 |
| 8 | 29 | 30 | 31 | 32 |
| 9 | 33 | 34 | 35 | 36 |
| 10 | 37 | 38 | 39 | 40 |
| J | 41 | 42 | 43 | 44 |
| Q | 45 | 46 | 47 | 48 |
| K | 49 | 50 | 51 | 52 |

In the invention, each round of cards is dealt from a new deck of cards, with the provision that a player cannot receive a card already in his hand. A maximum of fifty-two players can participate in a hand, but only one player can have any given card (for example, an ace of spades) for a first card and, at most, four players can have the same pair (for example, aces) in the first two cards dealt. Any number of players could participate in a hand, if each player were to receive cards from a separate deck. But, this latter method (while simple to explain to the gaming public, and regulatory agencies) would allow every player to have the same pair (for example, aces) in the first two cards dealt. This could substantially raise the average value of the winning hands, be less interesting to the players and less similar to regular poker.

Dealing for each round starts with the construction of a software list of players who are in the hand. There would be as many such lists as there were different hands being played at the same time. A player will be randomly selected from the list of players in the hand. Randomly selecting each player affords a wider choice of cards to any player than selecting the players in any fixed sequence. The set of all cards which are both currently undealt in this round and not already in the selected player's hand is constructed and a card is randomly selected from this set. (The exceptional case in which this set contains no cards will be discussed below in detail). The selected card is removed from the list of cards currently undealt this round and added to the list of cards already in the player's hand. The selected player is removed from the constructed list of players. When the player list is depleted, the dealing round is completed. Otherwise, another player and another card are randomly selected as described above.

In dealing replacement cards for discarded cards (as encountered in draw poker), the first dealing round would provide a new card for all players who have discarded any cards. A second dealing round would provide a new card only for those players discarding at least two cards, etc. up to a round for the maximum number of discards.

On the first dealing round, a player is eligible to receive any of fifty-two cards. Since a player cannot receive any card already in his hand, on each succeeding round he is eligible for one less card, that is fifty-one cards on the second dealing round, fifty cards on the third, etc. down to one card if fifty-two rounds of card are dealt. There is also one less card left in the deck for every player after each card is dealt in a round. So long as the number of cards left in the deck is greater than the number of cards already in the player's hand, there is always a card left in the deck that the player does not have. If the number of cards left in the deck is less than or equal to the number of cards already in the player's hand, it is possible that all of the cards left in the deck may already be in the player's hand. Thus, there may be no cards left in the deck which the 52nd selected player may receive on the second dealing round, the 52nd and 51st on the third dealing round, the 52nd, 51st, and 50th on the fourth round, and so forth, as the cards have by chance been dealt. In each dealing round, there are $52 \times 51 \times 50 \times \ldots \times 1$, or 52 factorial (52!) different card distributions possible for fifty-two players. As seen above, some of these distributions would give players duplicate cards and be invalid for the invention. It can be shown, however, that there are at least (52 − dealing round number + 1)! possible distributions of fifty-two cards to fifty-two players in any dealing round which produce cards for each player that are not already in the player's hand. That is, there are at least 51! valid card distributions for the invention with fifty-two players on the second dealing round, at least 50! on the third dealing round, and so forth.

Thus, if the situation arises in which there are no cards left in the deck which the selected player does not already have in his hand, the entire round of cards could be redealt immediately. If necessary, iterative redealing would eventually produce a valid card distribution.

To reduce redealing iterations if this situation arises, the CPU may be programmed to randomly select a card from those cards which are not already in the selected player's (for example, player A) hand. Such a selected card has obviously been dealt to another player (for example, player B) in this round. The set of cards which are both undealt this round and not already in player B's hand is constructed. If there are cards in this constructed set, one is randomly selected for player B. The card that player B had formerly received in this round is given to player A and is removed from the list of cards that player B already has. The newly selected card for player B will be removed from the list of cards currently left in the deck and will be added to the cards already in player B's hand. Player A is removed from the constructed list of players and processing continues in the cycle previously described for player and card selection.

If there are no cards in the set constructed for selection for player B, another card already dealt in this round but not already in player A's hand is selected. Such selection could continue until a card is located which was last dealt to a player (for example, player F) who is eligible for a card left in the deck for this round. In this event, one of the cards left in the deck will be randomly selected for player F, removed from the list of cards left in the deck, and added to the cards already in player F's hand. The card that player F had formerly received this round is given to player A and is removed from the list of cards that player F already has. If the last card for which A is eligible is reached without a player (for example, player K) who was dealt that card in this round being eligible for any card remaining in the deck, player K's last card is given to player A, and the above processes for card selection would be imitated for player K.

Use of the aforedescribed dealing technique eliminates the need for any player to remember the up cards removed from screen area 123 when players drop out. The Skill III embodiment utilizes a new 52 card deck at the beginning of any dealing round in which there are insufficient cards to deal to all players. Said multiple deck technique requires that the players give consideration to whether or not the cards in play may be duplicated. Possible usage of more than one 52 card deck at the beginning of dealing round would allow more than 52 players to participate in a pot.

A Skill Level IV embodiment utilizes a single deck with more than 52 cards to deal to a large number of players. Said decks consist of more than four suits with additional suit symbols in one or more none red or none black colors and additional ranks inserted between the Jack and Ten ranks. Said added ranks would preferrably be multiples of ten, such as 11 through 20 (with jack=21, queen=22, king=23, and high ace=24) or 11 through 30 (with jack=31, etc.). For consistency with standard poker hand values, any of the ranks which are even multiples of ten would be considered to follow the Jack rank for a straight sequence, but a king, queen, jack, 20, 19 sequence would beat a king, queen, jack, 10, 9 sequence.

The determination of the high and low values of each player's hand is referred to as quantification. The values of each player's best high and low hand are contained in two 6-part software registers. Registers 178 and 179, respectively. The first part of each register contains a code for the rank of the hand as follows: 0—no pair; 1—one pair; 2—two pair; 3—three of a kind; 4—straight; 5—flush; 6—full house; 7—four of a kind; 8—straight flush; and, 9—five of kind (which is possible only if a joker or a deck with more than five suits is used). The next five characters of each register contain the value of each of the five cards constituting the best hand in descending order. The values for cards 2-10 are the rank of the cards themselves. The jack, queen, king are represented by 11, 12, and 13, respectively. The ace has a value of 14 when being evaluated for a high hand and a value of 1 when being evaluated in a low hand. The ace also has a value of 1 when being evaluated in a five high straight or straight flush. Any joker will assume the value of the card to which the joker has been equated. The suits of the cards need not be represented in the register, since all suits have the same value in poker.

The low value register may contain no 4, 5 or 8 code numbers under the common rule that straights and flushes are not counted against the player for determining the low hand, and such hands would all be given a 0 low code.

The first part of the high register 178, which contains the high hand value, shall be herein designated as 180 and the next five characters of register 178, which contain the value of the most significant high card values, as 182. The first part of the low register 179 is designated as 184 and its next five characters as 186. When less than five cards have been dealt the least significant character values of registers 182 and 184 are zero. CPU 14 uses registers 178 and 179 to determine the winners of a pot.

In another embodiment, each player microprocessor 72 uses registers 178 and 179 to determine the combined card and value construction 141. In the previous embodiment illustrated in FIG. 30, each player sees not only the cards of his hand 138 but a second (and third) representation of (at most) five ranks in hand value 140 which aids the player in evaluating bet and possible discard actions but requires the player to move his center of vision and possibly correlate three different card rank presentations. The method to be described below not only eliminates said movement and correlation but shows the player at a single glance both the current attained value of his hand and the potential value of his hand (if the player may receive more cards). In games with up cards, said method also shows the player the significant parts of his hand that the other players see. In games with a discard, said method shows the player the ramification of each discard. Each poker card contains a rank symbol, a suit symbol, and an entity enclosing the rank and suit symbols. In a standard deck of cards, the enclosure element is the physical boundary of the material upon which the rank and suit symbols are imprinted. In a computer displayed deck, the enclosure element is the (background) color (normally white) which surrounds the rank and suit symbol. Known cards are constructed to visually distinguish one card from any other card without any modification in their construction with respect to the currently attained or potentially improved poker value of a plurality of said cards. In the instant invention, each card is uniquely constructed to show its poker relationship to the other cards in the player's hand. A casual player often has difficulty in determining all the values of his hand when there are actual and possible poker values, more than five cards, and both high and low value. Construction 141 increases the speed with which players of all experience levels can determine their actions.

In the following, straights and flushes are not counted against the player for determining the low hand. But the process could be modified for such a high/low game or for a low only game.

Figure 20:
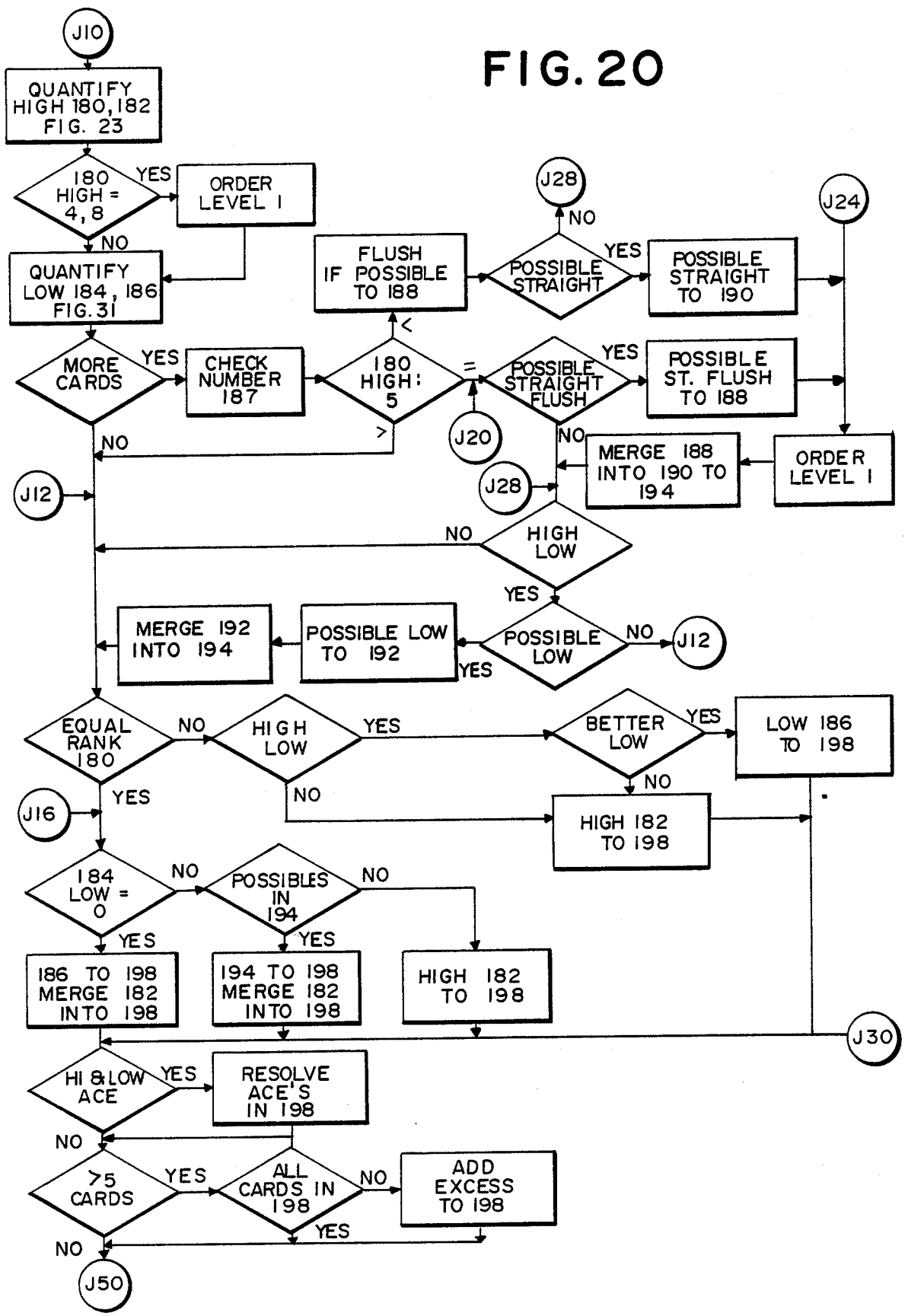
Figure 21:
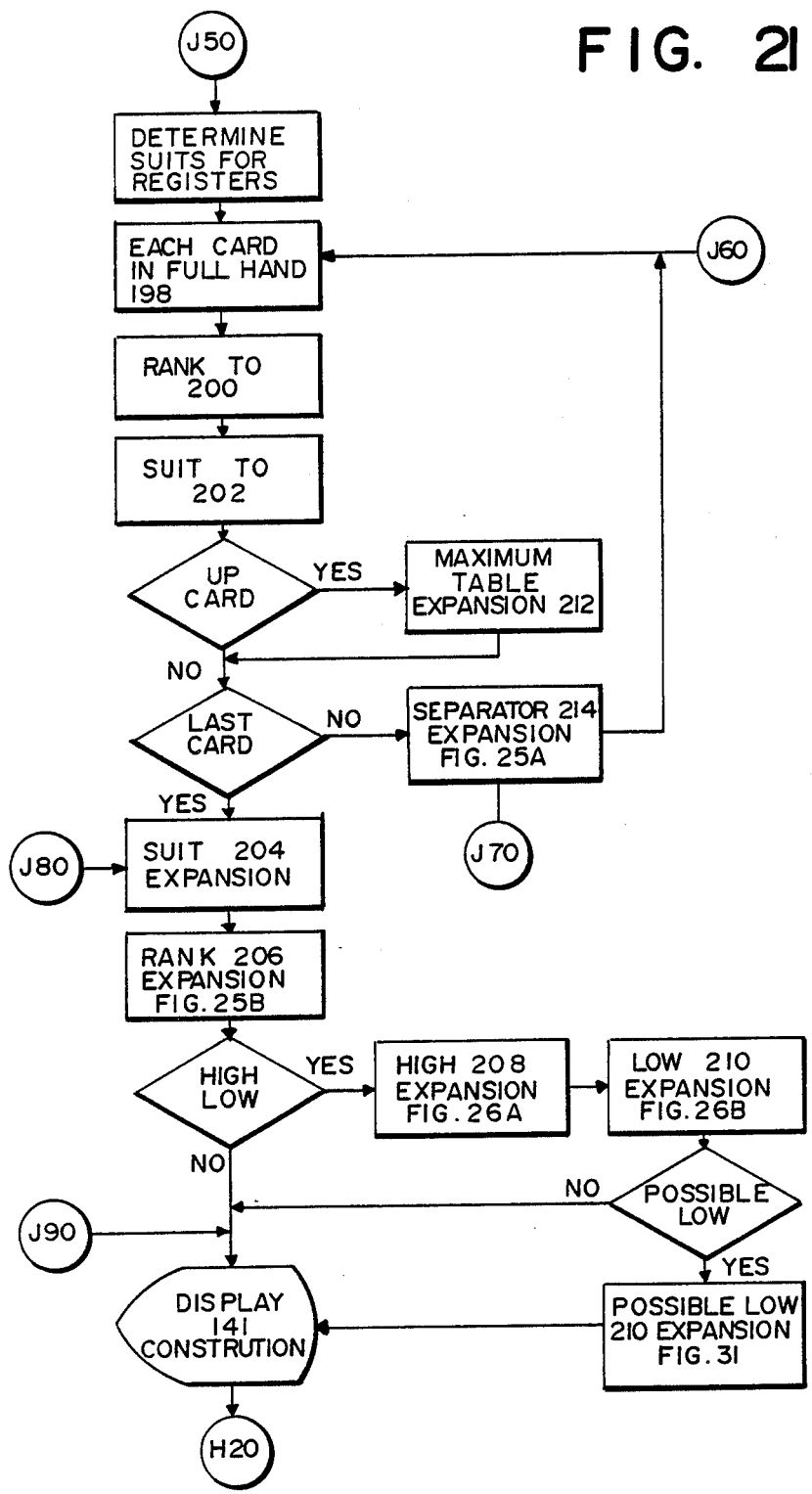

The logic for construction 141 is shown in FIGS. 20 and 21. At J10, all card registers contained and expansion levels in said figures are cleared to zero. The entire hand is quantified for high value in 180 and high card values in 182. High poker values and their definitions are shown in FIGS. 23A and 23B. The usual poker card comprises one of the ranks ace through kind and one of four suits. Poker hand values are based upon rank consecutiveness, rank match, suit match, and rank consecutiveness with suit match. The aforementioned card codes, fourteen through one, are placed into register 186 in accordance with the rank matches and then any unmatched ranks are sorted in descending order. If value code 180 represents a straight or a straight flush, the order level 216 is one, which indicates that sequence is of primary importance (for separation level 214 as later described in the processing at J70). FIG. 31 shows the low poker values and their definitions (standard embodiment). The entire hand is quantified for low value in 184 and low cards codes, thirteen through one, are placed in register 186 in the same manner as above for rank matches and non-matches. The low quantification takes place to determine rank matches in any hand regardless of whether or not low is a game factor.

If the player cannot receive more cards before the game is complete or value 180 is greater than five, processing goes to J12, otherwise possible hand value improvements are tested. If there is only one more card that the player can receive the check number 187 is four. Check number 187 is three if there are a plurality of possibly additional cards. If the hand value is a flush processing goes to J20, otherwise as follows. If the hand contains check number 187 of the same suit, their card values in descending order are put into possible flush register 188. If the hand contains a rank difference of four or less between set of the above established check number 187 of different card ranks in a row, their card values in descending order are put in possible straight register 190 and processing goes to J24, otherwise to J28.

At J20, if the hand contains a rank difference of four or less between any set of the above established check number 187 of cards of the same suit, said card values are placed in possible (straight) flush register 188, otherwise processing goes to J28. Hereinafter, merging A into B means that the order of B is maintained and contains all elements of B and each element of A that was not in B. For example, if A=b,b,a,c and B=a,b,d, and A is merged into B, B=a,b,b,c,d. At J24, order level 216 becomes one, the possible flush register 188 is merged into possible straight register 190 and placed in possibility register 194. At J28, if the game is high/low and if additional cards could, as shown in FIG. 31, provide a no pair low less than low peg value 195 (set for example to the value nine) low card values 186 starting with the value less than low peg 195 are placed in possible low register 192 and then merged into register 194.

The objective of the processing, which follows and ends at J50, is to obtain a sequence for the card values which preserves significant rank matches, sequential considerations for actual and possible straights, flushes, and lows, and delineates cards which have no significance in the actual and potential value of the hand, called excess cards 196, which are only possible in hands containing more than five cards.

At J12, high hand value 180 is tested for best high hands containing equal ranking cards. If hand value 180 is a 1, 2, 3, 6, 7, or 9 processing goes to J16. Otherwise, if the game is not high/low, the card values from high register 182 are placed in full hand register 198 and processing goes to J30. If the game is high/low and the low value 184 is better than the high value 180 (both 180 and 184 equal 0 and the first card value of 186 is less than the above low peg 195), the card values from low register 186 are placed in register 198, otherwise the card values from high register 182 are placed in register 198. In either situation processing goes to J30.

At J16, if low hand value 184 is 0 (no pair), low card values 186 are put in full hand register 198, high card values 182 are merged into and processing goes to C30. Otherwise, if merged possibilities register 194 contains non-zero values, possibilities register 194 are put into full hand register 198 high card values 182 are merged 198 into and processing goes to J30. If register 194 contains no non-zero elements, high card register 182 is placed in register 198 and processing goes to J30.

At J30, if full hand register 198 contains both 14 and 1 values, each ace must be resolved. If the low hand value 184 is zero or possible low value 192 is non-zero and less than the peg low 195, each ace with a value of 14 is removed from 198, otherwise each ace with a value of 1 is removed from 198.

If the player's hand contains more than five cards, the above processing may have included such cards in full hand register 198. If all player cards are not included in 198, all such card values are added to the end of full hand register 198 as excess cards 196.

Figures 22A, 22B:
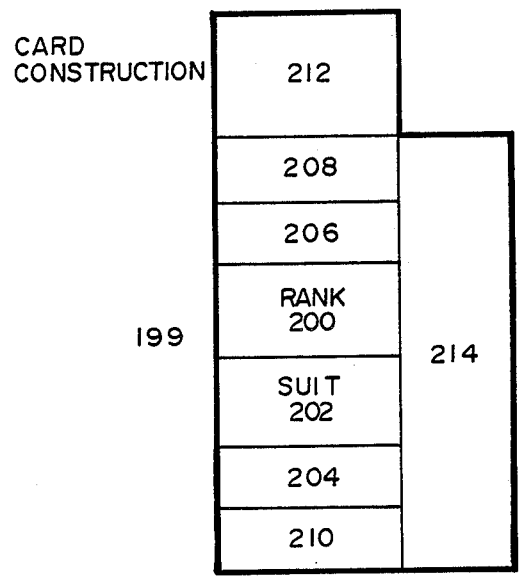
FIG. 22A is a schematic diagram showing the combined hand and values.
FIG. 22B is schematic diagram showing the card construction of an individual card in FIG. 22A.

FIG. 22A shows combined hand and value construction 141. Said construction comprises a number of cards constructions 199. Normally, there will be from one to seven constructions 199. FIG. 22B shows the components (in two dimensions) of each construction 199 as follows: 200 card rank, 202 card suit, 204 suit expansion, 206 rank expansion, 208 high expansion, 210 low expansion, 212 table expansion, and separator expansion 214. The amount or size of each expansion is determined by the corresponding level number. Expansion 206 is represented as being top adjacent to 200 producing rank constructions of varying height, but may surround rank 200 producing rank constructions of varying height and width. Expansion 204 is shown as being bottom adjacent to 202 but may surround suit 202. In a three dimensional construction of 199 such as by holographic means, expansion 206 may be directly above card rank 200 and expansion 204 directly above card suit 202 so that the rank and suit appear to be closer to the player as their expansion level increases.

At J50 (FIG. 21), determine the suit for each card in 198 by matching each value with the originally received cards and place in full hand suit register 220. Place the card suits in high suit register 222 and low suit register 224, for subsequent card identification for expansion levels.

At J60, each card value in full hand register 198 is then processed as follows. Card rank 198 is put in rank component 200. Card suit is put in suit component 202. If card 198 is an up card, the maximum level which connects the card to upper screen 123 is placed in table expansion 212 as shown for the Jack of diamonds in FIG. 27. A card chosen for discard by the player has a blinking table expansion 212 towards upper screen 123 as shown for the Six of hearts in FIG. 28. If card is the last card in 198 processing goes to J80.

At J70, separator level 214 of the card in 198 is determined with respect to the next card as sequenced in full hand register 198 with further respect to order level 216 of the sequence as determined above. In other words, the rank value of the card is compared against the rank value of the next card in 198. FIG. 25A level shows sample separator levels 214 for all situations. The essential factor in level assignment is that a hand with an order level 216 of one (in which sequence is of primary importance) have separator levels distinct from any other separator level for differences in successive register 198 cards of one or two rank values. Said two levels 214 distinguish actual and potential straights (and straight flushes) from all other poker hand values. Processing then goes to J60 to process the next card in full hand register 198.

At J80, if possible flush register 188 contains three non-zero elements, (i.e. three cards of the same suit) then the suit expansion level is one for all corresponding cards in full register 198. If register 188 contains four non-zero elements, then suit expansion level is two for all corresponding cards in register 198. If high value register 180 is two or three (two pair or three of a kind), the suit expansion level may be one level less to indicate the lesser significance of the possible flush. If high value register 180 is a five or eight, the five cards of full hand register 198 which correspond to the five cards of high register 182 will have suit expansion level three. The aforementioned suit levels are placed in suit expansion 204.

All cards in full register 198 are given rank expansion level one except for excess cards 196 (whose level remains at zero). If more cards can be received and high value 180 contains a code for matching ranks or no pair, all of the first matching ranks of high register 182 are rank level two as shown in FIG. 25B. (If a plurality of additional cards can be received, the rank level may be three.) Thus a no pair hand has the high card indicated for potential improvement to the pair level, a one pair hand has the pair indicated for potential improvement, a two pair hand has the first pair indicated for potential improvement, and so on for three of a kind and full house. Four of a kind can only be improved if the deck can provide five of a kind. Straights and flushes have no rank match improvement within seven cards.

If the game is not high low processing goes to J90. High significance—levels 0 through 5 may be used for said expansion where each successive card of an attained high value may be 1 expansion level less for each lower card rank. For maximum distinction fewer intermediate expansion levels may be utilized in hands in which the maximum attained high hand contains less than 5 rank differences. See FIG. 26A for an illustration of high significance levels. Only the high card of a high code 0 hand is considered to have any greater significance than the other cards. High significance is computed for the cards in the high register 182 and then placed in the corresponding high level 208 for each card in 182. In an alternate embodiment, only the first matching ranks for cards in high register 182 have a non-zero high expansion level.

Low significance—levels 0 through 5 may be used for said expansion where each successive card of the low value may be 1 expansion level less for each lower card rank. See FIG. 26B for an illustration of low significance levels. For a low code 0, each card has a different low significance. Low significance is computed for the cards in low register 186 and then placed in the corresponding low level 210 for each card in 186. In an alternate embodiment, only the first matching ranks for cards in low register 186 have a non-zero low expansion level.

If no more cards can be received, processing goes to J90. If a possible low value is a non-pair, the high value card of the possible low card is given a partial (perhaps, V-shaped) expansion to the maximum level in low expansion level 210.

The above logic also applies to card decks with more than four suits and or more than thirteen ranks. Although the logic is shown for poker hands in which at most five cards are significant, it could readily be expanded for the any defined value of more than five-carded hands with appropriate adjustment to the code values 180 and number of elements in registers 182 and 186.

At J90, the above combined card and value construction for each card 199 in full hand register 198 is displayed in area 141 of the player's lower screen. Processing returns to H20.

The afore described expansion levels distinguish each attained poker hand value, which for high poker comprise the ten values corresponding to the ten different value codes (zero through nine) from any other attained poker hand value. Further, improved poker hand values with respect to the rank, suit, and consecutiveness of a plurality of additional cards is also distinctive for each attained poker hand value. The rank value within the individual hand values are distinguished by the displayed card ranks. For example, an ace high straight or straight flush (often called a royal flush) versus a king high straight or straight flush, or three jacks versus three tens.

Any values given to the various expansion levels which visibly distinguish the levels are believed to be within the scope of the instant invention. Since the cards are displayed on a single horizontal axis, a vertical expansion distinction of one pixel height may be distinguished visually in relationship to the other expansions for suit, rank, high, and low expansion levels. Since there are a plurality of cards shown on the horizontal axis, the expansion distinction for each separator level must be more than one pixel wide. Distinguishable separator levels may be as follows: level zero—no pixel width expansion, level one—one pixel width expansion, level two—three (or four) pixel width expansion, level three—eight pixel width expansion. The entire horizontal width of card display 141 is kept to a minimum (for example, five inches) both to eliminate any player eye motion and to minimize the width which is covered by filter 95A. Any decrease in the width of filter 95A allows a decrease in distance between filters 47B and 47C which increases the distance in which the image of display area 141 is restricted from the view of players to either side.

In FIGS. 24A–F and 32 through 34F, the following conventions are utilized: 180-n indicates high value code n; 184-n indicates low value code n; 204-n indicates suit expansion 204 level n; 206-n indicates rank expansion 206 level n; 208-n indicates high expansion 208 level n; 210-n indicates low expansion 210 level n; and 214-n indicates separator expansion 214 level n.

Figure 32:
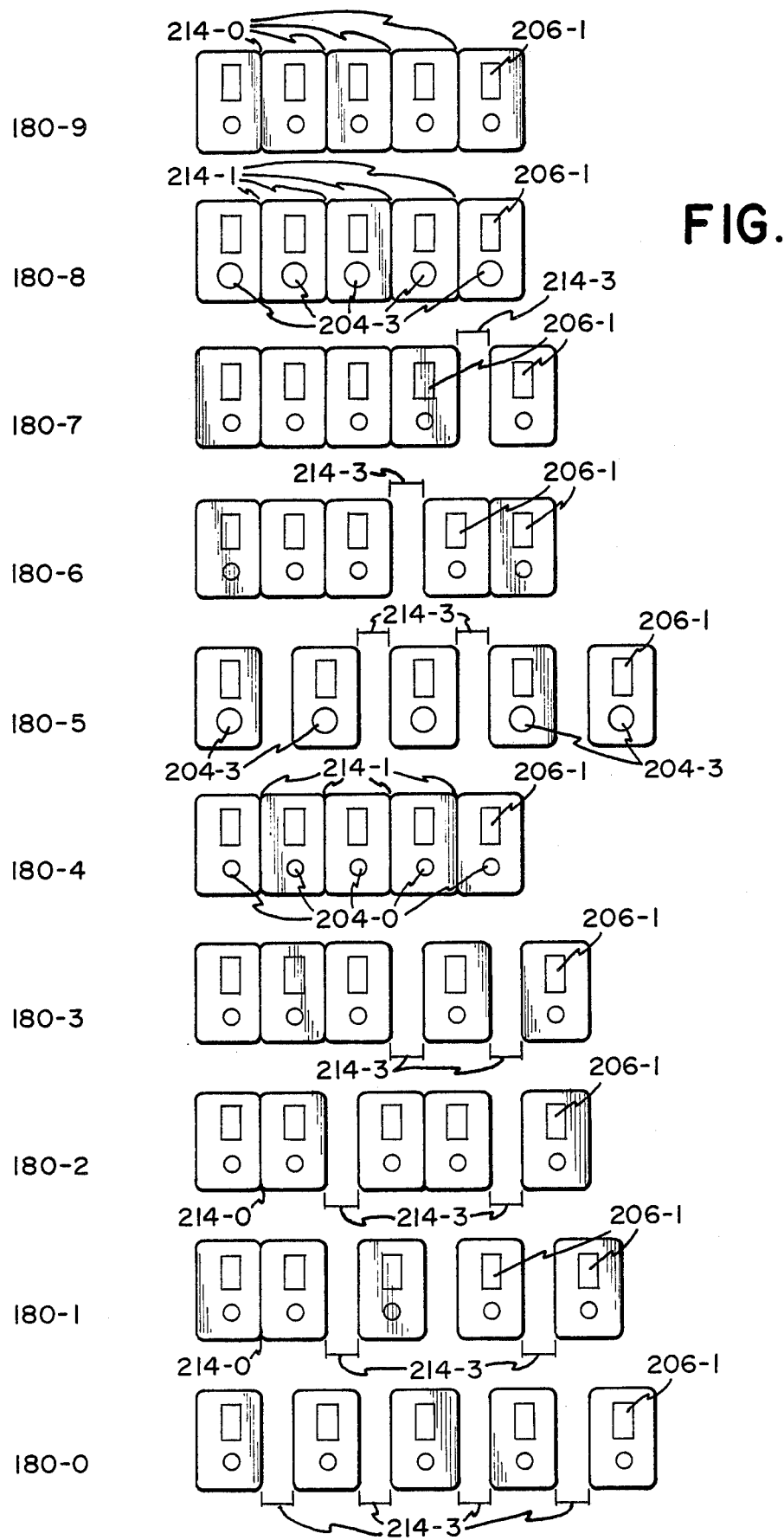
FIG. 32A illustrates the expansions for all defined 5-card high poker values according to one embodiment of the invention.

FIG. 32 shows the expansions for all defined high values of five cards when no additional cards are possible and comprises: 180-9 Five of a Kind; 180-8 Straight Flush; 180-7 Four of a Kind; 180-6 Full House; 180-5 Flush; 180-4 Straight; 180-3 Three of a Kind; 180-2 Two Pair; 180-1 One Pair; and 180-0 Less than a Pair. FIGS. 32 through 34F are for high only games and hence require no high, no low, and no possible low expansion.

FIGS. 33A through 33M show the expansions for five cards when only one additional card is possible. FIGS. 33A through 33M show as follows: A—any full house, B—flush with possible straight flush, C—straight with possible flush or straight flush, D—any three of a kind, E—any two pair, F—one pair without any possible non-rank improvement, G—one pair with possible flush, H—one pair with (open ended) possible straight, I—one pair with (inside) possible straight flush, J—no pair without any possible non-rank improvement, K—no pair with possible flush, L—no pair with possible (inside) straight, M—no pair with possible (open ended) straight flush.

FIGS. 34A through 34F show further expansions for five cards when two additional cards are possible. All of the displays of FIGS. 33A through 33M are possible. In addition, the possible straights, flushes, and straight flushes of FIGS. 33A through 33M are also possible with only three of a suit or three cards within a rank difference of four. FIGS. 34A through 34C show additional possibilities for three of a kind as follows: A—possible straight flush, B—possible flush, C—possible straight. FIGS. 34D through 34F show additional possibilities for two pair as follows: D—possible straight flush, E—possible flush, F—possible straight.

For example, a royal flush plus a 5 and a 3 would have a high code of 8, 14, 13, 12, 11 and 10, and a low code of 0, 11, 10, 5, 3 and 1. FIG. 24A shows said hand construction. A full house of aces over 9's plus a jack and 4 would have a high code of 6, 14, 14, 14, 9, and 9, and a low code of 1, 1, 1, 11, 9, and 4. FIGS. 24A through 24F show hand construction 141 for 7-card stud hands and hence have no additional potential value. FIG. 24C shows a hand containing a flush, and a straight but not a straight flush, and five low, and a pair of kings. FIG. 24D shows a hands containing a flush, a jack low, and an extraneous two pair. FIG. 24E contains three of a kind and a six low. FIG. 24F shows the same cards in a high only game.

FIG. 27 shows 141 for a 3-carded hand. The application of construction 141 should be clear for other hands with less than five cards.

The same evaluations are made for the up-cards (cards 3–6) for each of the players hands and are used to determine the high value and, consequently, the location of the hand on each of the player's screens. Since only four cards are evaluated, it is impossible to have a code of 4, 5, 6 or 8 for the maximum of four up cards.

After each display of an up card, a round of betting takes place in which each player can either call, raise, or drop out of the hand. As indicated previously, at the end of the bet event the displays for those players who have dropped out of the hand are removed from each of the player's upper screen portion 123, and the pot amounts in 136 and each of the player amounts in 134 are adjusted according to their actions.

If no player calls or raises the bet which was generated by the computer, the hand is ended and a showdown, as will be described, takes place among all players who were in the pot prior to this bet. If only one person calls he wins the pot. If there are calls but no raises, the game proceeds with dealing the next card. If there are any raises, the total amount of these raises, subject to the overall game betting limits, will appear in the bet amount area 128 of each player's screen. In the Skill III embodiment, the bet amount 128 may be the total of all raises without any limitation. In the Skill I embodiment, the bet amount 128 to which each player must respond may be the set of all raises truncated at a specified number of raises amounts such as three raise amounts whenever there are more than three raisers. If there are a plurality of raisers in the Skill II embodiment, the bet amount 128 to which each player must respond may be the set of all raises reduced by one raise amount in games with less than nine players and said bet amount may be the set of all raises normalized for eight players in games with more than eight players. For example in a game with eight players and three raisers the bet amount 128 would be two raise amounts. In a game with sixteen players and six raisers, the bet amount 128 would be three raise amounts which equals the number of raisers, six, multiplied by the normalization factor, eight, divided by the number of players, sixteen or $3 = 6 \times 8/16$. Any resultant fractional raise amounts may be rounded to the nearest unit of wager. The above truncations, reductions, or normalizations in Skill I and II embodiments serve three purposes: to equalize the amount wagered by each player in games of varying sizes, to minimize the use of bluffing, and to reduce the effectiveness of possible surreptitious player partnerships (which was also reduced by the substantially simultaneous initiation of all raises). A raise symbol, such as an arrow, will appear over the current card of all raisers in display element 123. For this round of betting, the player may be restricted to either calling or dropping out of the hand. The hands of those players who drop will disappear from element 123 at the end of the bet event. In Skill I and II embodiment, if the bet amount 128 is three raise amounts, the call amount for each non-raiser is three raise amounts, while the call amount for each raiser, regardless of the number of raisers, is two raise amounts, (Each raiser and non-raiser responds to the same set of initiated wagers but that portion of amount 128 which is attributed to said raiser, obviously, requires no dollar amount even if the same raise amount is attributed to a plurality of players as may occur in said skill embodiments). In said skill embodiments, no player may raise. In the Skill III embodiment, a raise value amount which equals the needed call amount plus a predetermined second raise amount may be allowed. If said raise is made by any player, there will be another bet event prior to the next deal event—or prior to the showdown event if there is no next dealt event.

The next up-card will then appear in each player's hand display area 138 and on the upper portion of the screen 123. The new cards in 123 will appear at the same time immediately to the right of each last previously shown card. All hands will briefly disappear from 123 on the screen, and reappear one at a time in the order of the new high value of their up-cards. Seat numbers, and raise, and all-in symbols will reappear along with the resequenced hands.

The players will again call, raise, or drop from the hand as described above. This process will continue until four up-cards are dealt and acted upon by the players.

The last card dealt in 7-card stud is, of course, a down card and appears only on the individual player's lower screen portion 138. Card back symbols 161 will appear on the upper portion of the screen 123 to the immediate right of the fourth up card of each player to distinguish the appearance of upper screen area 123 from its appearance after the sixth card and to provide a location above which possible raise symbols 162 and all-in symbols 164 may appear. After dealing this last card, each of the player's cards are again evaluated for high/low values and these evaluations appear on his screen at 140 as noted above. If no one raises, the game goes to a showdown for the best hands. All of the players' hands are removed from the upper portion of the console monitors and the winning high and low hands are displayed in area 123 along with the winning dollar amount for each of the hands. However, if one or more players raise the bet following the last card, these players are indicated on the upper portion of the screen 123. Other players then have the opportunity to call or drop out as previously described. At the conclusion of this betting round, the winning hands are displayed on the screen along with their winning amounts, with the amounts being shown on the winners' console screen and credited to their stake. During the showdown display, instructions to order food or drinks or to summon the cashier may appear on the console monitor in display element 130. In the automated cashier embodiment, the player may input additional money at this time. If the player has attained a hand whose value merits a bonus payout, the bonus amount will be displayed to the player and added to his stake.

If a player decides to cash-in at this time, he pushes the appropriate button to summon the cashier. The player's request will be noted and displayed on one of the overhead monitors 32 to direct the cashier to his console. When the cashier enters the cash-in code on his keyboard 74 the player monitor 90 will show the amounts to be paid to the player and/or instruct the cashier to check the supervisor for amount confirmation. At the conclusion of the cash-in transaction, the player's console display returns to its initial format showing the rules of the game.

In table stakes poker, a player may put only as much into the pot as is remaining in his stake. This limitation creates what is known in the poker as "side pots". Poker players who are unable to put the full amount into the pot are said . . . to the all-in for a "side pot". In order to clarify said situation for players at all experience levels, the all-in terminology may be replaced by "$0 Left" and the all-in symbol 164 by the "o" symbol 164A. If there are ties for the winning hands, the pot must be divided in accordance with the amounts put in by the winners. If the game is high/low split, there must also be further division of the pot to accommodate the high and low value winners. In regular poker games, it sometimes requires several minutes to properly divide up a pot in which several winners have put in varying amounts. Since the invention accommodates many more players than usual and the possibility of ties is made somewhat greater by the use of several decks of cards, the contribution of different amounts to the pot by some of the players renders the pot division rather complex.

However, the division of the pot can be achieved by sorting the six code registers for each of the players still in the pot at the showdown by descending value, plus sorting them by ascending amounts of money that the player has put into the pot. Players sharing in the distribution of the pot will include all up to the first player in the above sort sequence who has put in the maximum amount that any other player has put in. It should be noted that each of the player's contributions to the pot is divided in half to provide a pot for the high winner and a pot for the low winner. The division of the pot will be discussed in terms of the high winner, but it is understood that the analysis is the same for determining the low winner, except that the six code registers are sorted in ascending code order.

In the simplest solution, if the first player in the sorted order has put in the maximum amount and the second player has a lesser value on the six code register, the first player receives the entire high half of the pot.

If, however, the first player has not put in the maximum amount and various players have tie hands, the situation becomes more complex. The situation will be explained in reference to the example in Table 3.

The amount that each winning player is entitled to is equal to any player's remaining amount in the high (or low) pot after the shares for all previous winners have been subtracted, divided by the number of ties with this player's hand which have not as yet been subtracted.

In Table 3, a complex situation is shown in which seven players are entitled to a share of the high portion of the pot. In this Table, players A-D are tied for the high hand with a flush, while players E and F are tied with each other with a lower value flush. Player G has a straight and has no ties. Player A, who has contributed $80.00 to the pot ($40.00 for the high half of the pot) will receive a portion of each player's contribution to the high pot up to a maximum amount of $10.00 from each player. The $10.00 is arrived at by subtracting the previous winners shares (in this instance zero) from his contribution to the high pot ($40.00) and dividing this amount by four (the number of players tied for the winning hand). Thus, as can be seen from Table 3, player A will receive $10.00 from each of players A-G and J-P (who have contributed $40.00 or more to the high pot), in addition to $1.00 from player H and $5.00 from player I. Thus, A's total winnings for this hand will be $146.00. Player B will also receive a portion of each of the players contribution to the high pot up to a maximum of $12.00 from each player. Again, this figure is determined by taking player B's contribution to the high pot ($46.00), subtracting the share for all previous winnings ($10.00 paid to player A) and dividing this amount by three (the number of ties for the winning hand remaining). Thus, player B contributed $46.00 to the high pot and by subtracting the $10.00 for player A and dividing by 3, the maximum amount of $12.00 is achieved. Player B's winnings of $169.00 include $10.00 from player A, $12.00 each from players B-G and L-P, $11.00 from player K, $10.00 from player J, $5.00 from player I and $1.00 from player H.

Player C will also receive a maximum of $12.00 from

TABLE 3

| Player | High Hand | In Pot | High Half | A | left | B | left | C | left | D | left | E | left | F | left | G | left |
|---|---|---|---|---|---|---|---|---|---|---|---|---|---|---|---|---|---|
| A | Flush | $80 | $40 | 10 | 30 | 10 | 20 | 10 | 10 | 10 | 0 | | | | | | |
| B | -tie | 92 | 46 | 10 | 36 | 12 | 24 | 12 | 12 | 12 | 0 | | | | | | |
| C | -tie | 92 | 46 | 10 | 36 | 12 | 24 | 12 | 12 | 12 | 0 | | | | | | |
| D | -tie | 100 | 50 | 10 | 40 | 12 | 28 | 12 | 16 | 16 | 0 | | | | | | |
| E | lower flush | 112 | 56 | 10 | 46 | 12 | 34 | 12 | 22 | 16 | 6 | 3 | 3 | 3 | 0 | | |
| F | -tie | 120 | 60 | 10 | 50 | 12 | 38 | 12 | 26 | 16 | 10 | 3 | 7 | 7 | 0 | | |
| G | straight | 140 | 70 | 10 | 60 | 12 | 48 | 12 | 36 | 16 | 20 | 3 | 17 | 7 | 10 | 10 | 0 |
| others | | | | | | | | | | | | | | | | | | |
| H | | 8 | 4 | 1 | 3 | 1 | 2 | 1 | 1 | 1 | 0 | | | | | | |
| I | | 40 | 20 | 5 | 15 | 5 | 10 | 5 | 5 | 5 | 0 | | | | | | |
| J | | 80 | 40 | 10 | 30 | 10 | 20 | 10 | 10 | 10 | 0 | | | | | | |
| K | | 86 | 43 | 10 | 33 | 11 | 22 | 11 | 11 | 11 | 0 | | | | | | |
| L | | 104 | 52 | 10 | 42 | 12 | 30 | 12 | 18 | 16 | 2 | 1 | 1 | 1 | 0 | | |
| M | | 116 | 58 | 10 | 48 | 12 | 36 | 12 | 24 | 16 | 8 | 3 | 5 | 5 | 0 | | |
| N | | 124 | 62 | 10 | 52 | 12 | 40 | 12 | 28 | 16 | 12 | 3 | 9 | 7 | 2 | 2 | 0 |
| O | | 140 | 70 | 10 | 60 | 12 | 48 | 12 | 36 | 16 | 20 | 3 | 17 | 7 | 10 | 10 | 0 |
| P | | 140 | 70 | 10 | 60 | 12 | 48 | 12 | 36 | 16 | 20 | 3 | 17 | 7 | 10 | 10 | 0 |
| Total winnings | | | | $146 A | | $169 B | | $169 C | | $205 D | | $22 E | | $44 F | | $32 G | |

The amount that the first player in either winners queue is entitled to is subtracted from the amount that each player, including those who have dropped from the hand, has put into each half of the pot. If there is another player in the winners queue who is entitled to part of the pot, the above process continues on the remaining amounts in each player's pot contribution remaining after the withdrawal for the previous winner.

each player's contribution to the high pot. This is determined by adding the amounts previously paid to players A and B ($10.00 and $12.00) and subtracting this amount from player C's contribution to the high pot ($46.00) and dividing the result by 2, the number of ties not as yet subtracted. Thus, as indicated on Table 2, player C's total winnings will also be $169.00 since C's hand is tied with player B and both have contributed the same amount to the pot.

A similar analysis can be made to determine player D's winnings of $205.00. After players A–D have received their winnings, there is still money left in the high half of the pot since other players put more money into the pot than any of the winners, as illustrated in Table 3. Continuing the above described pot splitting procedures will yield a return of $22.00 to player E, $44.00 to player F, and $32.00 to player G.

A similar analysis is undertaken to determine the winner or winners of the low half of the pot. The house cut will be deducted from the amount returned to each winner. Calculations of all dollar amounts including high portion of the pot). For the first player in the sort, his return equals his pot amount divided by the number of ties (if any). The following process continues until all players who are entitled to the full pot have their return computed. If the next player is tied with the preceding, the difference between said player's pot and the preceding player's (which will be zero if both pots are equal) is divided by the number of remaining ties and added to the return of the preceding player. As soon as a non-tied hand is reached, the amount returned to the preceding player is considered zero for carry over purposes. Table 3A shows the above computations applied to the same situation and returns as shown in Table 3. The last column of

TABLE 3A

| | | | | Return to High "Winners" (Alternate Embodiment) | | | | | | |
|---|---|---|---|---|---|---|---|---|---|---|
| Player | High Hand | In Pot | Players's GrossPot | High Half | Previous Player $ | Ties | High-Pre$ /Ties | CARRY | TOTAL High Win | Player's Net Pot |
| A | Flush | $80 | $1168 | $584 | 0 | 4 | 146 | 0 | $146 | 1022 |
| B | -tie | $92 | $1306 | $653 | $584 | 3 | 23 | 146 | $169 | 1142.75 |
| C | -tie | $92 | $1306 | $653 | $653 | 2 | 0 | 169 | $169 | 1142.75 |
| D | -tie | $100 | $1378 | $689 | $653 | 1 | 36 | 169 | $205 | 1205.75 |
| E | lower flush | $112 | $1466 | $733 | $689 | 2 | 22 | 0 | $22 | 1282.75 |
| F | -tie | $120 | $1510 | $755 | $733 | 1 | 22 | 22 | $44 | 1321.25 |
| G | straight | $140 | $1574 | $787 | $755 | 1 | 32 | 0 | $32 | 1377.25 |
| H | LESS | $8 | $128 | | | | | | 0 | 112 |
| I | | $40 | $608 | | | | | | 0 | 532 |
| J | | $80 | $1022 | | | | | | 0 | 511 |
| K | | $86 | $1240 | | | | | | 0 | 1085 |
| L | | $104 | $1410 | | | | | | 0 | 1233.75 |
| M | | $116 | $1490 | | | | | | 0 | 1303.75 |
| N | | $124 | $1526 | | | | | | 0 | 1335.25 |
| O | | $140 | $1574 | | | | | | 0 | 1377.25 |
| P | | $140 | $1574 | | | | | | 0 | 1377.25 | current player stake may be computed to several decimal places, but the stake amount shown on the player's console may be displayed and paid to a whole dollar amount obtained either by rounding or truncation.

Another embodiment may be needed to satisfy possible regulatory requirements to replace the pot amount (without any casino cut) 126 by the pot amount minus the casino cut 126A or to replace or append 126 or 126A with the pot amount to which the player is actually entitled if the player is all-in, side pot without any casino deduction 127 or side pot minus casino deduction 127A.

The pot amount to which any player is entitled can be calculated after each bet event by adding the amount that said player is entitled from each player to the pot amount of said player prior to the bet event. So long as all players have not gone all-in, each player is entitled to the same pot amount. As soon as a player goes all-in, the pot amount for said player is the previous pot plus whatever amount the all-in player put in times the number of players putting in at least as much as the all-in player. For example, if sixteen players have put in $5, the pot for all players is $80. If for an additional $5 bet player H can only put in $3, player H is entitled to a $128 pot, 80+($3×16), whereas the other 15 players, who put in the full $5, are entitled to a $158 pot, $128+($2×15). Table 3A shows the pot amount to which Players A through P in the previous analysis are entitled using the same amounts put into the pot as shown in Table 3.

If separate pot amounts are calculated for each player, an alternate method of return computation is simpler than the previously described return computation. For the high return, the players are sorted by decreasing hand value hand by amount of their individual pot amounts (which are subsequently halved for the Table 3A shows the individual pot amounts that may be shown in 127A if there were a casino cut of 12.5%. Performing the same above computations with half of the amounts of the last column, will yield the same net return that a 12.5% cut of each of the amounts in the Gross Return (next to last column) will yield.

Utilization of the method shown in Table 3A, provides another embodiment wherein the casino cut percentages may vary from player to player. In particular, players who are losing more than a specified amount may have a smaller than normal casino cut deducted. The casino cut for such players may even be negative. A negative cut would award said players with additional money provided by a portion of the money that the casino collected in other pots.

In the instant invention, the pot may be divided into more than the two portions found in regular poker and all such portions need not be equal. Various splitting schemes may be used such as dividing the pot between the best high and best low hands containing any specified cards or by awarding the best high and low hands 43% of the pot and the next best high and low hands 7%. Computations for the returns to the winners would be similar to those described above except that fractions other than one-half of the amount each player puts into the pot would be used.

If a player drops out of the 7-card stud game prior to the appearance of the third up-card, he may be automatically entered in a consolation round of 5-card draw. In other embodiments, draw may be the only game played or may be selected by player choice. Prior to a player's first assignment to a draw pot, the following may be displayed. Instructions for the 5-card draw game as well as the betting limits may be displayed on the player's console in area 123 as shown below:

---
5-Card Draw
High and Low Hands Split the Pot
(Lowest Hand is 5-4-3-2-A)
Maximum draw is 5 Cards
The number of card decks being used is shown but you can't get duplicate cards

Figure 28:
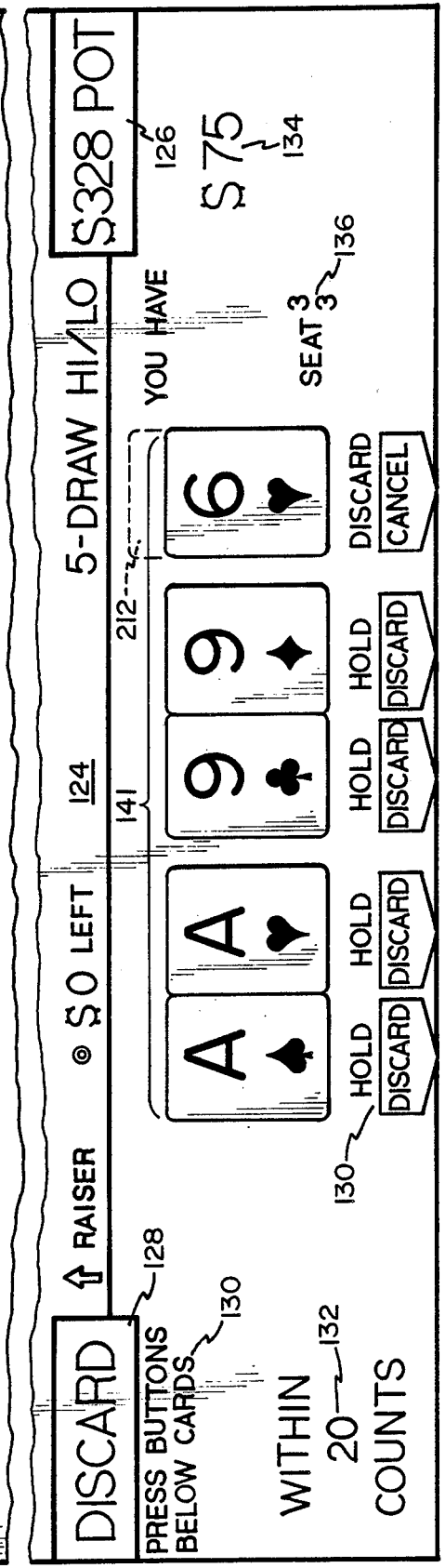
FIG. 28 is a partial view of the video display shown on each player console for a 5-card draw poker game according to the invention at the time of the draw.

| Before Draw | After Draw |
|---|---|
| Bet * | * |
| Raise * | * |
---

Where each "*" may be a fixed dollar amount or a percentage of the pot. In the Automated Cashier embodiment, the player will have the option to initiate a payout. As previously described, player identification data for the Skill III embodiment will next be displayed. The ante amount will appear in display element 128. Instruction to order food or drinks or call the cashier will appear on the lower portion on the screen. Five cards then appear on the lower portion 138 of the player's screen. The five card display is similar to the player's display format in the 7-card stud hand except, as shown in FIG. 28, only five cards are shown. The player's cards will be displayed or hidden depending upon the player's use of the show/hide button. Each of the players hands are quantified, by the method noted above, and the high and low values are displayed at 140 on their screens if the show/hide button is in show status. In an alternate embodiment, player cards and their value will appear in area 141 by constructing each card such that poker value of the entire set of cards is immediately and clearly conveyed to the player as has been previously described.

The computer generated opening bet is shown in display element 128 on each player's screen. The game legend in 124 is the same as for the 7-card stud game except that the name of the game is shown as 5-card draw. Player instructions are displayed in 130 and the timer in area 132. The player may call, raise, or drop as previously described. The amounts in bet area 128 and pot 126 are the same for all players. The amount it will cost to call or raise will be the same for all players with sufficient stake to raise. For all players possessing less than the bet amount, the call amount will be their remaining stake. All players possessing less than the raise amount will not be allowed to raise. If there are any raises, the seat numbers of all players who have raised and any who are all-in are shown in the display element 123 with the same symbols above the seat numbers as were used in the 7-card stud game, and the player has another opportunity to call or drop as described for the 7-card stud game for Skill I and II embodiments. In the Skill III embodiment, the players may call, raise, or drop out, and there may be another bet round as have been described for the 7-card stud game. The call or raise amounts from each player are added to the pot.

Those players who have called all bets remain in the hand and must now decide which (if any) cards they wish to discard. The player indicates a discard by pressing the button on button panel 108 which is pointed to by the arrow tip under each card. All discard decisions must be made within the specified time period (before the timer shown in area 132 reaches zero) in the Skill III embodiment. Another button may be utilized to indicate that the decision for discarding is complete which may shorten the draw event time if all the players in the pot have similarly indicated discard completion. In the Skill I embodiment, the best discard action will be shown for those who have not indicated said completion during the draw event. In the Skill I and Skill II an alter event will be created for the pot if all players in the pot have not indicated said completion. As soon as a discard button is pressed, the card to be discarded. If there is sufficient time on timer 172, the player may cancel a discard by again pressing the button below the discarded card. FIG. 28 shows a sample display for elements 124 through 132 after one discard button has been pressed (under the six of hearts card) by player #33.

When the draw event is completed, each card to be discarded is replaced by a new card which is not a duplicate of any card in the player's hand (including cards discarded). In Skill I and II embodiments, the first card drawn by every player comes from a new deck of fifty-two cards. The second drawn card from a second new deck, etc. Otherwise, the dealing technique for the entire hand is the same as described above for 7-card stud. After the draw each player's hand is quantified by the previously described method for high and low values which appear in display element 140 or combined hand and value element 141. The upper portion 123 of each player's console, displays the number of cards drawn by each player along with any raise, and all-in symbols.

Figure 29:
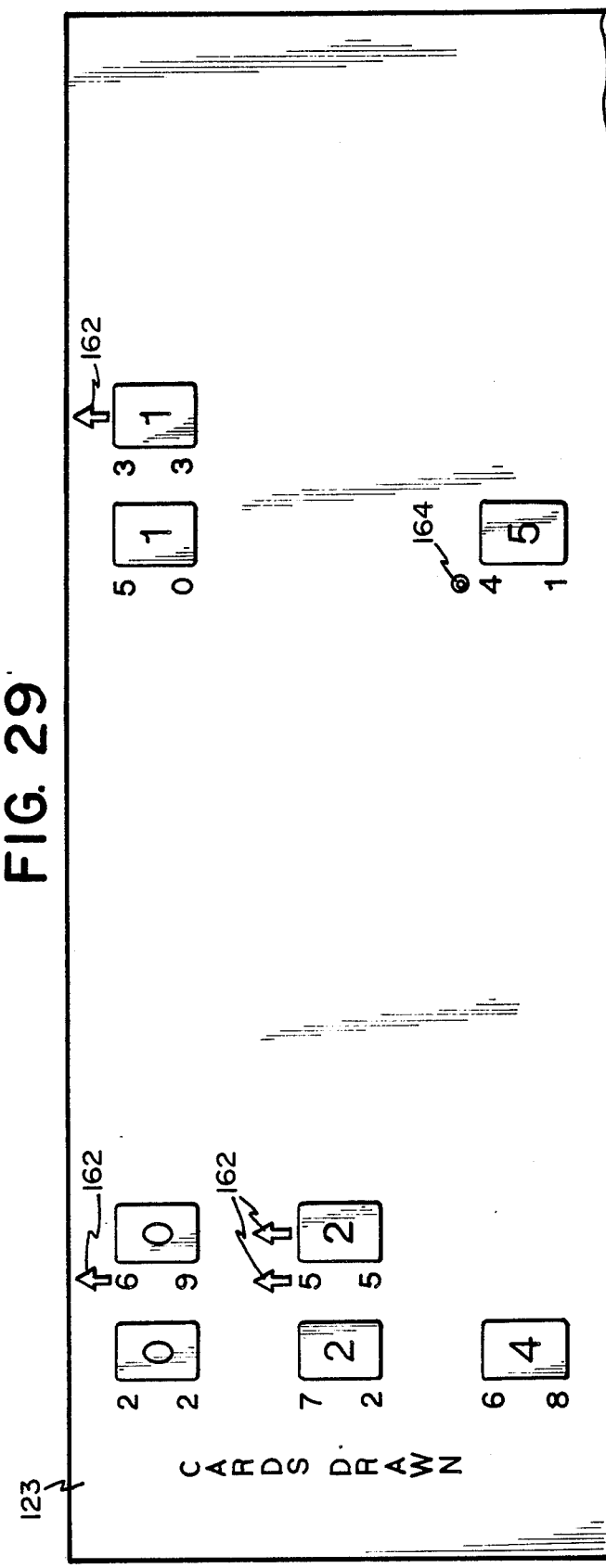
FIG. 29 is a partial view of the video display shown on each player console for a 5-card draw poker game according to the invention after the last raise round.

Another round of betting takes place after the draw in which players have another opportunity to call, raise or drop. Symbols for actions taken after the draw will appear over box 161 to the right of any symbols for pre-draw actions over the player seat number, and the last raise symbol may blink. FIG. 29 shows a sample display of element 123 after post-draw raises have been indicated. For sake of example, player #55 raised before and after the draw as indicated by arrows 162 appearing above his seat number; player #69 raised before the draw only indicated by arrow 162; and player #33 raised only after the draw. Also, player #41 was all-in before the draw as indicated by symbol 164A. The player seat numbers are displayed in ascending order according to the number of discards. The number of discards are shown in the card back box 161 for each player.

Following the second round of betting, the hands are quantified as previously described in relation to the 7-card stud game and the draw game proceeds to showdown. If a player drops out during the draw game, his cards are removed from his display screen and, obviously, the player receives no further cards. Cashier information, food/drink orders or other promotional messages may be displayed on his screen at this time. The dropped players hands are also eliminated from the upper screen section 123 of the remaining players. During the showdown, the winning hands are displayed on the upper portion 123 of each player's screen along with the winning amount for each hand. The winning amount for each hand is determined by the method previously described in relation to the 7-card stud game. The winners' stakes are appropriately increased. The winning hands for the 7-card stud game may also be displayed for the players information in the consolation game embodiment. At this time any bonus awards are added to the player's stake as previously described.

Table 4 shows an approximate display time for each of the events for both the main 7-card stud game and the consolation draw game. The total time from the initial display of the rules and limits for the 7-card stud game through the maximum number of bets and raises is envisioned to be approximately two minutes. The time available for the players to make their decisions is kept to a minimum in order to increase the concentration on the part of the players and to keep the game moving along at a pace such that the players do not lose interest. Quite obviously, the Table 4 time for each event entity can be altered depending upon the skill level of the participants, number of players, amounts bet, or various other factors.

Table 4 also illustrates a simplified sample event queue for the simultaneous playing of two games. The time entities in the table may represent more than a single event as events were defined in the previous Program Logic section. The rules/limits time for the 7-card stud game consists of start hand and deal (3 cards) events. The bet-1 time consists of show value, bet, and call events. Each of the bet-2 through bet-5 times consist of deal (1 card), show value, bet, and call events. Each of the raise-1 through raise-5 times consist of bet and call events, and the showdown time for 7-card stud consists of a winner and a bonus event.

The first rules/limits time for 5-card draw consists of the start-hand event. The second such time continues the start-hand event and also consists of a deal (5 cards) event. The pre and post draw bet times consist of bet and call events as do the pre and post raise times. The discard time consists of draw, deal (as many as discarded), and show value events, and the showdown time for 5-card draw consists of a winner and a bonus event.

TABLE 4

| Approximate display time in seconds for each event | | |
|---|---|---|
| Total time | Main 7-stud game | Consolation draw game |
|  | rules/limits |  |
| :04 | :04 |  |
|  | bet-1 |  |
| :18 | :14 |  |
|  | raise-1 |  |
| :25 | :07 |  |
|  | bet-2 |  |
| :39 | :14 |  |
|  | raise-2 | rules/limits |
| :46 | :07 | :07 |
|  | bet-3 | rules/limits |
| :60 | :14 | :03 |
|  |  | pre-draw bet |
|  |  | :14 |
|  | raise-3 | pre-draw raise |
| 1:07 | :07 | :07 |
|  | bet-4 | discard round |
| 1:21 | :14 | :14 |
|  | raise-4 | post-draw bet |
| 1:28 | :07 | :13 |
|  | bet-5 | post-draw raise |
| 1:41 | :13 | :09 |
|  | raise-5 | showdown |
| 1:48 | :07 | :11 |
|  | showdown |  |
| 2:00 | :12 |  |

The time entities of Table 4 correspond to the times of the event entities. From a time standpoint, the minimal time needed for the call event can be considered either as the last event of one time entity or as the first event of the next time entity.

In the consolation game, the CPU generates a series of pots containing successively 52 or all players, less than all players, all players, less than all players, . . . , all players, less than all players, . . . (until the game is closed).

The game size (number of players in the game) is independent of player action in the even numbered games in said series. In the plurality of game sizes, the players enjoy substantially continuous play, i.e. players participate in a new game without waiting for the conclusion of the game in which they had been participants. The consolation game is a draw game that can be completely encompassed by the 7 card stud game. Moreover the event entity processing assumes a fixed time for each event in the plurality of concurrent games. Alternate embodiments of the instant invention allow for essentially variable times for bet response, since all skill level embodiments can shorten the allotted time, and Skill Levels I and II may lengthen the allotted time by a fixed and variable amounts, respectively. As the number of players is reduced, so is the probability of a raise event, which further varies the time frame of a pot. Large pots produce high player turnover whose desirability is a function of the number of available players in the casino.

In order to minimize player waiting time in each skill level embodiment, players, who have dropped out of a game or who are otherwise available, are assigned to a new game as soon as a sufficient number are available—as will be hereinafter discussed in detail. The term pot will hereinafter be used to describe each game in which the players wager interactively.

If the number of players in each pot is left to chance, said number would tend to equalize. It seems that the average player size for each pot, A, can be approximated by multiplying the total number of players, P, by the average drop rate as compounded by the number of events in the pot that the dropping players may enter a new game, DC, plus one divided by the number of pots, B, or $A = P(DC+1)/+B$. For example, consider 52 players in a game of draw where only those who dropped from the pre-draw bet entered a new pot. If the average drop rate were 50%, after a while, the number of players in each game would be approximately 34 if there were two pots, and approximately 17 if there were four games. The number of concurrent pots possible in the invention is relatively unlimited, but the maximum number of concurrent pots may be set at 16, or approximately one quarter of the total number of players in the system.

Players may be typed or classified by any characteristic that can either be internally measured by the minicomputer software or be specified as input to the system. Measurable characteristics include current amount of winnings or losses, stake amount, speed of action, frequency of calling, and frequency of raising. The construction of pots which consist only of certain player types, such as the speediest players, clearly, increases the game's appeal to both the playing public and the casinos.

A possible element of unfairness in known poker games is the existence of surreptitious partnerships. (The instant invention eliminates the normal opportunities for partner communication, creates situations in which the partners are not even in the same pot, and its simultaneous wagering and raise truncation features reduce partnership effectiveness.) Such partners play in collusion to maximize the winnings and to minimize the losses to the partners as a single entity in each hand. Such collusive play between a plurality of players may be measured in the invention by maintaining a record of the extra profit potentially gained and the savings made by pairs of players in the wagering combinations of the pair. For every pair of players, the simultaneous wagering of the invention reduces to the following combinations: drop and drop, drop and call, drop and raise, call and call, call and raise, raise and raise. The permutations of the wagers are not considered because which member of the pair performed which action is irrelevant if the pair is wagering in collusion. The raise action of the pair is the most significant because of additional money that can be won if one of the pair possesses a very strong hand. In Skill I and II embodiments, the possibility of a bluff raise may be ignored.

The raise activity of each pair may be maintained in a software matrix 250 where the matrix rows and columns represent all of the players in the game by seat number. After each bet event, if there were any raises, the elements of matrix 250 are altered as follows: Each pair of players in the pot are considered so that only the matrix elements above the matrix diagonal are maintained since the order of the pairs is irrelevant. If the first player and the second player both raised, the raise amount (minus the call amount) times the number of players in the pot during the bet event is added to the matrix element. If for the first player and the second players, one raised and one called, the raise amount (minus the call amount) times the number of players in the pot during the bet event is subtracted from the matrix element. If for the first and second players, one raised and one dropped out, the raise amount (minus the call amount) times the number of players in the pot during the bet event minus the call amount is subtracted from the matrix element. If none of the above situations occurred the matrix element is unaltered. The above calculations are made for the first and third, then the first and fourth, etc. until the last (seat numbered) player. Then the same process is repeated for the second player versus the third through last players, until the next to last player versus the last player is considered. The pairs of players with the highest amounts in matrix 250 form a characteristic, suspect, which can be specified for pot mix with available suspects not assigned to the same pot. A similar matrix for a secondary consideration of pairs of players who call and drop when the caller has the better hand may be maintained.

Pots may consist of non-suspect pairs relative to an absolute amount of gain from raise matrix 250 or relative to the mean of the average of all pairs in matrix 250. Both members of any suspect pair are never asigned to the same pot. If the suspect pairs are mutually exclusive, i.e. neither member appears in any other suspect pair, either available member of any pair may be assigned to the pot. For example, if the available players contain the suspect pairs of players A and B, and C and D; A and C may be assigned to the pot (as could A and D, or B and C, or B and D). If the suspect pairs are not mutually exclusive, then only one player from all of the non-mutually exclusive pairs may be assigned to the pot. For example, if the available players contain the suspect pairs of players A and B, and B and C, and C and D, then only player A may by assigned to the pot (or only player B, or C, or D).

If a player moves from one console to another console within the system, the previously maintained statistics for said player will not be carried to the new console unless the system is aware of the move to a new console. A supervision may indicate such a move. Moreover, player aisle 43 may be monitored with respect to entrance announcers 41 and console announcers 111 to provide a tracking process for the current position of all players in the system. The art for tracking merging objects, which are moving at unknown variable rates of speed, is known at least since 1970 when such processing was developed by J. D. H. Sidley & Associates for a large warehouse.

The criteria for all of the aforementioned characteristics may be either absolute or relative. Absolute specification refers to all players either above or below a specified amount, and may or may not apply to a current set of players. For example, losers of more than $100. Relative specification means all players whose measurement for a characteristic is either above or below the current mean (or median) amount for such characteristic, and always applies to a current set of players. For example, the fastest players to respond to the wagered amounts.

The instant invention is able to maintain any specified mix of pot types wherein said types comprise: number of players in the pot, and or the characteristics of players in the pot.

Primary consideration for pot assignment is called Criteria 1. Criteria 1 will be maintained even if it is necessary to delay game assignment in order to achieve. A further but secondary consideration for pot assignment is also defined. Criteria 2 will be satisfied after Criteria 1 is satisfied and may include an optionally specified time delay.

The desired mix of game sizes and types of players for pot assignment, which may be defined by the internal software or by human input, has the following parameters:

Default size 294 which specifies the size for both those pots which do not satisfy any specified criteria and those pots which satisfy a criteria for which no size is specified.

The size may be one number or a range of numbers defined by minimum and maximum number.

Default player size for any pot
  if no specification, size equals two to all.
Criteria 1 specifications:
Mix—mix need (296) divided by mix cycle (298)
  if no specification, no mix considered.
Type (300)—any characteristic measured by system
  if no specification, equated to any player.
Type relator—either less or greater than
Type condition—relative amount within type
  if no specification, considered relative to mean of type.
Size (302)—player size for Criteria 1 pots.
  if no specification, equated to the default size.

The parameters for Criteria 2 are the same as for Criteria 1 except that a mix is not specified but a waiting time 304 may be specified.

Size 306 is the player size for Criteria 2 pot.

A sample set of parameters which would produce one in five pots with any twenty to thirty players, and the remaining four of five pots with eight players whose stake is more than $200 if such a pot can be achieved with no more than a wait of eighteen seconds or otherwise pots of any seven to eleven players, is as follows:

DEFAULT size 7-11,
CRITERIA 1 mix 1/5, size 20-30,
CRITERIA 2 type STAKE >$200, size 8, wait 18.

Any desired pot mix, for example one in five, could be maintained by initiating a Criteria 1 pot every fifth pot. The same mix is achieved in the instant invention by allowing exactly one said pot in any of five consecutive pots, and by delaying the game only if there has not been one said pot in the first four consecutive pots. A mix of two in five is achieved by allowing exactly two said pots in any five consecutive pots, with a possible game delay in the fourth and fifth pots of a cycle. Note that a mix of two in five produces the same portion of pots as does a mix of four in ten but that the former mix is maintained in a shorter cycle and may produce more delays than the latter. Said method is utilized in the invention and is shown in FIG. 15 wherein MADE (302) equals the current number of pots satisfying Criteria 1, and FAIL (304) equals the current number of pots not satisfying Criteria 1. In FIG. 15, the parameters also comprise default size 294 is shown as Size, Criteria 1 size 302 as Size 1, and Criteria 2 size 306 as Size 2.

Processing for new pots is shown in FIG. 15. At C50, if the number of available players is less than default size 294 processing goes to C52. Otherwise a check for any open (available) pot is made. If there is an open pot, it is called pot P and processing goes to C56, otherwise processing goes to C52. At C52, a test is made to determine the amount of time before there will be another pot. If said time is unknown or is too long, the available players are assigned to single player games, removed from the available pool, and processing goes to B60, otherwise processing goes directly to B60. (At B60, events or alters will be constructed. Processing would not have gone to C50 if it were not time for an event entity.)

At C56, the total number of players in the system is tested against size 302 needed for a Criteria 1 pot. The test insures that the lack of sufficient players to satisfy Criteria 1 requirements would not place the system in a wait until such time as the total numbers of players sufficiently increased. If there are less players than needed for a Criteria 1 pot, the count is turned off and processing goes to C70, otherwise the count is turned on and processing is as follows. If the number of available players is less than size 302 needed for a Criteria 1 pot, processing goes to C60, otherwise MADE 302, the current number of Criteria 1 pots, is tested. If mix need 296 is not less than mix MADE 302 the processing goes to C70, otherwise the number of available players is tested against the size 302 number of players for a Criteria 1 pot. If the number of available players is not greater than size 302, then all of the available players are placed into pot P, (C64) one is added to MADE 302 and processing goes to C82, otherwise sufficient Criteria 2 players, if any, are first eliminated from assignment to pot P, and, if needed, then enough other players are eliminated from said assignment to produce a numbers of players which equals size 302 for Criteria 1, and the resultant available players are assigned to pot P and processing goes to C64, above.

At C60, if the current number of pots not satisfying Criteria 1, FAIL 304, is less than mix cycle 298 minus mix need 296, processing goes to C70, otherwise processing goes to B60 (with no new pot initiated).

At C70, if number of available players is not less than the minimum needed for a Criteria 2 pot processing goes to C74, otherwise as follows.

If there is no wait time 304 specified for Criteria 2 or if wait time 304 has expired, processing goes to the C72, otherwise the elapsed time since wait time 304 check is added to any previously accumulated time waited and processing goes to B60. At C72, any accumulated time waited is cleared to zero. If the number of available players is not greater than the default size 294, all available players (which, from C50, are sufficient for a pot) are assigned to pot P and processing goes to C80, otherwise sufficient players of any type are eliminated from assignment to produce a number of players which equals default size 294, the resultant available players are assigned to pot P and processing goes to C80.

At C74, if the number of available players is not greater than size 306 number of players for Criteria 2 pot, all available players are assigned to pot P and processing goes to C80, otherwise sufficient players are eliminated from assignment to produce a size 306 number of players for Criteria 2, the resultant available players are assigned to pot P, and processing goes to C80.

At C80, if the count is off, processing goes to C90, otherwise one is added to the current number of non-Criteria 1 pots, FAIL 304, and processing goes to C82.

At C82, if the current number of Criteria 1 pots (MADE 302) plus the current number of (counted) non-Criteria 1 pots (FAIL 304) equals the mix cycle 298, MADE 302 and FAIL 304 are both set to zero. The desired pot mix has been achieved and a new series of pots begins in which any mix need 296 number of the mix cycle 298 number of pots can be a Criteria 1 pot.

At C90, pot P is closed and the players assigned to pot P are eliminated from the pool of available players. If there are more available players, processing goes to C50 to attempt to assign them to another pot, otherwise processing goes to B60 to process the next event entity.

The processing which begins at C50 may be modified for a plurality of Criteria 2 conditions, and may also be modified for a plurality of Criteria 1 conditions if the mix cycle for a second Criteria 1 is the same as mix cycle 298 for the first Criteria 1.

The instant invention has thus far been described in terms of a 7-card stud game and a 5-card draw game. However, the types of poker which may be simulated by the invention are not limited to these, and additional games may be played for player variety and casino experimentation. 5-Card and 6-card stud are obvious extensions.

5-Card draw could be played with two rounds of drawing rather than being limited to the one round of regular poker by adding a second draw round to the event queue. Replacement cards would be dealt from additional decks as needed. Such a double draw game could also have three rounds of betting: opening, between draws, and final. The same player displays would be used as in the above-described (single) 5-card draw game. The display element 123 after the second draw, would indicate the number of cards drawn on the second draw in a second 161 box 161A. The number of cards drawn on the first draw could be displayed in box 161 immediately to the right of each player seat number and would be the secondary sorting factor.

Poker games in which one or more cards from a stud hand are exchanged could also be played. Such games are sometimes called "twist" poker and it is usual for an exchanged hole card to be dealt face down, and an exchanged up-card to be dealt face up. "Twist" games could be simulated by addition of draw rounds (with a maximum discard of one) to the event entity of stud games. The player displays would follow those as in stud, except at the time the player could "twist" or discard. Then, the player display in elements 128, 130, and 138 would be the same as in draw.

Poker games in which several cards are shown face up for common usage by all players in addition to their individual hole cards could also be simulated by the instant invention. The dealing algorithm for common-card games would be modified to select all the common cards from the first deck, then deal the remaining cards as the player's first hole card. The common cards would also be removed from each successive deck prior to dealing to the players. Thus the total number of possible players for this game would be fifty-two minus the number of common cards, i.e., forty-eight players if four common cards; forty-seven players if five common cards, etc.

In the Skill III embodiment with two decks used per round, the total number of possible players for this game would be ninety-six players if four common cards; ninety-four if five common cards, etc.

Figure 30:
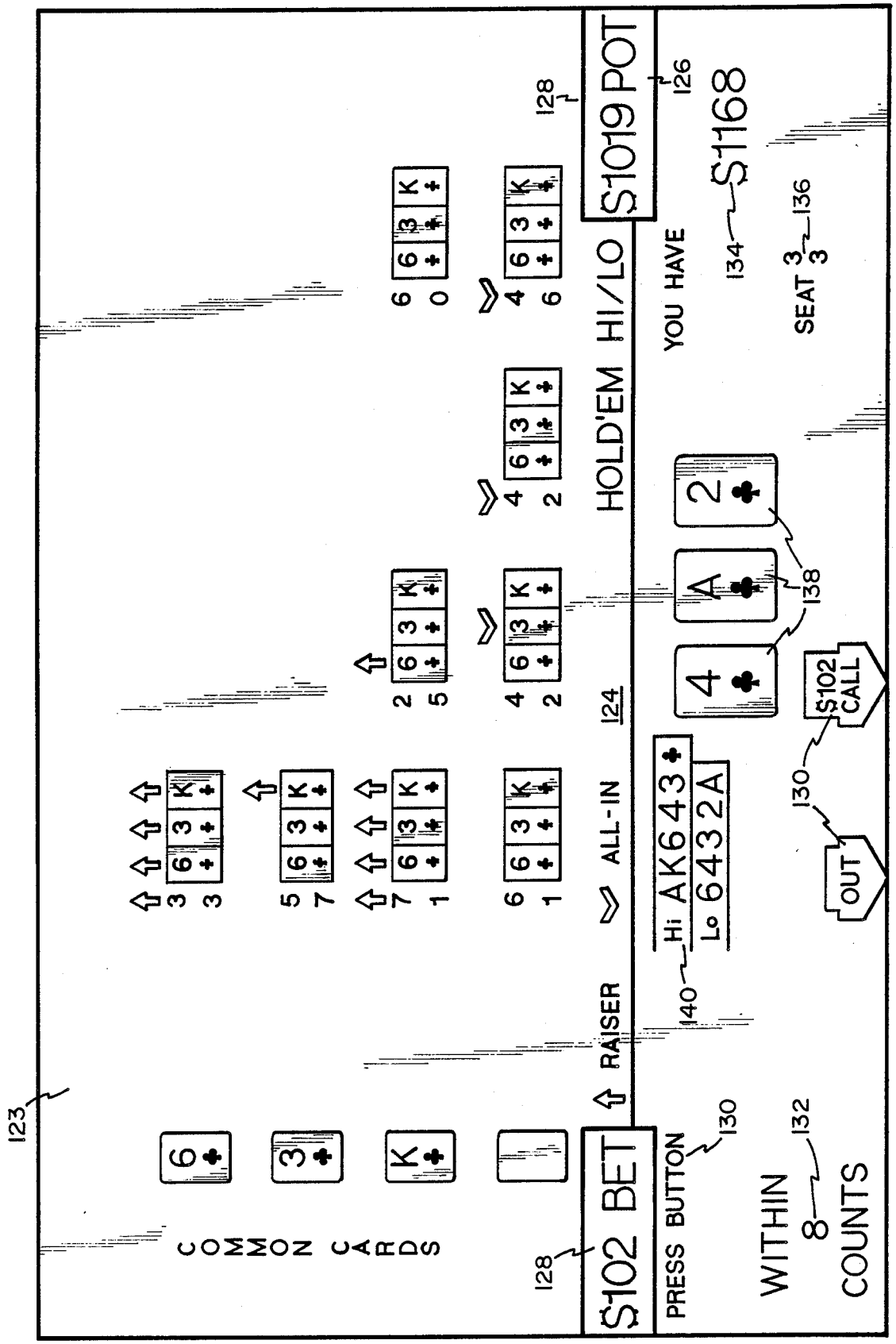
FIG. 30 is a view of an alternative embodiment of the video display shown on each player console for a common-card poker game according to the invention.

For such games, the common cards would first be shown face down in display element 123 of each player's upper screen. The player's hole cards would appear in area 138. The value of the player's hand including common cards would appear in 140. In another embodiment, the player's cards and their value appear in 141. There could be a round of betting as previously described. Then one or more common cards would be turned face up with an accompanying round of betting. Additional betting rounds would accompany the turning up of any common cards or the dealing of an additional hole card to the players. FIG. 30 shows a sample display for a common-card poker game which is a variant of a game called "Hold'em". In this "Hold'em" variation, four common cards are dealt face down, and each player receives three hole cards. There are betting rounds before the first common card is turned face up, and then additional betting rounds after each of the common cards are turned face up one at a time. FIG. 30 is a sample situation for calling the raises after the showing of the third common card (fourth betting round). The seat numbers of all players also appear in 123. Player cards in 123 would be shown in the same manner as cards appear in 123 for 7-card stud but all of the up cards will be identical. The usual symbols for all-in are used in this betting round and any previous round. In FIG. 30 for example, player #33 has raised each round, player #57 has raised on only the current round, player #71 has raised on all previous rounds only, and player #25 has raised on round 2 only. Players #42, #44, and #46 went all-in on previous betting rounds, and players #60 and #61 have just called all bets. The seat numbers in area 123 may be sequenced first by last round raise then by decreasing number of previous raises with those all-in last. After completion of the betting round for the next common card turned face up, the game proceeds to a show down for players remaining in the hand as previously described in relation to the 7-card stud game.

In other common-card variants, the common cards may be dealt in the shape of a cross with two cards on the horizontal axis, two cards on the vertical axis, and a card in the center which is considered to be on both horizontal and vertical axes. The player may not use cards from different axes to construct one hand (high or low) but may use different axis to construct separate high and low hands. In the instant invention two separate sets of quantifications would be required with the center card, after it was turned up, evaluated in both quantification sets. In the embodiment which shows the combined card and value in 141, all of the common cards may appear in 141, but such construction would follow the axis rules for evaluation.

The foregoing descriptions of the various embodiments are provided for illustration purposes only and should not be construed as in any way limiting this invention, the scope of which is solely defined by the appended claims.

I claim:

1. An electronic system for playing a card game of poker involving interactive wagering among a plurality of players comprising:
    (a) a central processing unit having:
        (i) CPU input means enabling all players to substantially simultaneously initiate a set of wagers to be responded to by a plurality of players wherein each wager initiation of each player is made at any time within the same time period such that with respect to interactive wagering all initiations are considered as taking place at the same time;
        (ii) means to electronically assign one or more cards to the plurality of players;
        (iii) means to initiate and transmit all events relating to the playing of the poker card game;
        (iv) means to tabulate, store and transmit data received from the plurality of players in response to the poker card game events;
        (v) means to tabulate, store and transmit interactive wagering data received from the plurality of players to each of the other players;
        (vi) means to evaluate each player's cards and determine an order of finish of the players; and,
        (vii) means to divide the total amount wagered in accordance with the order of finish of the players; and,
    (b) a plurality of individual player consoles, one for each of the plurality of players, electrically connected to the central processing unit, each console having:
        (i) means to electronically receive and display the cards assigned to the individual player;
        (ii) first input means to allow each player to respond to the game events initiated by the central processing unit;
        (iii) second input means to allow each player to transmit wagering data to the central processing unit; and,
        (iv) means to receive and display wagering data relating to the other players.

2. An electronic system for playing a card game of poker involving interactive wagering among a plurality of players comprising:
    (a) a central processing unit having:
        (i) means enabling all players to initiate a set of wagers to be responded to by a plurality of players;
        (ii) means to electronically assign one or more cards to the plurality of players;
        (iii) means to initiate and transmit all events relating to the playing of the poker card game;
        (iv) means to tabulate, store and transmit data received from the plurality of players in response to the poker game events;
        (v) means to tabulate, store and transmit interactive wagering data received from the plurality of players to each of the other players;
        (vi) means to evaluate each player's cards and determine an order of finish of the players; and,
        (vii) means to divide the total amount wagered in accordance with the order of finish of the players; and,
    (b) a plurality of individual player consoles, one for each or the plurality of players, electrically connected to the central processing unit, each console having:
  (i) processor means to determine and construct a rank element, suit element, and enclosure elements for said rank and suit elements for each card;
  (ii) means to electronically receive and display the cards assigned to the individual player such that a rank, a suit and an enclosure element is displayed for each card so as to uniquely identify any improved poker hand which a plurality of cards for each individual player is capable of attaining with the addition of at least one card;
  (iii) first input means to allow each player to respond to the game events initiated by the central processing unit;
  (iv) second input means to allow each player to transmit wagering data to the central processing unit; and,
  (v) means to receive and display wagering data relating to the other players.

3. The electronic system for playing a poker card game according to claim 2 wherein the display means to display the card elements further comprises means to display a plurality of card constructions.

4. The electronic system for playing a poker card game according to claim 3 wherein the display means further comprises means to uniquely display a plurality of distinct poker hand values for the same plurality of cards.

5. The electronic system for playing a poker card game according to claim 3 wherein said means to determine and construct the card elements constructs elements for decks of cards with more than four suits and more than thirteen ranks.

6. The electronic system for playing a poker card game according to claim 3 where said means to determine and construct the card elements constructs elements for hands having poker values consisting of more than five cards.

7. The electronic system for playing a poker card game according to claim 3 wherein each player console further comprises filter means to restrict the view of the display means such that only the player using the console may see the display.

8. The electronic system for playing a poker card game according to claim 7 wherein the filter means is located in front of the display means.

9. The electronic system for playing a poker card game according to claim 2 wherein the display means to display the card elements further comprises means to expand the card elements for rank consecutiveness, rank match, suit match and order significance.

10. An electronic system for playing a card game of poker involving interactive wagering among a plurality of players comprising;
  (a) a central processing unit having:
    (i) CPU assignment means to construct a plurality of games such that a second game includes a plurality of players from a first game prior to the determination of the winners in said first game;
    (ii) means enabling all players to initiate a set of wagers to be responded to by a plurality of players;
    (iii) means to electronically assign one or more cards to the plurality of players;
    (iv) means to initiate and transmit all events relating to the playing of the poker card game;
    (v) means to tabulate, store and transmit data received from the plurality of players in response to the poker game events;
    (vi) means to tabulate, store and transmit interactive wagering data from the plurality of players to each of the other players;
    (vii) means to evaluate each players cards and determine an order of finish of the players; and,
    (viii) means to divide the total amount wagered in accordance with the order of finish of the players; and,
  (b) a plurality of individual player consoles, one for each of the plurality of players, electrically connected to the central processing unit, each console having:
    (i) means to electronically receive and display the cards assigned to the individual player;
    (ii) first input means to allow each player to respond to the game events initiated by the central processing unit;
    (iii) second input means to allow each player to transmit wagering data to the central processing unit; and,
    (iv) means to receive and display wagering data relating to the other players.

11. The electronic system for playing a poker card game according to claim 10 wherein the assignment means comprises means to assign the plurality of interactive players based upon a predetermined, measurable playing characteristic.

12. The electronic system for playing a poker card game according to claim 11 wherein the measurable playing characteristic is selected from the group consisting of current dollar amounts available to a player, current dollar amounts possesed by the player with respect to the total dollar amount input into the system by the player, speed of the player's wagering responses, the players percentage of call wagers, and the players percentage of raise wagers.

13. The electronic system for playing a poker card game according to claim 11 wherein the measurable playing characteristic is determined for each pair of players and comprises the net wagering gain to the pair computed as a single entity.

14. The electronic system for playing poker card game according to claim 10 wherein the means enabling all players to indicate a set of wagers further comprises means to substantially simultaneously initiate a set of wagers to be responded to by a plurality of players wherein each wager initiation of each player is made at any time within the same time period such that with respect to interactive wagering all initiations are considered as taking place at the same time.

15. The electronic system for playing a poker card game according to claim 14 wherein the central processing unit further comprises means to electrically transmit all events relating to playing a game in which players have the option to electronically exchange one or more of their cards.

16. The electronic system for playing a poker card game according to claim 14 wherein the central processing unit further includes means to electrically transmit all events relating to playing a game in which one or more of each player's cards are displayed face up to all players.

17. The electronic system for playing a poker card game according to claim 16 wherein the central processing unit further includes means to electrically transmit all events relating to playing a game in which players have the option to electronically exchange one or more of their cards.

18. The electronic system for playing a poker card game according to claim 16 wherein the central processing unit further comprises means to electrically transmit all events relating to playing a game in which one or more sets of face-up cards are used in common by all players.

19. An electronic system for playing a card game of poker involving interactive wagering among a plurality of players comprising:
  (a) a central processing unit having:
    (i) CPU assignment means to construct a plurality of games such that the mix of games comprising a first plurality of players with respect to games comprising a second plurality of players comprises a desired one of a plurality of mixes;
    (ii) means enabling all players to initiate a set of wagers to be responded to by a plurality of players;
    (iii) means to electronically assign one or more cards to the plurality of players;
    (iv) means to initiate and transmit all events relating to the playing of the poker card game;
    (v) means to tabulate, store and transmit data received from the plurality of players in response to the poker game events;
    (vi) means to tabulate, store and transmit interactive wagering data received from the plurality of players to each of the other players;
    (vii) means to evaluate each player's cards and determine an order of finish of the players; and,
    (viii) means to divide the total amount wagered in accordance with the order of finish of the players; and,
  (b) a plurality of individual player consoles, one for each of the plurality of players, electrically connected to the central processing unit, each console having:
    (i) means to electronically receive and display the cards assigned to the individual player;
    (ii) first input means to allow each player to respond to the game events initiated by the central processing unit;
    (iii) second input means to allow each player to transmit wagering data to the central processing unit; and,
    (iv) means to receive and display wagering data relating to the other players.

20. The electronic system for playing a poker card game according to claim 19 wherein the assignment means further comprises means for determining the number of players in each game according to a predetermined criteria.

21. The electronic system for playing a poker card game according to claim 20 wherein the assignment means further comprises means to assign the plurality of interactive players based upon a predetermined measurable playing characteristic.

22. The electronic system for playing a poker card game according to claim 21 wherein each console further comprises processor means to determine and construct a rank element, suit element and enclosure elements for said rank and suite elements for each card and wherein the display means displays a rank, a suite and an enclosure element so as to identify each distinct attained poker hand value.

* * * * *